(12) United States Patent
Yao et al.

(10) Patent No.: US 12,309,243 B2
(45) Date of Patent: May 20, 2025

(54) COMMUNICATION METHOD AND APPARATUS

(71) Applicant: Huawei Technologies Co., Ltd., Shenzhen (CN)

(72) Inventors: Chuting Yao, Beijing (CN); Ao Guo, Shanghai (CN); Jian Wang, Beijing (CN); Jianhua Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 373 days.

(21) Appl. No.: 17/634,731

(22) PCT Filed: Aug. 12, 2020

(86) PCT No.: PCT/CN2020/108731
§ 371 (c)(1),
(2) Date: Feb. 11, 2022

(87) PCT Pub. No.: WO2021/027853
PCT Pub. Date: Feb. 18, 2021

(65) Prior Publication Data
US 2022/0279381 A1  Sep. 1, 2022

(30) Foreign Application Priority Data

Aug. 15, 2019  (CN) .......................... 201910755828.0

(51) Int. Cl.
*H04W 28/06* (2009.01)
*H04L 1/1607* (2023.01)
(Continued)

(52) U.S. Cl.
CPC ............ *H04L 69/04* (2013.01); *H04L 1/1642* (2013.01); *H04L 1/1835* (2013.01); *H04W 28/06* (2013.01)

(58) Field of Classification Search
CPC .. H04W 28/06; H04W 28/065; H04L 1/1642; H04L 1/1835; H04L 69/04; H04L 69/24; H04L 69/06
See application file for complete search history.

(56) References Cited

U.S. PATENT DOCUMENTS 6,590,905 B1 * 7/2003 Suumaki ................... H04L 9/40
370/468
10,271,243 B2 * 4/2019 Phuyal .................. H04W 88/10
(Continued)

FOREIGN PATENT DOCUMENTS

CN 102457387 A 5/2012
CN 103684692 A 3/2014
(Continued)

OTHER PUBLICATIONS

A Negative Acknowledgement Mechanism for Signaling RFC 4077 (Year: 2005).*
(Continued)

*Primary Examiner* — Jay P Patel
(74) *Attorney, Agent, or Firm* — Conley Rose, P.C.

(57) ABSTRACT

A communication method includes a first device configuring a plurality of buffers to compress data packets. Each of the plurality of buffers is used to compress one or more data packets for transmission. If a compressed data packet is lost during transmission, a receive end cannot decompress a data packet corresponding to a same buffer as the lost data packet, but the receive end can continue to decompress a data packet that does not correspond to the same buffer as the lost data packet.

17 Claims, 18 Drawing Sheets

(51) Int. Cl.
*H04L 1/1829* (2023.01)
*H04L 69/04* (2022.01)

(56) References Cited

U.S. PATENT DOCUMENTS

| | | | |
|---|---|---|---|
| 10,470,090 B2* | 11/2019 | Balasubramanian | ........................ H04W 36/0033 |
| 10,531,346 B2* | 1/2020 | Bathwal | ............ H04W 36/0072 |
| 10,638,353 B2* | 4/2020 | Ahmadzadeh | ...... H04W 28/065 |
| 2003/0007490 A1* | 1/2003 | Yi | ............................ H04L 69/22 370/310 |
| 2003/0123485 A1* | 7/2003 | Yi | ............................ H04L 69/04 370/477 |
| 2003/0169725 A1* | 9/2003 | Ahmavaara | ....... H04W 36/0022 370/352 |
| 2004/0052234 A1* | 3/2004 | Ameigeiras | ........... H04L 1/1642 370/428 |
| 2007/0047551 A1* | 3/2007 | Conner | .................. H04L 69/04 370/394 |
| 2009/0052420 A1* | 2/2009 | Fischer | ................. H04W 72/23 370/338 |
| 2009/0103478 A1* | 4/2009 | Sammour | ............... H04L 69/28 370/328 |
| 2009/0104890 A1* | 4/2009 | Wang | .................. H04W 12/037 455/410 |
| 2009/0116399 A1* | 5/2009 | Ho | ...................... H04L 47/2416 370/252 |
| 2009/0175163 A1* | 7/2009 | Sammour | ................. A61P 9/10 370/216 |
| 2009/0238124 A1* | 9/2009 | Pragada | ................ H04L 49/901 370/329 |
| 2009/0238129 A1* | 9/2009 | Park | ..................... H04W 76/22 370/329 |
| 2009/0238142 A1* | 9/2009 | Chun | .................... H04W 28/06 370/329 |
| 2009/0318127 A1* | 12/2009 | Yi | .......................... H04L 1/1829 455/422.1 |
| 2010/0091709 A1* | 4/2010 | Yi | ............................ H04L 69/18 370/477 |
| 2010/0135202 A1* | 6/2010 | Chun | .................... H04W 28/14 370/328 |
| 2010/0177733 A1* | 7/2010 | Yi | ......................... H04W 80/02 370/331 |
| 2010/0215020 A1* | 8/2010 | Lee | ....................... H04W 36/02 370/331 |
| 2010/0271944 A1 | 10/2010 | Michaelis et al. | |
| 2010/0329135 A1* | 12/2010 | Pelletier | ................ H04W 72/21 370/252 |
| 2011/0164694 A1* | 7/2011 | Yamasaki | ............... H04L 47/10 375/259 |
| 2011/0188408 A1* | 8/2011 | Yi | ....................... H04W 12/102 370/254 |
| 2011/0306309 A1* | 12/2011 | Yabe | ...................... H04L 69/04 455/72 |
| 2012/0028631 A1* | 2/2012 | Chun | ................... H04L 1/1635 455/422.1 |
| 2013/0148490 A1* | 6/2013 | Yi | ......................... H04W 76/19 370/216 |
| 2013/0170496 A1* | 7/2013 | Kim | ..................... H04L 1/1867 370/394 |
| 2015/0043435 A1* | 2/2015 | Blankenship | ......... H04L 1/1874 370/329 |
| 2016/0142932 A1* | 5/2016 | Ahmadzadeh | .... H04W 28/0236 370/328 |
| 2016/0142934 A1* | 5/2016 | Ahmadzadeh | ........ H04W 28/06 370/328 |
| 2016/0142951 A1* | 5/2016 | Balasubramanian | ....................... H04W 36/0033 370/331 |
| 2017/0115892 A1 | 4/2017 | Gokita | |
| 2017/0118766 A1* | 4/2017 | Baek | .................. H04W 72/1268 |
| 2017/0238195 A1* | 8/2017 | Hao | ........................ H04L 65/40 370/328 |
| 2017/0295517 A1* | 10/2017 | Nguyen | ................. H04L 5/0055 |
| 2018/0167889 A1* | 6/2018 | Rajagopal | ............. H04L 5/0073 |
| 2018/0227919 A1* | 8/2018 | Lee | ......................... H04W 72/21 |
| 2018/0234108 A1 | 8/2018 | Fallon et al. | |
| 2018/0234839 A1* | 8/2018 | Tenny | ............... H04W 36/0033 |
| 2019/0037632 A1* | 1/2019 | Uchino | ................. H04W 76/20 |
| 2019/0053099 A1* | 2/2019 | Kim | ...................... H04W 76/27 |
| 2019/0090156 A1* | 3/2019 | Kim | ........................ H04L 67/12 |
| 2019/0124564 A1* | 4/2019 | Bathwal | ................ H04L 1/1657 |
| 2019/0141567 A1 | 5/2019 | Liu et al. | |
| 2019/0141571 A1 | 5/2019 | Kim et al. | |
| 2019/0141773 A1* | 5/2019 | Kim | ....................... H04W 76/34 |
| 2019/0149421 A1* | 5/2019 | Jin | ........................ H04L 5/0078 370/331 |
| 2019/0306871 A1* | 10/2019 | Liu | ........................ H04W 28/06 |
| 2020/0177320 A1 | 6/2020 | Ren et al. | |
| 2020/0344644 A1* | 10/2020 | Liu | ........................ H04L 69/04 |
| 2020/0389812 A1* | 12/2020 | Chen | .................... H04W 76/27 |
| 2020/0396640 A1* | 12/2020 | Quan | .................... H04L 67/565 |
| 2021/0227422 A1* | 7/2021 | Sharma | .................. H04L 47/34 |
| 2021/0306913 A1* | 9/2021 | Li | ........................ H04W 76/11 |
| 2021/0321351 A1* | 10/2021 | Kim | .................. H04W 72/0446 |
| 2022/0248260 A1 | 8/2022 | Xu et al. | |

FOREIGN PATENT DOCUMENTS

| | | |
|---|---|---|
| CN | 108347468 A | 7/2018 |
| CN | 109246753 A | 1/2019 |
| CN | 109392152 A | 2/2019 |
| CN | 109672707 A | 4/2019 |
| CN | 109802922 A | 5/2019 |
| CN | 109842653 A | 6/2019 |
| CN | 109842905 A | 6/2019 |
| CN | 110073643 A | 7/2019 |
| WO | 2018196491 A1 | 11/2018 |

OTHER PUBLICATIONS

CATT, Consideration on UDC Header Content, 3GPP TSG-RAN WG2 #99bis, R2-1710720, Prague, Czech Republic, Oct. 9-13, 2017, 3 pages.

R2-1713357, Ericsson, "Release and Reset Behaviour for UDC," Reno, USA, Nov. 27-Dec. 1, 2017, 8 pages.

* cited by examiner

COMMUNICATION METHOD AND APPARATUS

CROSS-REFERENCE TO RELATED APPLICATIONS

This is a U.S. National Stage of International Patent Application No. PCT/CN2020/108731 filed on Aug. 12, 2020, which claims priority to Chinese Patent Application No. 201910755828.0 filed on Aug. 15, 2019. Both of the aforementioned applications are hereby incorporated by reference in their entireties.

TECHNICAL FIELD

This application relates to the field of communication technologies, and in particular, to a communication method and apparatus.

BACKGROUND

In acknowledged mode (acknowledged mode, AM) transmission in a long term evolution (long term evolution, LTE) system, an uplink data compression (uplink data compression, UDC) technology is introduced and implemented at a packet data convergence protocol (packet data convergence protocol, PDCP) layer. The UDC technology is mainly used for some data packets having a large amount of duplicate content, for example, data packets used for transmitting the session initiation protocol (session initiation protocol, SIP) in a voice over LTE (voice over long term evolution, VoLTE) service. In the UDC technology, a difference part between data packets is transmitted, to reduce an amount of data that needs to be transmitted.

Because only the difference part is transmitted, a receive end needs to decompress a compressed data packet based on a previously received data packet. Currently, a transmit end and the receive end each maintain a buffer (buffer). The buffer herein may be a physical hardware buffer, or may be a logical concept, for example, a segment of storage space. The transmit end places original information of a compressed data packet into the buffer, and compresses a next data packet based on content included in the buffer. When receiving a new compressed data packet, the receive end decompresses the compressed data packet based on content included in the buffer. It can be learned that the content in the buffer of the transmit end needs to be consistent with the content in the buffer of the receive end, to ensure that the receive end implements correct decompression.

However, in unacknowledged mode (unacknowledgement mode, UM), a data packet may be lost in a transmission process, and the receive end cannot receive the lost data packet. For example, a PDCP layer of the transmit end sends a compressed data packet 1, a compressed data packet 2, a compressed data packet 3, and a compressed data packet 4 to the receive end. In a transmission process, the compressed data packet 3 is lost, and consequently the receive end cannot receive the compressed data packet 3. However, a data packet 4 is compressed based on a data packet 3. In other words, the buffer of the transmit end includes the data packet 3. After the receive end receives the compressed data packet 4, because the receive end does not receive the compressed data packet 3, and the buffer of the receive end does not include the data packet 3, an error occurs when the receive end decompresses the compressed data packet 4. In this case, the receive end sends a control (control) protocol data unit (protocol data unit, PDU) to the transmit end, to indicate the decompression error. After the transmit end receives the control PDU, for a data packet that has not been compressed, the transmit end may not compress the data packet based on content in the buffer, but may compress the data packet based on preset information. Then, after receiving these compressed data packets, the receive end can perform normal decompression based on the preset information. However, the receive end unsuccessfully decompresses all compressed data packets received in a time period between a moment at which the receive end finds a decompression failure and a moment at which the receive end receives a data packet that can be correctly decompressed. Consequently, a large quantity of data packets are lost.

SUMMARY

Embodiments of this application provide a communication method and apparatus, to increase a rate of correctly decompressing a data packet.

According to a first aspect, a communication method is provided. The method includes: A first device configures a plurality of buffers used to compress data packets. The first device compresses a first data packet by using a first buffer, where the first buffer is one of the plurality of buffers. The first device sends a compressed first data packet to a second device.

The method may be executed by a first communication apparatus. The first communication apparatus may be a communication device or a communication apparatus, for example, a chip system, that can support a communication device in implementing functions of the method. For example, the communication device is a first device. For example, the first device is a terminal device or a network device.

In this embodiment of this application, the first device may maintain the plurality of buffers. If a compressed data packet is lost during transmission, a receive end cannot decompress other data packets corresponding to a same buffer as the lost data packet, but the receive end can continue to decompress another data packet that does not correspond to the same buffer as the lost data packet. In this manner, a quantity of data packets affected by the lost data packet is decreased, and a quantity of lost data packets is also decreased.

With reference to the first aspect, in a first possible implementation of the first aspect, different buffers in the plurality of buffers are used to compress different data packets.

Different buffers may be used to compress different data packets. For example, a buffer 1 may be used to compress a data packet 1 and a data packet 2, and a buffer 2 may be used to compress a data packet 3 and a data packet 4. A same data packet is not compressed by using different buffers. Therefore, a compression error can be avoided.

With reference to the first aspect or the first possible implementation of the first aspect, in a second possible implementation of the first aspect, the first buffer is determined based on a serial number of the first data packet; or time first buffer is randomly determined.

A manner of determining the first buffer is not limited.

With reference to the second possible implementation of the first aspect, in a third possible implementation of the first aspect, that the first buffer is determined based on a serial number of the first data packet includes: The first buffer is selected by the first device in order from the plurality of buffers based on the serial number of the first data packet; or the first buffer is a buffer corresponding to a first serial number range to which the serial number of the first data packet belongs.

For example, the first device may further number the plurality of buffers. In this case, the first device may have data packets one-to-one correspond to the buffers based on serial numbers of the data packets and serial numbers of the buffers. For example, the first device may have the $1^{st}$ data packet correspond to a first buffer in the plurality of buffers, have the $2^{nd}$ data packet correspond to a second buffer in the plurality of buffers, and have the $3^{rd}$ data packet and the $4^{th}$ data packet correspond to a third buffer in the plurality of buffers. The rest may be deduced by analogy. In this manner, serial numbers of data packets corresponding to different buffers may differ greatly. If a data packet is lost, only a data packet corresponding to a same buffer as the lost data packet is affected. The first device may first send a data packet that follows the lost data packet and corresponds to another buffer, and may further send another data packet corresponding to the same buffer as the lost data packet after a period of time. In this case, before the first device sends the another data packet corresponding to the same buffer as the lost data packet, or when the first device sends the another data packet corresponding to the same buffer as the lost data packet, the first device may have reset the buffer. This can further decrease a quantity of lost data packets. Alternatively, the first device may classify serial numbers of data packets into different serial number ranges, and each serial number range may correspond to one buffer. In this case, the first device determines the serial number range to which the serial number of the first data packet belongs, and then may determine that a buffer corresponding to the serial number range is the buffer corresponding to the first data packet. Both manners of determining the buffer are relatively simple.

With reference to any one of the first aspect or the first possible implementation of the first aspect to the third possible implementation of the first aspect, in a fourth possible implementation of the first aspect, the method further includes: The first device keeps content included in the first buffer unchanged when compressing, by using the first buffer, a plurality of data packets corresponding to the first buffer.

For example, for all data packets corresponding to the first buffer, when these data packets are compressed by using the first buffer, the content included in the first buffer keeps unchanged, in other words, states of the first buffer keep unchanged. For example, regardless of a quantity of data packets corresponding to the first buffer, when these data packets are compressed, the first buffer includes only preset information. The preset information is, for example, a predefined dictionary. The predefined dictionary may be a preset dictionary. The predefined dictionary may be placed in a buffer. A data packet is to be compressed based on a difference obtained through comparison between the to-be-compressed data packet and content included in the buffer. In this case, the first device compresses the first data packet, a second data packet, or a third data packet based on the predefined dictionary, and does not need to update the first buffer after compression of a data packet is completed. In this manner, when a subsequent data packet is compressed, there is no need to consider a previous data packet. Therefore, data packets are more decoupled from each other, and impact caused by a loss of a data packet on another data packet is reduced. In addition, because the first device does not need to update the first buffer, workloads of the first device can be reduced.

With reference to any one of the first aspect or the first possible implementation of the first aspect to the fourth possible implementation of the first aspect, in a fifth possible implementation of the first aspect, the method further includes: The first device receives first signaling from the second device, where the first signaling indicates that the compressed first data packet is unsuccessfully decompressed. The first device resets the first buffer, and compresses a data packet corresponding to the first buffer by using a reset first buffer.

If the second device unsuccessfully decompresses the compressed first data packet, the second device may send the first signaling to the first device. After receiving the first signaling, the first device may reset the first buffer. This decreases a quantity of lost data packets.

With reference to any one of the first aspect or the first possible implementation of the first aspect to the fifth possible implementation of the first aspect, in a sixth possible implementation of the first aspect, the method further includes: The first device receives first signaling from the second device, where the first signaling indicates first information, and the first information includes information indicating that the compressed first data packet is not received, or includes information indicating that a compressed second data packet is unsuccessfully decompressed. The first device sends a second buffer or the compressed first data packet to the second device, where the compressed second data packet corresponds to the second buffer, and the second buffer includes the first data packet.

A data packet may be used as content included in a buffer. This means that a data packet corresponding to the buffer is compressed based on the data packet. If the data packet included in the buffer is lost in a transmission process, the second device may unsuccessfully decompress all compressed data packets corresponding to the buffer. If the second buffer includes the first data packet, the first device may send the second buffer or the compressed first data packet to the second device, so that the second buffer can re-obtain content in the second buffer, to correctly decompress another data packet corresponding to the second buffer.

With reference to any one of the first aspect or the first possible implementation of the first aspect to the sixth possible implementation of the first aspect, in a seventh possible implementation of the first aspect, the plurality of buffers correspond to one data bearer or one signaling bearer.

In this embodiment of this application, the plurality of buffers may correspond to one bearer. This means that, in this embodiment of this application, the plurality of buffers may be set for one bearer.

According to a second aspect, a second communication method is provided. The method includes: A second device receives a compressed first data packet. The second device decompresses the compressed first data packet by using a first buffer corresponding to the compressed first data packet, to obtain a first data packet, where the second device maintains a plurality of buffers used to decompress compressed data packets, and the first buffer is one of the plurality of buffers.

The method may be executed by a second communication apparatus. The second communication apparatus may be a communication device or a communication apparatus, for example, a chip system, that can support a communication device in implementing functions of the method. For example, the communication device is a second device. For example, the second device is a terminal device or a network device.

With reference to the second aspect, in a first possible implementation of the second aspect, different buffers in the plurality of buffers are used to compress different data packets.

With reference to the second aspect or the first possible implementation of the second aspect, in a second possible implementation of the second aspect, the method further includes: The second device determines one of the plurality of buffers as the first buffer based on a serial number of the first data packet; or the second device determines the first buffer based on first indication information carried in the compressed first data packet.

With reference to the second possible implementation of the second aspect, in a third possible implementation of the second aspect, that the second device determines one of the plurality of buffers as the first buffer based on a serial number of the first data packet includes: The second device selects one buffer in order from the plurality of buffers as the first buffer based on the serial number of the first data packet; or the second device determines that the serial number of the first data packet belongs to a first serial number range, and the second device determines a buffer corresponding to the first serial number range as the first buffer.

With reference to the second aspect, the first possible implementation of the second aspect, the second possible implementation of the second aspect, or the third possible implementation of the second aspect, in a fourth possible implementation of the second aspect, the method further includes: The second device sends first signaling to the first device, where the first signaling indicates first information, and the first information includes information indicating that the compressed first data packet is not received, or includes information indicating that a compressed second data packet is unsuccessfully decompressed. The second device receives a second buffer or the compressed first data packet from the first device, where the compressed second data packet corresponds to the second buffer, and the second buffer includes the first data packet.

With reference to the second aspect, the first possible implementation of the second aspect, the second possible implementation of the second aspect, the third possible implementation of the second aspect, or the fourth possible implementation of the second aspect, in a fifth possible implementation of the second aspect, the plurality of buffers correspond to one data bearer or one signaling bearer.

For technical effects achieved in the second aspect or the possible implementations of the second aspect, refer to the descriptions of the technical effects achieved in the first aspect or the possible implementations of the first aspect.

According to a third aspect, a third communication method is provided. The method includes: A first device compresses a first data packet in M data packets by using a first buffer corresponding to the M data packets, to obtain a compressed first data packet, where M is a positive integer. The first device sends the compressed first data packet to a second device.

The method may be executed by a third communication apparatus. The third communication apparatus may be a communication device or a communication apparatus, for example, a chip system, that can support a communication device in implementing functions of the method. For example, the communication device is a first device. For example, the first device is a terminal device or a network device.

In this embodiment of this application, a frequency of updating a buffer can be reduced, and the buffer is updated after a plurality of data packets are compressed, so that a same buffer state can correspond to the plurality of data packets. In this case, if one or more compressed data packets corresponding to one buffer are lost, because buffer states used to compress these data packets are the same, and there is no sequential dependence relationship between these data packets during compression, a loss of these compressed data packets does not affect decompression of another compressed data packet, and the another compressed data packet can still be correctly decompressed. It can be learned that this manner can decrease a quantity of lost data packets.

With reference to the third aspect, in a first possible implementation of the third aspect, the M data packets are all data packets on a first data bearer or a first signaling bearer.

In other words, all data packets corresponding to the buffer may be compressed based on same content. This compression manner is relatively simple, and after compression, the buffer does not need to be updated. Therefore, workloads of the first device are reduced.

With reference to the third aspect, in a second possible implementation of the third aspect, the method further includes: The first device updates the first buffer to a second buffer based on one or more data packets in the M data packets, where the second buffer is used to compress N data packets, serial numbers of the N data packets follow serial numbers of the M data packets, and N is a positive integer.

The M data packets are a portion of data packets corresponding to a first bearer. In other words, data packets corresponding to the first bearer further include a data packet other than the M data packets. In this case, the first device selects only the M data packets to correspond to the first buffer. The data packet other than the M data packets may correspond to another buffer. In addition, the first device may update the first buffer to another buffer based on one or more data packets in the M data packets. This update manner is relatively simple. In addition, the M data packets can be used. Actually, the first device maintains only one buffer. Corresponding to another buffer described herein may be understood as corresponding to another state of the buffer.

With reference to the second possible implementation of the third aspect, in a third possible implementation of the third aspect, that the first device updates the first buffer to a second buffer based on one or more data packets in the M data packets includes: The first device adds the one or more data packets to the first buffer based on the serial numbers of the M data packets, to obtain the second buffer.

For example, the first device may select M data packets with consecutive serial numbers starting from the $1^{st}$ to-be-compressed data packet, and have the M data packets correspond to the first buffer. In this case, the serial numbers of the M data packets are consecutive. Alternatively, the first device may perform a modulo operation on serial numbers of to-be-compressed data packets, select M data packets whose serial numbers obtained through the modulo operation are consecutive, and have the M data packets correspond to the first buffer. In this case, the serial numbers that are of the M data packets and that are obtained through the modulo operation are consecutive, and serial numbers of the M data packets may also be consecutive. Alternatively, the first device may randomly select M data packets from to-be-compressed data packets. In this case, serial numbers of the M data packets may be consecutive or inconsecutive. Alternatively, the first device may select M data packets in another manner. This is not specifically limited.

With reference to the third possible implementation of the third aspect, in a fourth possible implementation of the third aspect, the method further includes: The first device receives first signaling from the second device, where the first signaling indicates serial numbers of one or more data packets, and the one or more data packets are data packets used to update the first buffer to the second buffer.

The data packet used to update the first buffer to the second buffer may be determined by the first device, or may be indicated by the second device. This is not specifically limited.

With reference to the third possible implementation of the third aspect, in a fifth possible implementation of the third aspect, compressed M data packets include compressed one or more data packets, the compressed one or more data packets carry first indication information, and the first indication information indicates that a corresponding data packet is used to update the first buffer to the second buffer.

A specific data packet to be used to update the first buffer may be selected by the first device. For example, the first device selects the first data packet in the M data packets to update the first buffer to the second buffer. When sending the compressed first data packet to the second device, the first device may include the first indication information in the compressed first data packet. The first indication information may indicate that the first data packet is used to update the first buffer to the second buffer. Certainly, if the first device not only selects the first data packet to update the first buffer, but also selects another data packet to update the first buffer, when the first device sends compressed data packets to the second device, the first device includes the first indication information in all the corresponding compressed data packets. After receiving the compressed first data packet, the second device may determine, based on the first indication information carried in the compressed first data packet, that the first data packet is used to update the first buffer to the second buffer, or determine that the second buffer includes the first data packet. Indication is implemented in each compressed data packet, so that the indication can be implemented more clearly. Alternatively, if the first device selects a plurality of consecutive data packets to update the first buffer, when the first device sends compressed data packets to the second device, the first device may include the first indication information in the $1^{st}$ compressed data packet in the plurality of consecutive compressed data packets. The first indication information may indicate that K consecutive compressed data packets starting from the $1^{st}$ compressed data packet are used to update the first buffer. For example, the first indication information may indicate a value of K. After receiving the compressed data packets, the second device may determine, based on the first indication information carried in the $1^{st}$ compressed data packet in the plurality of consecutive compressed data packets, that the $1^{st}$ compressed data packet to the $K^{th}$ compressed data packet are all used to update the first buffer. This indication manner helps decrease a quantity of first indication information, and reduce transmission overheads.

In this embodiment of this application, updating a buffer based on a data packet may mean adding the data packet to the buffer, to obtain another buffer. For example, updating the first buffer to the second buffer based on the first data packet may mean adding the first data packet to the first buffer, where a buffer to which the first data packet is added may be referred to as the second buffer.

With reference to any one of the third possible implementation of the third aspect to the fifth possible implementation of the third aspect, in a sixth possible implementation of the third aspect, the method further includes: The first device receives second signaling from the second device, where the second signaling indicates that the compressed first data packet is not received, or indicate that a compressed second data packet is unsuccessfully decompressed. The first device sends the second buffer or the compressed one or more data packets to the second device, where the compressed second data packet corresponds to the second buffer.

For example, if the second device determines that the compressed first data packet is not received, the second device may send the second signaling to the first device. The second signaling indicates that the compressed first data packet is not received. For example, the second signaling is a control PDU. A data packet may be used as content included in a buffer. This means that a data packet corresponding to the buffer is compressed based on the data packet. If the data packet included in the buffer is lost in a transmission process, the second device may unsuccessfully decompress all compressed data packets corresponding to the buffer. If the first data packet corresponds to the second buffer, the first device may send the second buffer or the compressed first data packet to the second device, so that the second buffer can re-obtain content in the second buffer, to correctly decompress another data packet corresponding to the second buffer.

According to a fourth aspect, a fourth communication method is provided. The method includes: A second device receives a compressed first data packet from a first device. The second device decompresses the compressed data packet by using a first buffer corresponding to the compressed first data packet, to obtain a first data packet, where the first buffer corresponds to compressed M data packets, the compressed first data packet is one of the compressed M data packets, and M is a positive integer.

The method may be executed by a fourth communication apparatus. The fourth communication apparatus may be a communication device or a communication apparatus, for example, a chip system, that can support a communication device in implementing functions of the method. For example, the communication device is a second device. For example, the second device is a terminal device or a network device.

With reference to the fourth aspect, in a first possible implementation of the fourth aspect, the M data packets are all data packets on a first data bearer or a first signaling bearer.

With reference to the fourth aspect, in a second possible implementation of the fourth aspect, the method further includes: The first device updates the first buffer to a second buffer based on compressed one or more data packets in the compressed M data packets, where the second buffer is used to decompress compressed N data packets, serial numbers of the compressed N data packets follow serial numbers of the compressed M data packets, and N is a positive integer.

With reference to the second possible implementation of the fourth aspect, in a third possible implementation of the fourth aspect, that the second device updates the first buffer to a second buffer based on compressed one or more data packets in the compressed M data packets includes: The first device adds, based on the serial numbers of the compressed M data packets, one or more data packets obtained by decompressing the compressed one or more data packets to the first buffer, to obtain the second buffer.

With reference to the third possible implementation of the fourth aspect, in a fourth possible implementation of the fourth aspect, the method further includes: The second device sends first signaling to the second device, where the first signaling indicates serial numbers of one or more data packets, and the one or more data packets are data packets used to update the first buffer to the second buffer.

With reference to the third possible implementation of the fourth aspect, in a fifth possible implementation of the fourth aspect, the compressed one or more data packets carry first indication information, and the first indication information indicates that a corresponding compressed data packet is used to update the first buffer to the second buffer.

With reference to any one of the third possible implementation of the fourth aspect to the fifth possible implementation of the fourth aspect, in a sixth possible implementation of the fourth aspect, the method further includes: The second device sends second signaling to the first device, where the second signaling indicates that the compressed first data packet is not received, or indicate that a compressed second data packet is unsuccessfully decompressed. The second device receives the second buffer or the compressed first data packet from the first device, where the compressed second data packet corresponds to the second buffer.

For technical effects achieved in the fourth aspect or the possible implementations of the fourth aspect, refer to the descriptions of the technical effects achieved in the third aspect or the possible implementations of the third aspect.

According to a fifth aspect, a fifth communication method is provided. The method includes: A first device resets a buffer based on a first condition. The first device compresses a data packet by using a reset buffer, to obtain a compressed data packet. The first device sends the compressed data packet to a second device.

The method may be executed by a fifth communication apparatus. The fifth communication apparatus may be a communication device or a communication apparatus, for example, a chip system, that can support a communication device in implementing functions of the method. For example, the communication device is a first device. For example, the first device is a terminal device or a network device.

In this embodiment of this application, the first device may reset the buffer when the first condition is met, and does not need to wait to reset the buffer until the second device indicates that a data packet is lost. This can decrease a quantity of lost data packets to a greatest extent.

With reference to the fifth aspect, in a possible implementation of the fifth aspect, the first condition includes one of or any combination of the following:
the buffer is reset by using first duration as a periodicity;
the buffer is reset after every N data packets are compressed; or
a total data amount of compressed data packets is greater than or equal to a first threshold.

That the buffer is reset by using first duration as a periodicity means that the buffer is reset periodically. This manner is relatively simple. Alternatively, the first device may reset the buffer after compressing every N data packets. A smaller value of N indicates a higher frequency at which the first device resets the buffer and a smaller quantity of lost data packets. However, if the first device resets the buffer excessively frequently, a large quantity of workloads are brought to the first device. Therefore, an appropriate value may be assigned to N, so that the first device does not reset the buffer excessively frequently and a quantity of lost data packets is decreased to a greatest extent. Alternatively, the total data amount of compressed data packets means a sum of data amounts of all compressed data packets. If a data amount of compressed data packets is large, an occurrence probability of an error may be high. Therefore, if the total data amount of compressed data packets is greater than or equal to the first threshold, the first device may reset the buffer.

With reference to the fifth aspect or the first possible implementation of the fifth aspect, in a second possible implementation of the fifth aspect, the method further includes: The first device receives first signaling from the second device, where when the first condition is that the buffer is reset by using the first duration as the periodicity, the first signaling indicates the first duration; when the first condition is that the buffer is reset after every N data packets are compressed, the first signaling indicates a value of N; or when the first condition is that the buffer is reset when the total data amount of compressed data packets is greater than or equal to the first threshold, the first signaling indicates the first threshold.

Information such as a threshold related to the first condition may be set by the first device, may be set by the second device, or may be specified according to a protocol. This is not specifically limited.

According to a sixth aspect, a communication apparatus is provided. For example, the communication apparatus is the first communication apparatus described above. The communication apparatus is configured to perform the method according to any one of the first aspect or the possible implementations of the first aspect. Specifically, the communication apparatus may include modules configured to perform the method according to any one of the first aspect or the possible implementations of the first aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a first device. For example, the first device is a terminal device or a network device.

The processing module is configured to configure a plurality of buffers used to compress data packets.

The processing module is further configured to compress a first data packet by using a first buffer, where the first buffer is one of the plurality of buffers.

The transceiver module is configured to send a compressed first data packet to a second device.

With reference to the sixth aspect, in a first possible implementation of the sixth aspect, different buffers in the plurality of buffers are used to compress different data packets.

With reference to the sixth aspect or the first possible implementation of the sixth aspect, in a second possible implementation of the sixth aspect, the first buffer is determined based on a serial number of the first data packet; or the first buffer is randomly determined.

With reference to the second possible implementation of the sixth aspect, in a third possible implementation of the sixth aspect, that the first buffer is determined based on a serial number of the first data packet includes: The first buffer is selected by the processing module in order from the plurality of buffers based on the serial number of the first data packet; or the first buffer is a buffer corresponding to a first serial number range to which the serial number of the first data packet belongs.

With reference to any one of the sixth aspect or the first possible implementation of the sixth aspect to the third possible implementation of the sixth aspect, in a fourth possible implementation of the sixth aspect, the processing module keeps content included in the first buffer unchanged when compressing, by using the first buffer, a plurality of data packets corresponding to the first buffer.

With reference to any one of the sixth aspect or the first possible implementation of the sixth aspect to the fourth possible implementation of the sixth aspect, in a fifth possible implementation of the sixth aspect,
the transceiver module is further configured to receive first signaling from the second device, where the first signaling indicates that the compressed first data packet is unsuccessfully decompressed; and
the processing module is further configured to reset the first buffer, and compress, by using a reset first buffer, a data packet corresponding to the first buffer.

With reference to any one of the sixth aspect or the first possible implementation of the sixth aspect to the fifth possible implementation of the sixth aspect, in a sixth possible implementation of the sixth aspect, the transceiver module is further configured to:
receive first signaling from the second device, where the first signaling indicates first information, and the first information includes information indicating that the compressed first data packet is not received, or includes information indicating that a compressed second data packet is unsuccessfully decompressed; and
send a second buffer or the compressed first data packet to the second device, where the compressed second data packet corresponds to the second buffer, and the second buffer includes the first data packet.

With reference to any one of the sixth aspect or the first possible implementation of the sixth aspect to the sixth possible implementation of the sixth aspect, in a seventh possible implementation of the sixth aspect, the plurality of buffers correspond to one data bearer or one signaling bearer.

For technical effects achieved in the sixth aspect or the possible implementations of the sixth aspect, refer to the descriptions of the technical effects achieved in the first aspect or the possible implementations of the first aspect.

According to a seventh aspect, a communication apparatus is provided. For example, the communication apparatus is the second communication apparatus described above. The communication apparatus is configured to perform the method according to any one of the second aspect or the possible implementations of the second aspect. Specifically, the communication apparatus may include modules configured to perform the method according to any one of the second aspect or the possible implementations of the second aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a second device. For example, the second device is a terminal device or a network device.

The transceiver module is configured to receive a compressed first data packet.

The processing module is configured to decompress the compressed first data packet by using a first buffer corresponding to the compressed first data packet, to obtain a first data packet, where the second device maintains a plurality of buffers used to decompress compressed data packets, and the first buffer is one of the plurality of buffers.

With reference to the seventh aspect, in a first possible implementation of the seventh aspect, different buffers in the plurality of buffers are used to compress different data packets.

With reference to the seventh aspect or the first possible implementation of the seventh aspect, in a second possible implementation of the seventh aspect, the processing module is further configured to:
determine one of the plurality of buffers as the first buffer based on a serial number of the first data packet; or
determine the first buffer based on first indication information carried in the compressed first data packet.

With reference to the second possible implementation of the seventh aspect, in a third possible implementation of the seventh aspect, the processing module is configured to determine one of the plurality of buffers as the first buffer based on the serial number of the first data packet in the following manner:
selecting one buffer in order from the plurality of buffers as the first buffer based on the serial number of the first data packet; or
determining that the serial number of the first data packet belongs to a first serial number range, and determining a buffer corresponding to the first serial number range as the first buffer.

With reference to the seventh aspect, the first possible implementation of the seventh aspect, the second possible implementation of the seventh aspect, or the third possible implementation of the seventh aspect, in a fourth possible implementation of the seventh aspect, the transceiver module is further configured to:
send first signaling to a first device, where the first signaling indicates first information, and the first information includes information indicating that the compressed first data packet is not received, or includes information indicating that a compressed second data packet is unsuccessfully decompressed; and
receive a second buffer or the compressed first data packet from the first device, where the compressed second data packet corresponds to the second buffer, and the second buffer includes the first data packet.

With reference to the seventh aspect, the first possible implementation of the seventh aspect, the second possible implementation of the seventh aspect, the third possible implementation of the seventh aspect, or the fourth possible implementation of the seventh aspect, in a fifth possible implementation of the seventh aspect, the plurality of buffers correspond to one data bearer or one signaling bearer.

For technical effects achieved in the seventh aspect or the possible implementations of the seventh aspect, refer to the descriptions of the technical effects achieved in the second aspect or the possible implementations of the second aspect.

According to an eighth aspect, a communication apparatus is provided. For example, the communication apparatus is the third communication apparatus described above. The communication apparatus is configured to perform the method according to any one of the third aspect or the possible implementations of the third aspect. Specifically, the communication apparatus may include modules configured to perform the method according to any one of the third aspect or the possible implementations of the third aspect.

For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a first device. For example, the first device is a terminal device or a network device.

The processing module is configured to compress a first data packet in M data packets by using a first buffer corresponding to the M data packets, to obtain a compressed first data packet, where M is a positive integer.

The transceiver module is configured to send the compressed first data packet to a second device.

With reference to the eighth aspect, in a first possible implementation of the eighth aspect, the M data packets are all data packets on a first data bearer or a first signaling bearer.

With reference to the eighth aspect, in a second possible implementation of the eighth aspect, the processing module is further configured to update the first buffer to a second buffer based on one or more data packets in the M data packets, where the second buffer is used to compress N data packets, serial numbers of the N data packets follow serial numbers of the M data packets, and N is a positive integer.

With reference to the second possible implementation of the eighth aspect, in a third possible implementation of the eighth aspect, the processing module is configured to update the first buffer to the second buffer based on the one or more data packets in the M data packets in the following manner: adding the one or more data packets to the first buffer based on the serial numbers of the M data packets, to obtain the second buffer.

With reference to the third possible implementation of the eighth aspect, in a fourth possible implementation of the eighth aspect, the transceiver module is further configured to receive first signaling from the second device, where the first signaling indicates serial numbers of one or more data packets, and the one or more data packets are data packets used to update the first buffer to the second buffer.

With reference to the third possible implementation of the eighth aspect, in a fifth possible implementation of the eighth aspect, compressed M data packets include compressed one or more data packets, the compressed one or more data packets carry first indication information, and the first indication information indicates that a corresponding data packet is used to update the first buffer to the second buffer.

With reference to any one of the third possible implementation of the eighth aspect to the fifth possible implementation of the eighth aspect, in a sixth possible implementation of the eighth aspect, the transceiver module is further configured to:
receive second signaling from the second device, where the second signaling indicates that the compressed first data packet is not received, or indicate that a compressed second data packet is unsuccessfully decompressed; and
send the second buffer or the compressed one or more data packets to the second device, where the compressed second data packet corresponds to the second buffer.

For technical effects achieved in the eighth aspect or the possible implementations of the eighth aspect, refer to the descriptions of the technical effects achieved in the third aspect or the possible implementations of the third aspect.

According to a ninth aspect, a communication apparatus is provided. For example, the communication apparatus is the fourth communication apparatus described above. The communication apparatus is configured to perform the method according to any one of the fourth aspect or the possible implementations of the fourth aspect. Specifically, the communication apparatus may include modules configured to perform the method according to any one of the fourth aspect or the possible implementations of the fourth aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a second device. For example, the second device is a terminal device or a network device.

The transceiver module is configured to receive a compressed first data packet from a first device.

The processing module is configured to decompress the compressed data packet by using a first buffer corresponding to the compressed first data packet, to obtain a first data packet, where the first buffer corresponds to compressed M data packets, the compressed first data packet is one of the compressed M data packets, and M is a positive integer.

With reference to the ninth aspect, in a first possible implementation of the ninth aspect, the M data packets are all data packets on a first data bearer or a first signaling bearer.

With reference to the ninth aspect, in a second possible implementation of the ninth aspect, the processing module is further configured to update the first buffer to a second buffer based on compressed one or more data packets in the compressed M data packets, where the second buffer is used to decompress compressed. N data packets, serial numbers of the compressed N data packets follow serial numbers of the compressed M data packets, and N is a positive integer.

With reference to the second possible implementation of the ninth aspect, in a third possible implementation of the ninth aspect, the processing module is configured to update the first buffer to the second buffer based on the compressed one or more data packets in the M compressed data packets in the following manner: adding, based on the serial numbers of the compressed M data packets, one or more data packets obtained by decompressing the compressed one or more data packets to the first buffer, to obtain the second buffer.

With reference to the third possible implementation of the ninth aspect, in a fourth possible implementation of the ninth aspect, the transceiver module is further configured to send first signaling to the second device, where the first signaling indicates serial numbers of one or more data packets, and the one or more data packets are data packets used to update the first buffer to the second buffer.

With reference to the third possible implementation of the ninth aspect, in a fifth possible implementation of the ninth aspect, the compressed one or more data packets carry first indication information, and the first indication information indicates that a corresponding compressed data packet is used to update the first buffer to the second buffer.

With reference to any one of the third possible implementation of the ninth aspect to the fifth possible implementation of the ninth aspect, in a sixth possible implementation of the ninth aspect, the transceiver module is further configured to:

send second signaling to the first device, where the second signaling indicates that the compressed first data packet is not received, or indicate that a compressed second data packet is unsuccessfully decompressed; and receive the second buffer or the compressed first data packet from the first device, where the compressed second data packet corresponds to the second buffer.

For technical effects achieved in the ninth aspect or the possible implementations of the ninth aspect, refer to the descriptions of the technical effects achieved in the fourth aspect or the possible implementations of the fourth aspect.

According to a tenth aspect, a communication apparatus is provided. For example, the communication apparatus is the fifth communication apparatus described above. The communication apparatus is configured to perform the method according to any one of the fifth aspect or the possible implementations of the fifth aspect. Specifically, the communication apparatus may include modules configured to perform the method according to any one of the fifth aspect or the possible implementations of the fifth aspect. For example, the communication apparatus includes a processing module and a transceiver module. The transceiver module may be one functional module. The functional module can implement both an information receiving function and an information sending function. Alternatively, the transceiver module may be a general term of a sending module and a receiving module. The sending module is configured to implement an information sending function, and the receiving module is configured to implement an information receiving function. For example, the communication apparatus is a first device. For example, the first device is a terminal device or a network device.

The processing module is configured to reset a buffer based on a first condition.

The transceiver module is configured to: compress a data packet by using a reset buffer, to obtain a compressed data packet; and send, by the first device, the compressed data packet to a second device.

With reference to the tenth aspect, in a first possible implementation of the tenth aspect, the first condition includes one of or any combination of the following:
  the buffer is reset by using first duration as a periodicity;
  the buffer is reset after every N data packets are compressed; or
  a total data amount of compressed data packets is greater than or equal to a first threshold.

With reference to the tenth aspect or the first possible implementation of the tenth aspect, in a second possible implementation of the tenth aspect, the transceiver module is further configured to receive first signaling from the second device, where when the first condition is that the buffer is reset by using the first duration as the periodicity, the first signaling indicates the first duration; when the first condition is that the buffer is reset after every N data packets are compressed, the first signaling indicates a value of N; or when the first condition is that the buffer is reset when the total data amount of compressed data packets is greater than or equal to the first threshold, the first signaling indicates the first threshold.

For technical effects achieved in the tenth aspect or the possible implementations of the tenth aspect, refer to the descriptions of the technical effects achieved in the fifth aspect or the possible implementations of the fifth aspect.

According to an eleventh aspect, a communication apparatus is provided. For example, the communication apparatus is the first communication apparatus described above. The communication apparatus includes a processor and a transceiver. The processor and the transceiver are configured to implement the method according to any one of the first aspect or the possible designs of the first aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a first device. For example, the first device is a terminal device or a network device.

The processor is configured to configure a plurality of buffers used to compress data packets.

The processor is further configured to compress a first data packet by using a first buffer, where the first buffer is one of the plurality of buffers.

The transceiver is configured to send a compressed first data packet to a second device.

With reference to the eleventh aspect, in a first possible implementation of the eleventh aspect, different buffers in the plurality of buffers are used to compress different data packets.

With reference to the eleventh aspect or the first possible implementation of the eleventh aspect, in a second possible implementation of the eleventh aspect, the first buffer is determined based on a serial number of the first data packet; or the first buffer is randomly determined.

With reference to the second possible implementation of the eleventh aspect, in a third possible implementation of the eleventh aspect, that the first buffer is determined based on a serial number of the first data packet includes: The first buffer is selected by the processor in order from the plurality of buffers based on the serial number of the first data packet; or the first buffer is a buffer corresponding to a first serial number range to which the serial number of the first data packet belongs.

With reference to any one of the eleventh aspect or the first possible implementation of the eleventh aspect to the third possible implementation of the eleventh aspect, in a fourth possible implementation of the eleventh aspect, the processor keeps content included in the first buffer unchanged when compressing, by using the first buffer, a plurality of data packets corresponding to the first buffer.

With reference to any one of the eleventh aspect or the first possible implementation of the eleventh aspect to the fourth possible implementation of the eleventh aspect, in a fifth possible implementation of the eleventh aspect,
  the transceiver is further configured to receive first signaling from the second device, where the first signaling indicates that the compressed first data packet is unsuccessfully decompressed; and
  the processor is further configured to reset the first buffer, and compress, by using a reset first buffer, a data packet corresponding to the first buffer.

With reference to any one of the eleventh aspect or the first possible implementation of the eleventh aspect to the fifth possible implementation of the eleventh aspect, in a sixth possible implementation of the eleventh aspect, the transceiver is further configured to:

receive first signaling from the second device, where the first signaling indicates first information, and the first information includes information indicating that the compressed first data packet is not received, or includes information indicating that a compressed second data packet is unsuccessfully decompressed; and send a second buffer or the compressed first data packet to the second device, where the compressed second data packet corresponds to the second buffer, and the second buffer includes the first data packet.

With reference to any one of the eleventh aspect or the first possible implementation of the eleventh aspect to the sixth possible implementation of the eleventh aspect, in a seventh possible implementation of the eleventh aspect, the plurality of buffers correspond to one data bearer or one signaling bearer.

For technical effects achieved in the eleventh aspect or the possible implementations of the eleventh aspect, refer to the descriptions of the technical effects achieved in the first aspect or the possible implementations of the first aspect.

According to a twelfth aspect, a communication apparatus is provided. For example, the communication apparatus is the second communication apparatus described above. The communication apparatus includes a processor and a transceiver. The processor and the transceiver are configured to implement the method according to any one of the second aspect or the possible designs of the second aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a second device. For example, the second device is a terminal device or a network device.

The transceiver is configured to receive a compressed first data packet.

The processor is configured to decompress the compressed first data packet by using a first buffer corresponding to the compressed first data packet, to obtain a first data packet, where the second device maintains a plurality of buffers used to decompress compressed data packets, and the first buffer is one of the plurality of buffers.

With reference to the twelfth aspect, in a first possible implementation of the twelfth aspect, different buffers in the plurality of buffers are used to compress different data packets.

With reference to the twelfth aspect or the first possible implementation of the twelfth aspect, in a second possible implementation of the twelfth aspect, the processor is further configured to:

determine one of the plurality of buffers as the first buffer based on a serial number of the first data packet; or determine the first buffer based on first indication information carried in the compressed first data packet.

With reference to the second possible implementation of the twelfth aspect, in a third possible implementation of the twelfth aspect, the processor is configured to determine one of the plurality of buffers as the first buffer based on the serial number of the first data packet in the following manner:

selecting one buffer in order from the plurality of buffers as the first buffer based on the serial number of the first data packet; or determining that the serial number of the first data packet belongs to a first serial number range, and determining a buffer corresponding to the first serial number range as the first buffer.

With reference to the twelfth aspect, the first possible implementation of the twelfth aspect, the second possible implementation of the twelfth aspect, or the third possible implementation of the twelfth aspect, in a fourth possible implementation of the twelfth aspect, the transceiver is further configured to:

send first signaling to a first device, where the first signaling indicates first information, and the first information includes information indicating that the compressed first data packet is not received, or includes information indicating that a compressed second data packet is unsuccessfully decompressed; and receive a second buffer or the compressed first data packet from the first device, where the compressed second data packet corresponds to the second buffer, and the second buffer includes the first data packet.

With reference to the twelfth aspect, the first possible implementation of the twelfth aspect, the second possible implementation of the twelfth aspect, or the third possible implementation of the twelfth aspect, in a fourth possible implementation of the twelfth aspect, the plurality of buffers correspond to one data bearer or one signaling bearer.

For technical effects achieved in the twelfth aspect or the possible implementations of the twelfth aspect, refer to the descriptions of the technical effects achieved in the second aspect or the possible implementations of the second aspect.

According to a thirteenth aspect, a communication apparatus is provided. For example, the communication apparatus is the third communication apparatus described above. The communication apparatus includes a processor and a transceiver. The processor and the transceiver are configured to implement the method according to any one of the third aspect or the possible designs of the third aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a first device. For example, the first device is a terminal device or a network device.

The processor is configured to compress a first data packet in M data packets by using a first buffer corresponding to the M data packets, to obtain a compressed first data packet, where M is a positive integer.

The transceiver is configured to send the compressed first data packet to a second device.

With reference to the thirteenth aspect, in a first possible implementation of the thirteenth aspect, the M data packets are all data packets on a first data bearer or a first signaling bearer.

With reference to the thirteenth aspect, in a second possible implementation of the thirteenth aspect, the processor is further configured to update the first buffer to a second buffer based on one or more data packets in the M data packets, where the second buffer is used to compress N data packets, serial numbers of the N data packets follow serial numbers of the M data packets, and N is a positive integer.

With reference to the second possible implementation of the thirteenth aspect, in a third possible implementation of the thirteenth aspect, the processor is configured to update the first buffer to the second buffer based on the one or more data packets in the M data packets in the following manner: adding the one or more data packets to the first buffer based on the serial numbers of the M data packets, to obtain the second buffer.

With reference to the third possible implementation of the thirteenth aspect, in a fourth possible implementation of the thirteenth aspect, the transceiver is further configured to receive first signaling from the second device, where the first signaling indicates serial numbers of one or more data packets, and the one or more data packets are data packets used to update the first buffer to the second buffer.

With reference to the third possible implementation of the thirteenth aspect, in a fifth possible implementation of the thirteenth aspect, compressed M data packets include compressed one or more data packets, the compressed one or more data packets carry first indication information, and the first indication information indicates that a corresponding data packet is used to update the first buffer to the second buffer.

With reference to any one of the third possible implementation of the thirteenth aspect to the fifth possible implementation of the thirteenth aspect, in a sixth possible implementation of the thirteenth aspect, the transceiver is further configured to:
receive second signaling from the second device, where the second signaling indicates that the compressed first data packet is not received, or indicate that a compressed second data packet is unsuccessfully decompressed; and
send the second buffer or the compressed one or more data packets to the second device, where the compressed second data packet corresponds to the second buffer.

For technical effects achieved in the thirteenth aspect or the possible implementations of the thirteenth aspect, refer to the descriptions of the technical effects achieved in the third aspect or the possible implementations of the third aspect.

According to a fourteenth aspect, a communication apparatus is provided. For example, the communication apparatus is the fourth communication apparatus described above. The communication apparatus includes a processor and a transceiver. The processor and the transceiver are configured to implement the method according to any one of the fourth aspect or the possible designs of the fourth aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a second device. For example, the second device is a terminal device or a network device.

The transceiver is configured to receive a compressed first data packet from a first device.

The processor is configured to decompress the compressed data packet by using a first buffer corresponding to the compressed first data packet, to obtain a first data packet, where the first buffer corresponds to compressed M data packets, the compressed first data packet is one of the compressed M data packets, and M is a positive integer.

With reference to the fourteenth aspect, in a first possible implementation of the fourteenth aspect, the Ni data packets are all data packets on a first data bearer or a first signaling bearer.

With reference to the fourteenth aspect, in a second possible implementation of the fourteenth aspect, the processor is further configured to update the first buffer to a second buffer based on compressed one or more data packets in the compressed M data packets, where the second buffer is used to decompress compressed N data packets, serial numbers of the compressed N data packets follow serial numbers of the compressed M data packets, and N is a positive integer.

With reference to the second possible implementation of the fourteenth aspect, in a third possible implementation of the fourteenth aspect, the processor is configured to update the first buffer to the second buffer based on the compressed one or more data packets in the M compressed data packets in the following manner: adding, based on the serial numbers of the compressed M data packets, one or more data packets obtained by decompressing the compressed one or more data packets to the first buffer, to obtain the second buffer.

With reference to the third possible implementation of the fourteenth aspect, in a fourth possible implementation of the fourteenth aspect, the transceiver is further configured to send first signaling to the second device, where the first signaling indicates serial numbers of one or more data packets, and the one or more data packets are data packets used to update the first buffer to the second buffer.

With reference to the third possible implementation of the fourteenth aspect, in a fifth possible implementation of the fourteenth aspect, the compressed one or more data packets carry first indication information, and the first indication information indicates that a corresponding compressed data packet is used to update the first buffer to the second buffer.

With reference to any one of the third possible implementation of the fourteenth aspect to the fifth possible implementation of the fourteenth aspect, in a sixth possible implementation of the fourteenth aspect, the transceiver is further configured to:
send second signaling to the first device, where the second signaling indicates that the compressed first data packet is not received, or indicate that a compressed second data packet is unsuccessfully decompressed; and
receive the second buffer or the compressed first data packet from the first device, where the compressed second data packet corresponds to the second buffer.

For technical effects achieved in the fourteenth aspect or the possible implementations of the fourteenth aspect, refer to the descriptions of the technical effects achieved in the fourth aspect or the possible implementations of the fourth aspect.

According to a fifteenth aspect, a communication apparatus is provided. For example, the communication apparatus is the fifth communication apparatus described above.

The communication apparatus includes a processor and a transceiver. The processor and the transceiver are configured to implement the method according to any one of the fifth aspect or the possible designs of the fifth aspect. For example, the communication apparatus is a chip disposed in a communication device. For example, the transceiver is implemented by using an antenna, a feeder, and a codec in the communication device. Alternatively, if the communication apparatus is a chip disposed in a communication device, the transceiver is, for example, a communication interface on the chip. The communication interface is connected to a radio frequency transceiver component in the communication device, to receive and send information by using the radio frequency transceiver component. For example, the communication device is a first device. For example, the first device is a terminal device or a network device.

The processor is configured to reset a buffer based on a first condition.

The transceiver is configured to: compress a data packet by using a reset buffer, to obtain a compressed data packet; and send, by the first device, the compressed data packet to a second device.

With reference to the fifteenth aspect, in a first possible implementation of the fifteenth aspect, the first condition includes one of or any combination of the following:
 the buffer is reset by using first duration as a periodicity;
 the buffer is reset after every N data packets are compressed; or
 a total data amount of compressed data packets is greater than or equal to a first threshold.

With reference to the fifteenth aspect or the first possible implementation of the fifteenth aspect, in a second possible implementation of the fifteenth aspect, the transceiver is further configured to receive first signaling from the second device, where when the first condition is that the buffer is reset by using the first duration as the periodicity, the first signaling indicates the first duration; when the first condition is that the buffer is reset after every N data packets are compressed, the first signaling indicates a value of N; or when the first condition is that the buffer is reset when the total data amount of compressed data packets is greater than or equal to the first threshold, the first signaling indicates the first threshold.

For technical effects achieved in the fifteenth aspect or the possible implementations of the fifteenth aspect, refer to the descriptions of the technical effects achieved in the fifth aspect or the possible implementations of the fifth aspect.

According to a sixteenth aspect, a communication method is provided. The communication apparatus may be the first communication apparatus in the foregoing method design. For example, the communication apparatus is a chip disposed in a communication device. For example, the communication device is a first device. For example, the first device is a terminal device or a network device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the first aspect or the possible implementations of the first aspect.

The communication apparatus may further include a communication interface. The communication interface may be a transceiver in the first device, and for example, implemented by using an antenna, a feeder, and a codec in the communication apparatus. Alternatively, if the communication apparatus is a chip disposed in the first device, the communication interface may be an input/output interface on the chip, for example, an input/output pin.

According to a seventeenth aspect, a communication apparatus is provided. The communication apparatus may be the second communication apparatus in the foregoing method design. For example, the communication apparatus is a chip disposed in a communication device. For example, the communication device is a second device. For example, the second device is a terminal device or a network device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the second aspect or the possible implementations of the second aspect.

The communication apparatus may further include a communication interface. The communication interface may be a transceiver in the second device, and for example, implemented by using an antenna, a feeder, and a codec in the communication apparatus. Alternatively, if the communication apparatus is a chip disposed in the second device, the communication interface may be an input/output interface on the chip, for example, an input/output pin.

According to an eighteenth aspect, a communication apparatus is provided. The communication apparatus may be the third communication apparatus in the foregoing method design. For example, the communication apparatus is a chip disposed in a communication device. For example, the communication device is a first device. For example, the first device is a terminal device or a network device. The communication apparatus includes: a memory, configured to store computer-executable program code: and a processor, where the processor is coupled to the memory. The program code stored in the memory includes instructions. When the processor executes the instructions, the communication apparatus is enabled to perform the method according to any one of the third aspect or the possible implementations of the third aspect.

The communication apparatus may further include a communication interface. The communication interface may be a transceiver in the first device, and for example, implemented by using an antenna, a feeder, and a codec in the communication apparatus. Alternatively, if the communication apparatus is a chip disposed in the first device, the communication interface may be an input/output interface on the chip, for example, an input/output pin.

According to a nineteenth aspect, a communication apparatus is provided. The communication apparatus may be the fourth communication apparatus in the foregoing method design. For example, the communication apparatus is a chip disposed in a communication device. For example, the communication device is a second device. For example, the second device is a terminal device or a network device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the fourth aspect or the possible implementations of the fourth aspect.

The communication apparatus may further include a communication interface. The communication interface may be a transceiver in the second device, and for example, implemented by using an antenna, a feeder, and a codec in the communication apparatus. Alternatively, if the communication apparatus is a chip disposed in the second device, the communication interface may be an input/output interface on the chip, for example, an input/output pin.

According to a twentieth aspect, a communication apparatus is provided. The communication apparatus may be the fifth communication apparatus in the foregoing method design. For example, the communication apparatus is a chip disposed in a communication device. For example, the communication device is a first device. For example, the first device is a terminal device or a network device. The communication apparatus includes: a memory, configured to store computer-executable program code; and a processor, where the processor is coupled to the memory. The program code stored in the memory includes instructions. When the processor executes the instructions, the communication apparatus is enabled to perform the method according to any one of the fifth aspect or the possible implementations of the fifth aspect.

The communication apparatus may further include a communication interface. The communication interface may be a transceiver in the first device, and for example, implemented by using an antenna, a feeder, and a codec in the communication apparatus. Alternatively, if the communication apparatus is a chip disposed in the first device, the communication interface may be an input/output interface on the chip, for example, an input/output pin.

According to a twenty-first aspect, a communication system is provided. The communication system may include the communication apparatus according to the sixth aspect, the communication apparatus according to the eleventh aspect, or the communication apparatus according to the sixteenth aspect, and include the communication apparatus according to the seventh aspect, the communication apparatus according to the twelfth aspect, or the communication apparatus according to the seventeenth aspect.

According to a twenty-second aspect, a communication system is provided. The communication system may include the communication apparatus according to the eighth aspect, the communication apparatus according to the thirteenth aspect, or the communication apparatus according to the eighteenth aspect, and include the communication apparatus according to the ninth aspect, the communication apparatus according to the fourteenth aspect, or the communication apparatus according to the nineteenth aspect.

The communication system according to the twenty-first aspect and the communication system according to the twenty-second aspect may be a same communication system, or may be different communication systems.

According to a twenty-third aspect, a computer storage medium is provided. The computer-readable storage medium stores instructions. When the instructions are run on a computer, the computer is enabled to perform the method according to any one of the first aspect or the possible designs of the first aspect.

According to a twenty-fourth aspect, a computer storage medium is provided. The computer-readable storage medium stores instructions. When the instructions are run on a computer, the computer is enabled to perform the method according to any one of the second aspect or the possible designs of the second aspect.

According to a twenty-fifth aspect, a computer storage medium is provided. The computer-readable storage medium stores instructions. When the instructions are run on a computer, the computer is enabled to perform the method according to any one of the third aspect or the possible designs of the third aspect.

According to a twenty-sixth aspect, a computer storage medium is provided. The computer-readable storage medium stores instructions. When the instructions are run on a computer, the computer is enabled to perform the method according to any one of the fourth aspect or the possible designs of the fourth aspect.

According to a twenty-seventh aspect, a computer storage medium is provided. The computer-readable storage medium stores instructions. When the instructions are run on a computer, the computer is enabled to perform the method according to any one of the fifth aspect or the possible designs of the fifth aspect.

According to a twenty-eighth aspect, a computer program product including instructions is provided. The computer program product stores the instructions. When the instructions are run on a computer, the computer is enabled to perform the method according to any one of the first aspect or the possible designs of the first aspect.

According to a twenty-ninth aspect, a computer program product including instructions is provided. The computer program product stores the instructions. When the instructions are run on a computer, the computer is enabled to perform the method according to any one of the second aspect or the possible designs of the second aspect.

According to a thirtieth aspect, a computer program product including instructions is provided. The computer program product stores the instructions. When the instructions are run on a computer, the computer is enabled to perform the method according to any one of the third aspect or the possible designs of the third aspect.

According to a thirty-first aspect, a computer program product including instructions is provided. The computer program product stores the instructions. When the instructions are run on a computer, the computer is enabled to perform the method according to any one of the fourth aspect or the possible designs of the fourth aspect.

According to a thirty-second aspect, a computer program product including instructions is provided. The computer program product stores the instructions. When the instructions are run on a computer, the computer is enabled to perform the method according to any one of the fifth aspect or the possible designs of the fifth aspect.

According to the manners provided in the embodiments of this application, a quantity of data packets affected by lost data packets can be decreased, and therefore a quantity of lost data packets is decreased.

Figure 12:
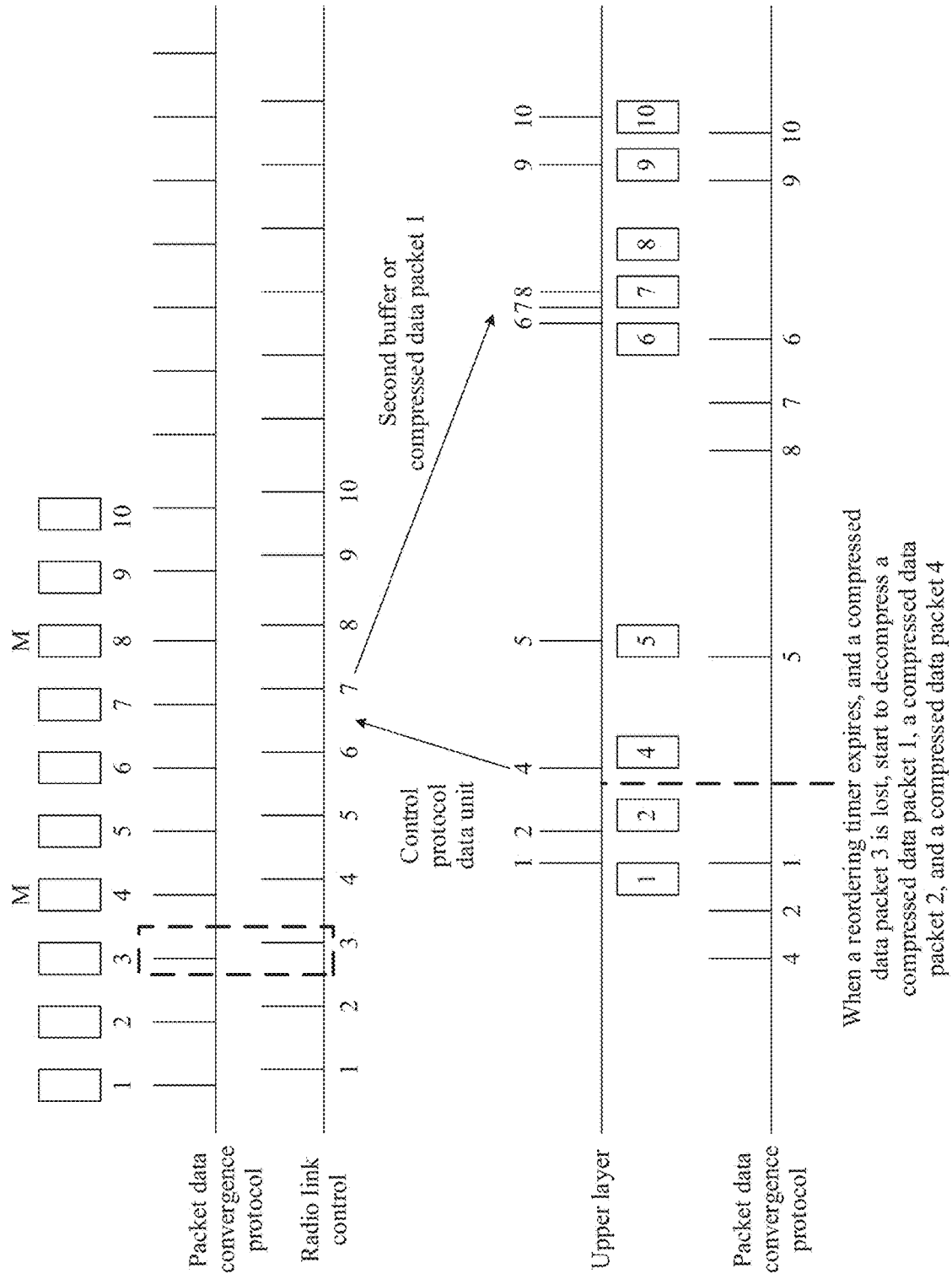
Figure 13:
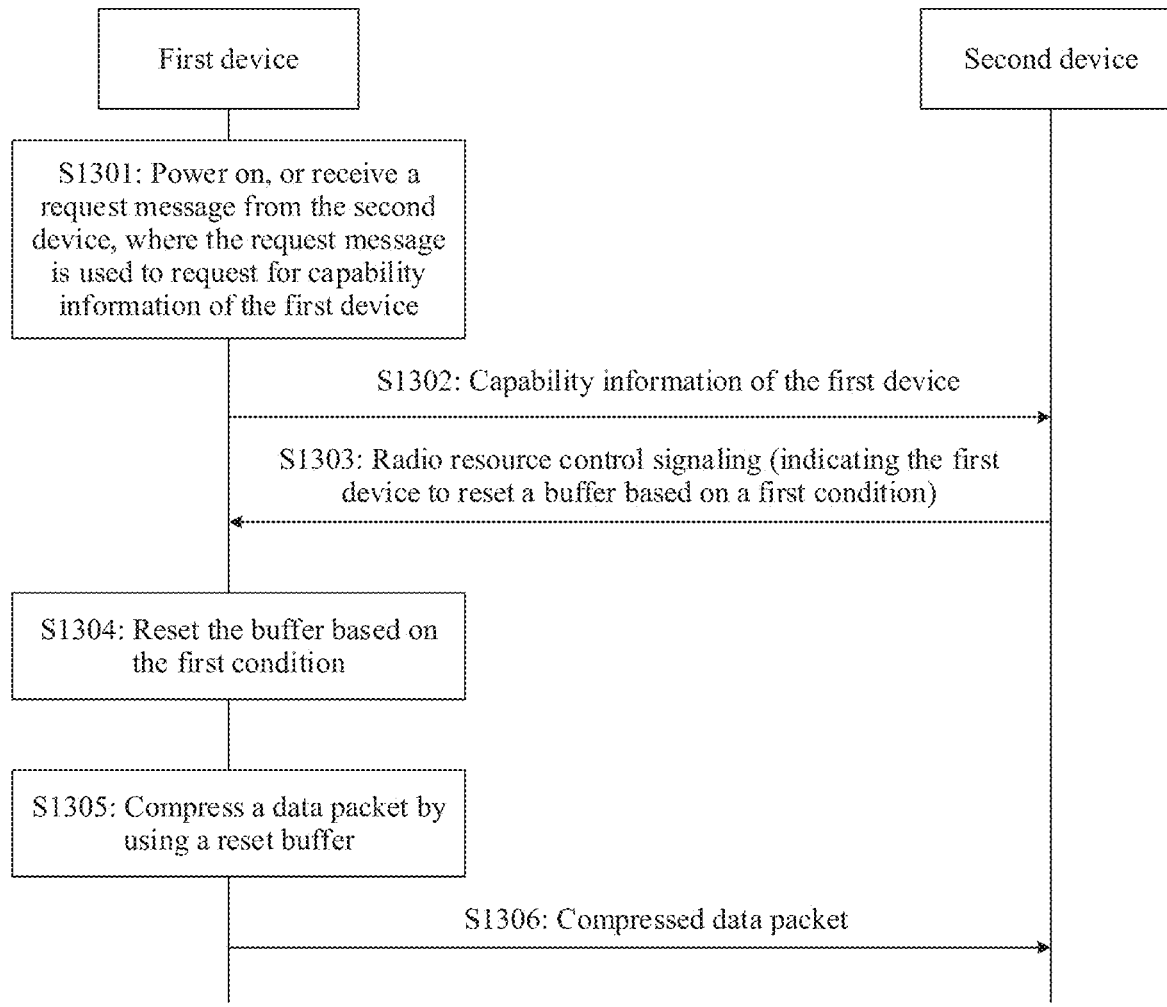
Figure 14:
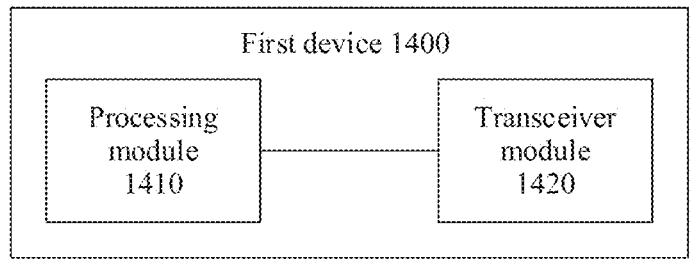
Figure 15:
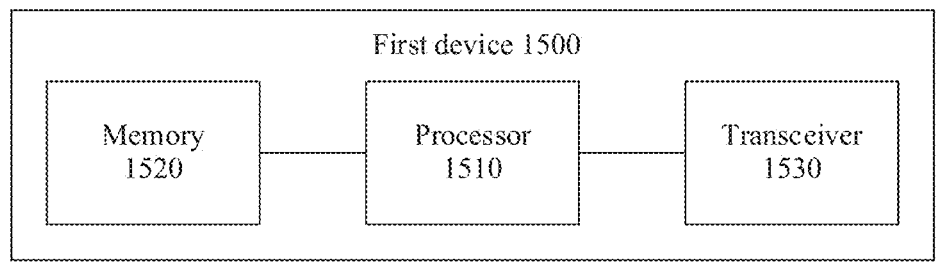
Figure 16:
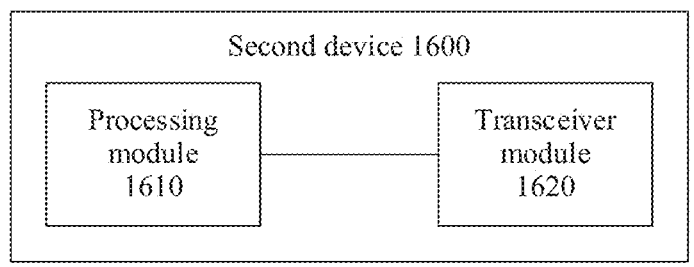
Figure 17:
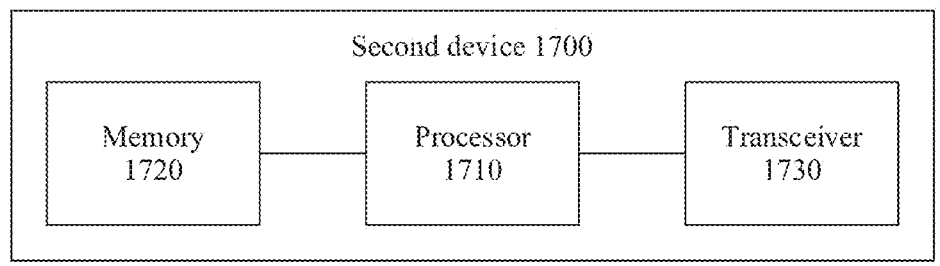
Figure 18:
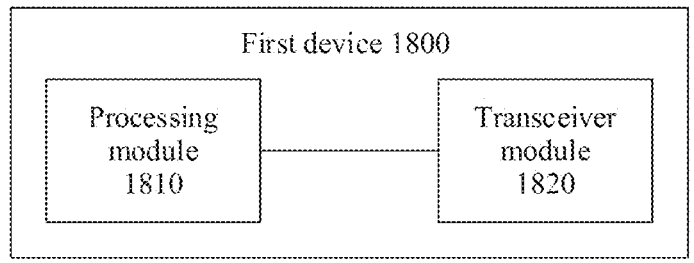
Figure 19:
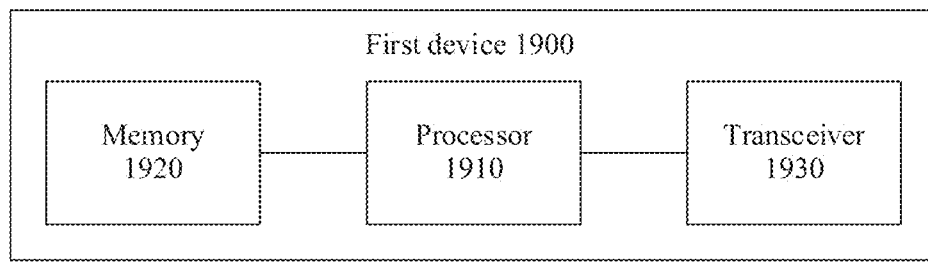
Figure 20:
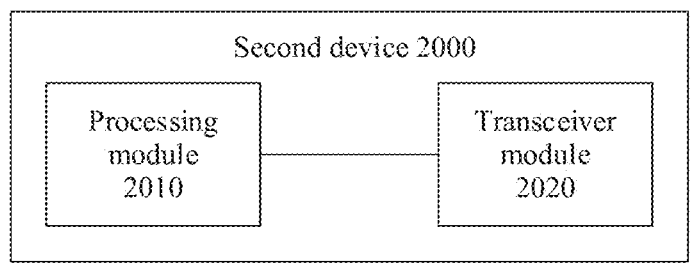
Figure 21:
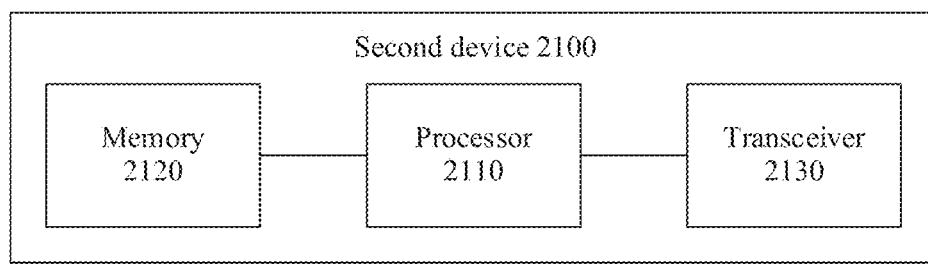
Figure 22:
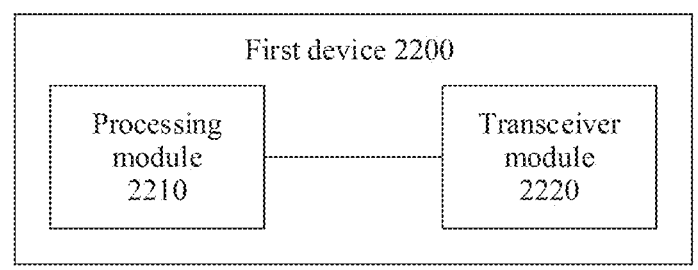
Figure 23:
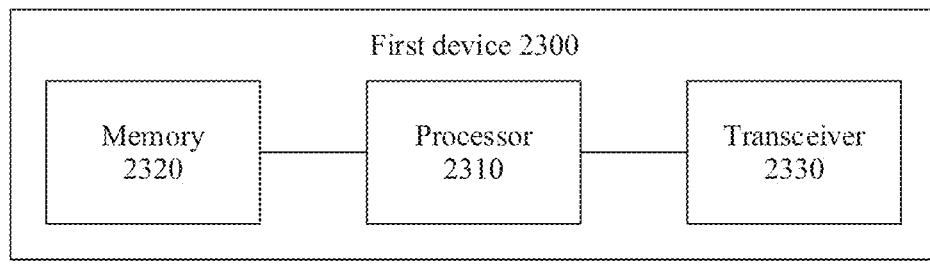
Figure 24:
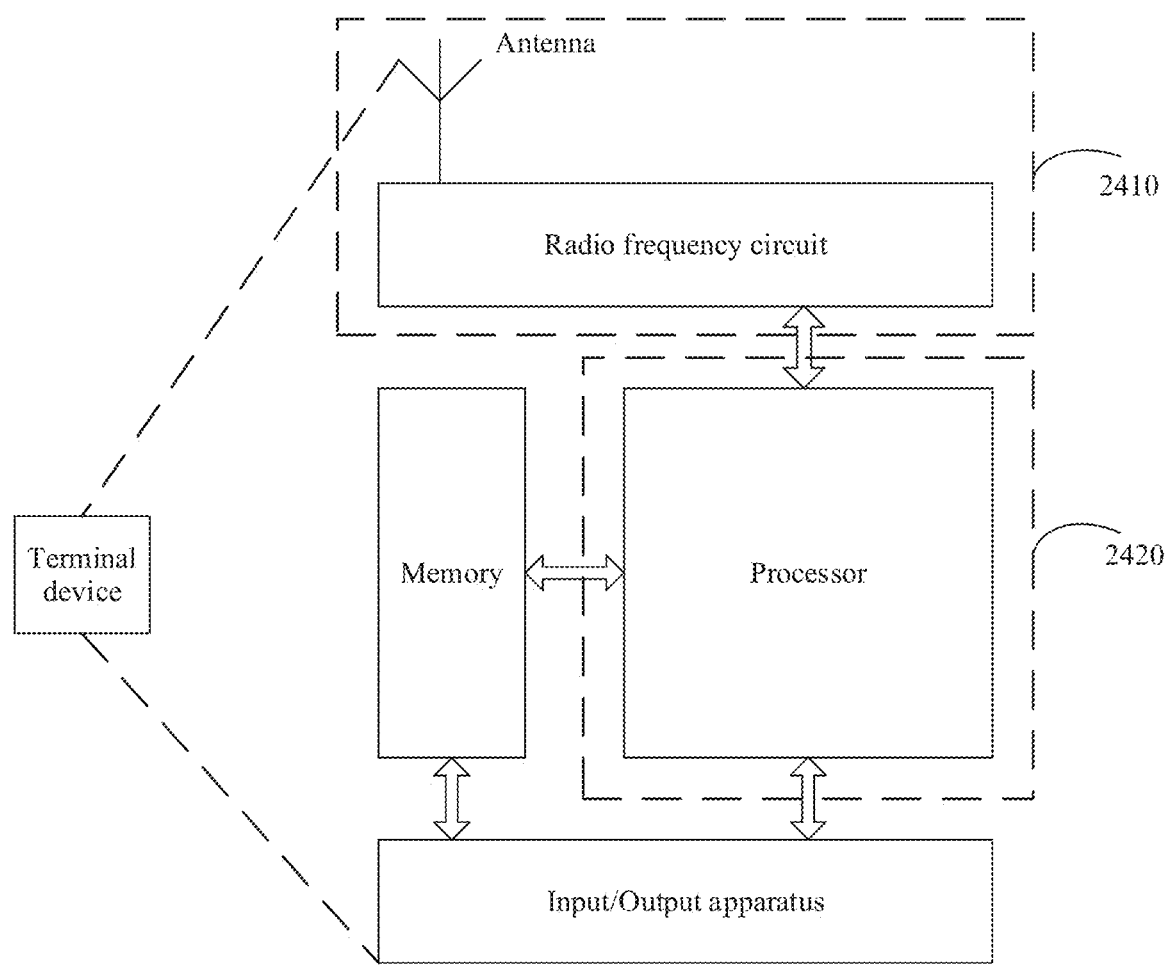
Figure 25:
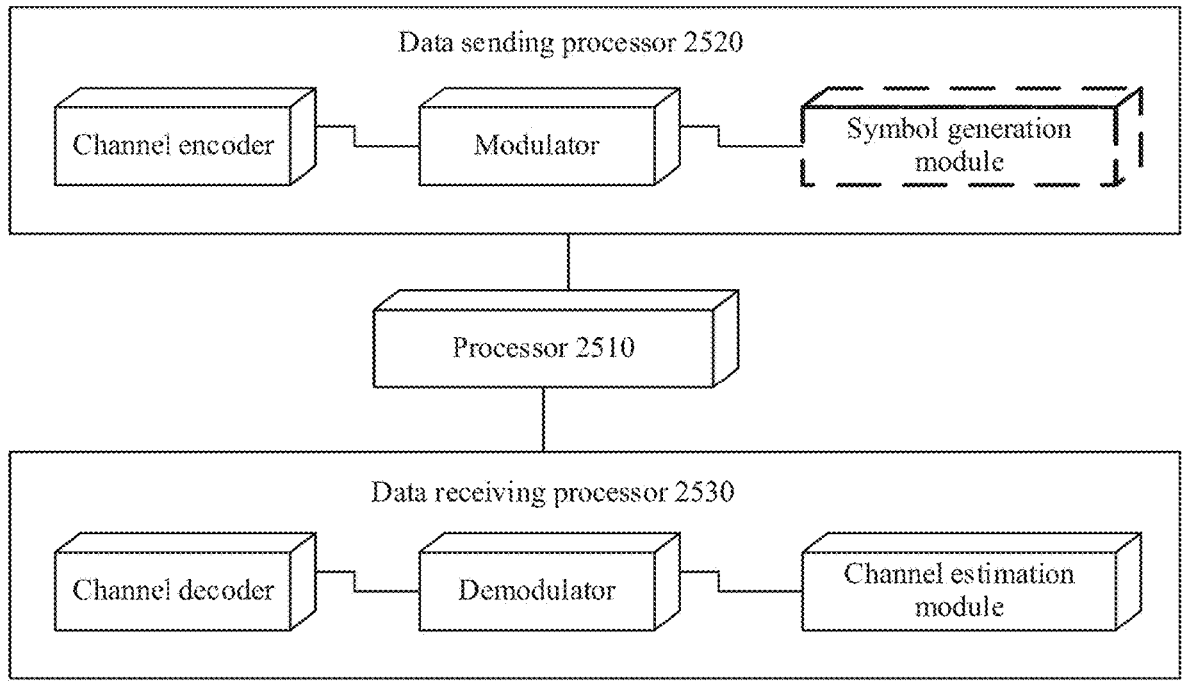
Figure 26:
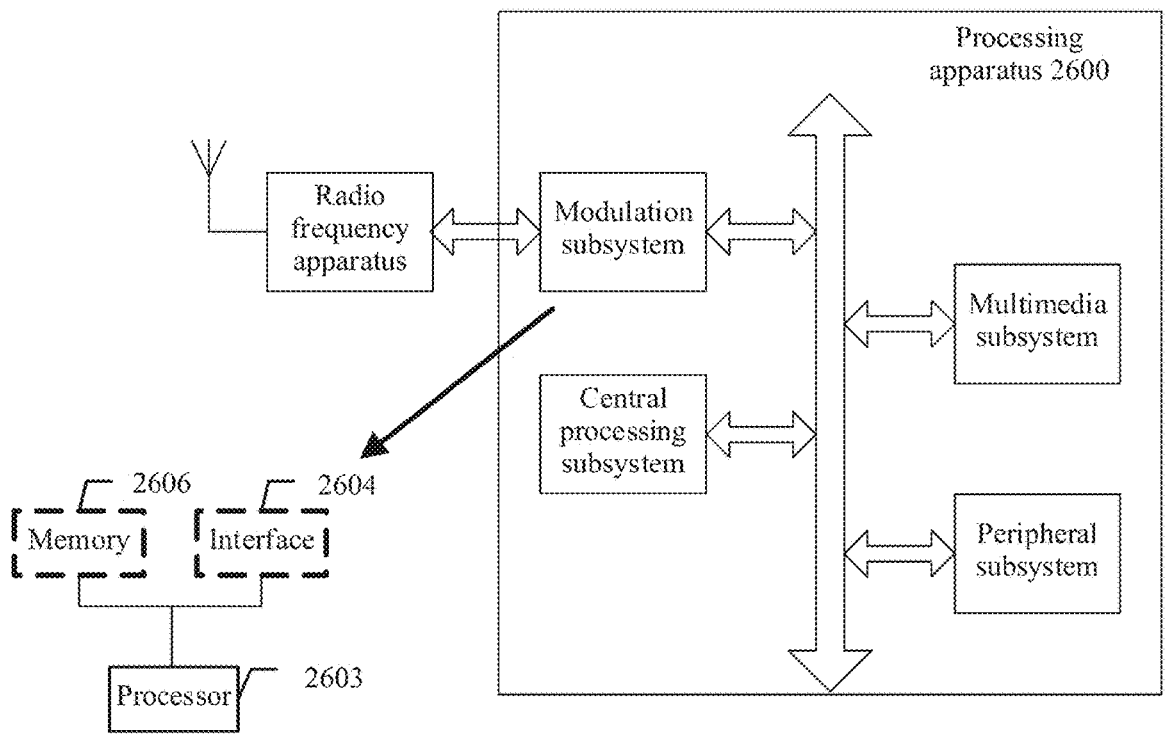

FIG. II is a flowchart of a second communication method according to an embodiment of this application;

FIG. 12 is a schematic diagram of a processing process in an NR system according to an embodiment of this application;

FIG. 13 is a flowchart of a third communication method according to an embodiment of this application;

FIG. 14 is a schematic block diagram of a first device of a first type according to an embodiment of this application;

FIG. 15 is another schematic block diagram of a first device of a first type according to an embodiment of this application;

FIG. 16 is a schematic block diagram of a second device of a first type according to an embodiment of this application;

FIG. 17 is another schematic block diagram of a second device of a first type according to an embodiment of this application;

FIG. 18 is a schematic block diagram of a first device of a second type according to an embodiment of this application;

FIG. 19 is another schematic block diagram of a first device of a second type according to an embodiment of this application;

FIG. 20 is a schematic block diagram of a second device of a second type according to an embodiment of this application;

FIG. 21 is another schematic block diagram of a second device of a second type according to an embodiment of this application;

FIG. 22 is a schematic block diagram of a first device of a third type according to an embodiment of this application;

FIG. 23 is another schematic block diagram of a first device of a third type according to an embodiment of this application;

FIG. 24 is a schematic block diagram of a communication apparatus according to an embodiment of this application;

FIG. 25 is another schematic block diagram of a communication apparatus according to an embodiment of this application; and FIG. 26 is still another schematic block diagram of a communication apparatus according to an embodiment of this application.

DESCRIPTION OF EMBODIMENTS

To make the objectives, technical solutions, and advantages of the embodiments of this application clearer, the following further describes the embodiments of this application in detail with reference to the accompanying drawings.

The following describes some terms in the embodiments of this application, to help a person skilled in the art have a better understanding.

(1) Terminal device: The terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (radio access network, RAN), and exchange a voice or data with the RAN, or exchange a voice and data with the RAN. The terminal device may include user equipment (user equipment, UE), a wireless terminal device, a mobile terminal device, a device-to-device (device-to-device, D2D) communication terminal device, a vehicle-to-everything (vehicle to everything, V2X) terminal device, a machine-to-machine/machine type communication (machine-to-machine/machine type communication, M2M/MTC) terminal device, an internet of things (internet of things, IoT) terminal device, a subscriber unit (subscriber unit), a subscriber station (subscriber station), a mobile station (mobile station remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device with relatively low power consumption, a device with a limited storage capability, or a device with a limited computing capability. For example, the terminal device includes an information sensing device such as a barcode reader, a radio frequency identification (radio frequency identification, RFID) device, a sensor, a global positioning system (global positioning system, GPS), or a laser scanner.

By way of example but not limitation, the terminal device in the embodiments of this application may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (on-board unit, OBU).

In the embodiments of this application, the terminal device may further include a relay (relay). Alternatively, it may be understood that any device that can perform data communication with a base station may be considered as the terminal device.

(2) Network device: The network device includes, for example, an access network (access network, AN) device such as a base station (for example, an access point), and may be a device that communicates with a wireless terminal device through an air interface by using one or more cells in an access network. Alternatively, for example, the network device in a vehicle-to-everything (vehicle-to-everything, V2X) technology is a road side unit (road side unit, RSU). The base station may be configured to perform mutual conversion between a received over-the-air frame and an IP packet, and serve as a router between a terminal device and a remaining part of the access network, where the remaining part of the access network may include an IP network. The RSU array be a fixed infrastructure entity supporting a V2X application, and may exchange a message with another entity supporting the V2X application. The network device may further coordinate attribute management of the air interface. For example, the network device may include an evolved NodeB (NodeB or eNB or eNodeB, evolved NodeB) in a long term evolution (long term evolution, LTE) system or a long term evolution-advanced (long term evolution-advanced, LTE-A) system, may include a next generation NodeB (next generation NodeB, gNB) in a $5^{th}$ generation ($5^{th}$ generation, 5G) new radio (new radio, NR) system (also briefly referred to as an NR system), or may include a centralized unit (centralized unit, CU) and a distributed unit (distributed unit, DU) in a cloud radio access network (cloud radio access network, Cloud RAN) system. This is not limited in the embodiments of this application.

A receiving device in the embodiments of this application may be a terminal device, or may be a network device. A sending device configured to send a data packet in the embodiments of this application may also be a terminal device, or may also be a network device. In addition, for example, in a case, the sending device is a network device, and the receiving device is a terminal device; in another case, both the sending device and the receiving device are network devices; in still another case, both the sending device and the receiving device are terminal devices. This is not specifically limited.

(3) The terms "system" and "network" may be used interchangeably in the embodiments of this application. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit an order, a time sequence, priorities, or importance of the plurality of objects. For example, a first data packet and a second data packet are merely used to distinguish between different data packets, but do not indicate that content, priorities, a sending order, importance, or the like of the two data packets are different.

The foregoing describes concepts of some names used in the embodiments of this application. The following describes technical features of the embodiments of this application.

In an LTE system, a UDC technology is introduced and implemented at a PDCP layer. The UDC technology is mainly used for some data packets having a large amount of duplicate content, for example, data packets used for transmitting SIP in VoLTE. In the UDC technology, a difference part between data packets is transmitted, to reduce an amount of data that needs to be transmitted.

Figure 1:
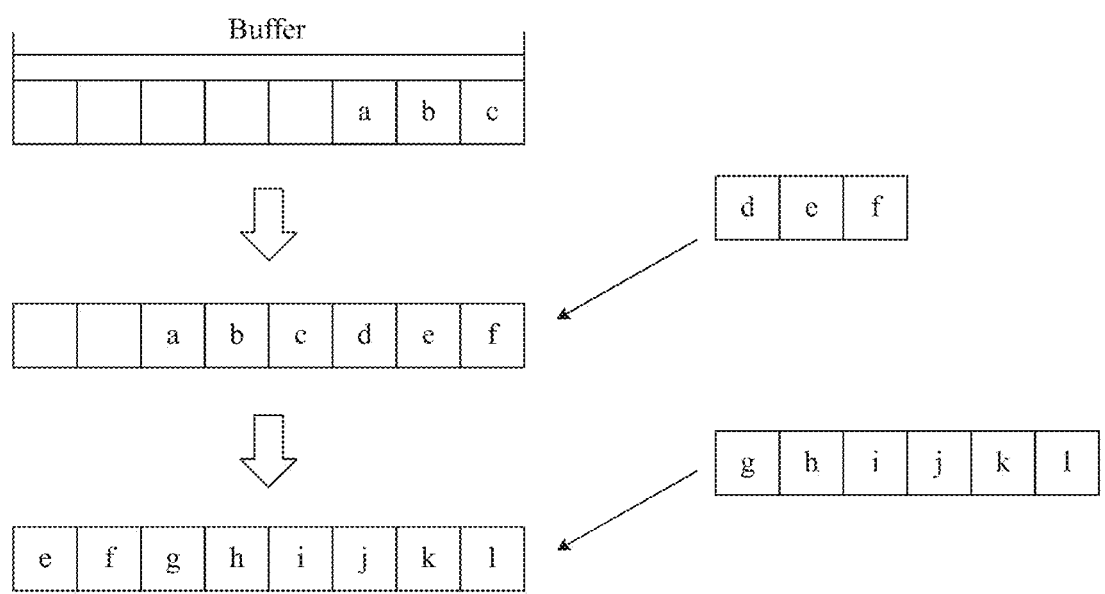
FIG. 1 is a schematic diagram of a UDC technology.

In the UDC, a terminal device serves as a transmit end to compress a data packet, and a network device serves as a receive end to decompress a data packet. Both compression and decompression are performed based on a same buffer state that is jointly maintained by the transmit end and the receive end. The buffer state may be content included in a buffer (or information included in a buffer). When compressing a data packet, the transmit end compresses the data packet based on a current buffer state. After successfully compressing the data packet, the transmit end places original information (before compression) of a currently compressed data packet from a backend of a buffer into the buffer. When the $1^{st}$ data packet is compressed, the buffer may not include information about a previous data packet. In this case, the transmit end may compress the $1^{st}$ data packet based on preset information. For example, the preset information is a predefined dictionary. For example, as shown in FIG. 1, the buffer includes "abc". For example, "abc" is the preset information. When the transmit end needs to compress a data packet "def", the transmit end may compress the data packet "def" based on "abc". After compressing the data packet "def" and obtaining a compressed data packet 1, the transmit end may place "def" from the backend of the buffer into the buffer. Then, when the transmit end needs to compress a data packet "ghijkl", the transmit end may compress the data packet "ghijkl" based on "abcdef" in the buffer. In other words, the transmit end performs compression based on all content in the buffer each time. After compressing the data packet "ghijkl" and obtaining a compressed data packet 2, the transmit end may place the data packet "ghijkl" from the backend of the buffer into the buffer. Because storage space of the buffer is limited. "abcd" is squeezed out of the buffer according to a first in first out (first in first out, FIFO) principle. In this case, if the transmit end needs to compress another data packet, the transmit end performs compression based on "efghijkl" included in the buffer. After receiving the compressed data packet 1, the receive end may decompress the compressed data packet 1 based on the preset information "abc" in a buffer, to obtain the data packet "def", and place the data packet "def" from a backend of the buffer into the buffer. After receiving the data packet 2, the receive end may decompress the data packet 2 based on the information "abcdef" in the buffer, to obtain the data packet "ghijkl", and place the data packet "ghijkl" from the backend of the buffer into the buffer. In this case, "abcd" is squeezed out of the buffer. It can be learned that the buffer state of the receive end keeps consistent with the buffer state of the transmit end. This can ensure that the receive end can correctly perform decompression.

Figure 2:
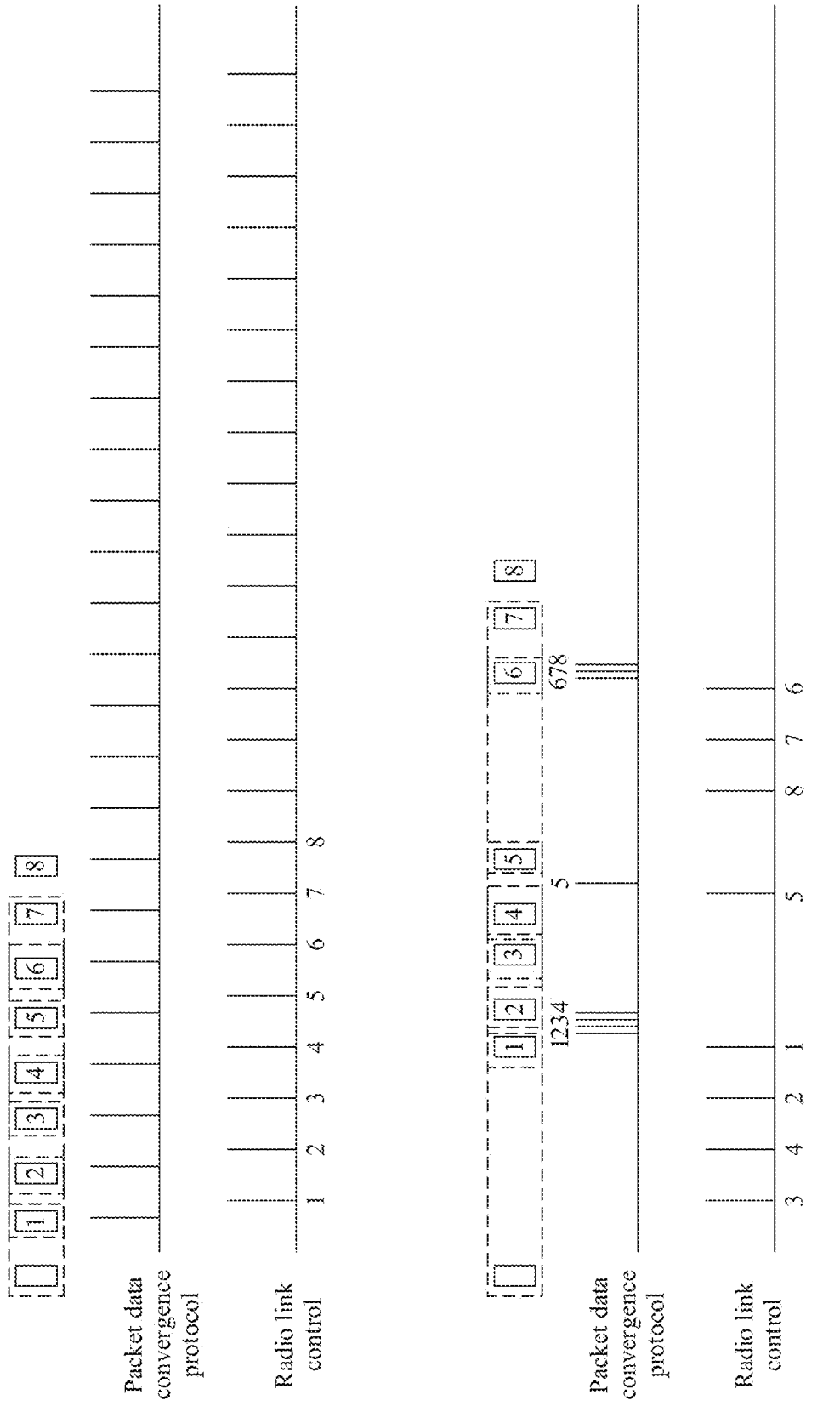
FIG. 2 is a schematic diagram of a data packet compression and decompression process in an LTE system.

FIG. 2 shows a data packet compression and decompression process in an LTE system. PDCP and RLC in upper two rows in FIG. 2 represent a PDCP layer and an RLC layer of a transmit end. For example, a size of a buffer is two data packets. Each dashed-line box represents content included in the buffer. In addition, a dashed-line box including "/" represents preset information included in the buffer. Each data packet is compressed based on content currently included in the buffer. PDCP and RLC in lower two rows in FIG. 2 represent a PDCP layer and an RLC layer of a receive end. In AM mode, the RLC layer supports a data retransmission mechanism. Therefore, although the transmit end sends data packets in order, the receive end may receive compressed data packets out of order. In the LTE system, the RLC layer of the receive end orders the received compressed data packets, and then transfers the ordered compressed data packets to the PDCP layer. For example, in FIG. 2, the RLC layer of the receive end receives a compressed data packet 1, a compressed data packet 2, a compressed data packet 3, and a compressed data packet 4 in order of the compressed data packet 3, the compressed data packet 4, the compressed data packet 2, and the compressed data packet 1. In this case, after receiving the compressed data packet 1, the RLC layer orders the four compressed data packets, and then transfers the four compressed data packets to the PDCP layer in regular order. After receiving the four compressed data packets, the PDCP layer sequentially decompresses the four compressed data packets. Then, the receive end receives a compressed data packet 5, the RLC layer of the receive end transfers the compressed data packet 5 to the PDCP layer, and the PDCP layer decompresses the compressed data packet 5. Then, the receive end further receives a compressed data packet 6, a compressed data packet 7, and a compressed data packet 8, and the receive end receives the three compressed data packets in order of the compressed data packet 8, the compressed data packet 7, and the compressed data packet 6. In this case, after receiving the compressed data packet 6, the RLC layer of the receive end orders the three compressed data packets, and then transfers the ordered three compressed data packets to the PDCP layer. After receiving the three compressed data packets, the PDCP layer sequentially decompresses the three compressed data packets. For example, the PDCP layer decompresses the compressed data packet 1 based on preset information included in the buffer, the PDCP layer decompresses the compressed data packet 2 based on the preset information included in the buffer and information obtained by decompressing the compressed data packet 1, and the PDCP layer decompresses the compressed data packet 3 based on the information obtained by decompressing the compressed data packet 1 and information obtained by decompressing the compressed data packet 2 (it is assumed that the buffer can accommodate content of two data packets, and therefore it is considered that the preset information has been squeezed out of the buffer). The rest may be deduced by analogy. All serial numbers of data packets (or serial numbers of compressed data packets) shown in FIG. 2 are sequence numbers (sequence number, SN) of the data packets at the PDCP layer, or the serial numbers may alternatively be understood as count (count) values of the data packets at the PDCP layer.

Generally, the PDCP layer of the receive end receives compressed data packets in order, to ensure that the buffer of the receive end is aligned with the buffer of the transmit end and that decompression is implemented in order.

In UM mode in the current LTE, after the transmit end sends compressed data packets, a data packet loss phenomenon may occur in a transmission process. As a result, the receive end cannot receive some compressed data packets. For example, if the transmit end sends a compressed data packet 1, a compressed data packet 2, a compressed data packet 3, and a compressed data packet 4, and the compressed data packet 3 is lost in a transmission process, the PDCP layer of the receive end can receive only the compressed data packet 1, the compressed data packet 2, and the compressed data packet 4. Because the PDCP layer of the transmit end obtains the compressed data packet 4 through compression by using information about the compressed data packet 3, but the PDCP layer of the receive end does not have the compressed data packet 3, an error occurs when the PDCP layer of the receive end decompresses the compressed data packet 4. In the LTE system, there is a feedback mechanism for a decompression error in the UDC. When finding the decompression error, the receive end may send a control PDU to the transmit end, to indicate the decompression error. After receiving the control PDU, the transmit end resets (reset) the buffer starting from a currently to-be-compressed data packet, compresses a subsequent data packet by using a reset buffer, and indicates, in a UDC header of a compressed data packet, that the compressed data packet is a compressed data packet obtained after the buffer is reset. After receiving the compressed data packet, the receive end may determine, based on the UDC header of the compressed data packet, that the compressed data packet is compressed by using the reset buffer. Then, the receive end also resets the buffer, and decompresses the compressed data packet by using the reset buffer. In this case, the receive end does not need to decompress the compressed data packet based on a previous data packet. This reduces dependence on the previous data packet, and decreases an occurrence probability of a decompression error.

Figure 3:
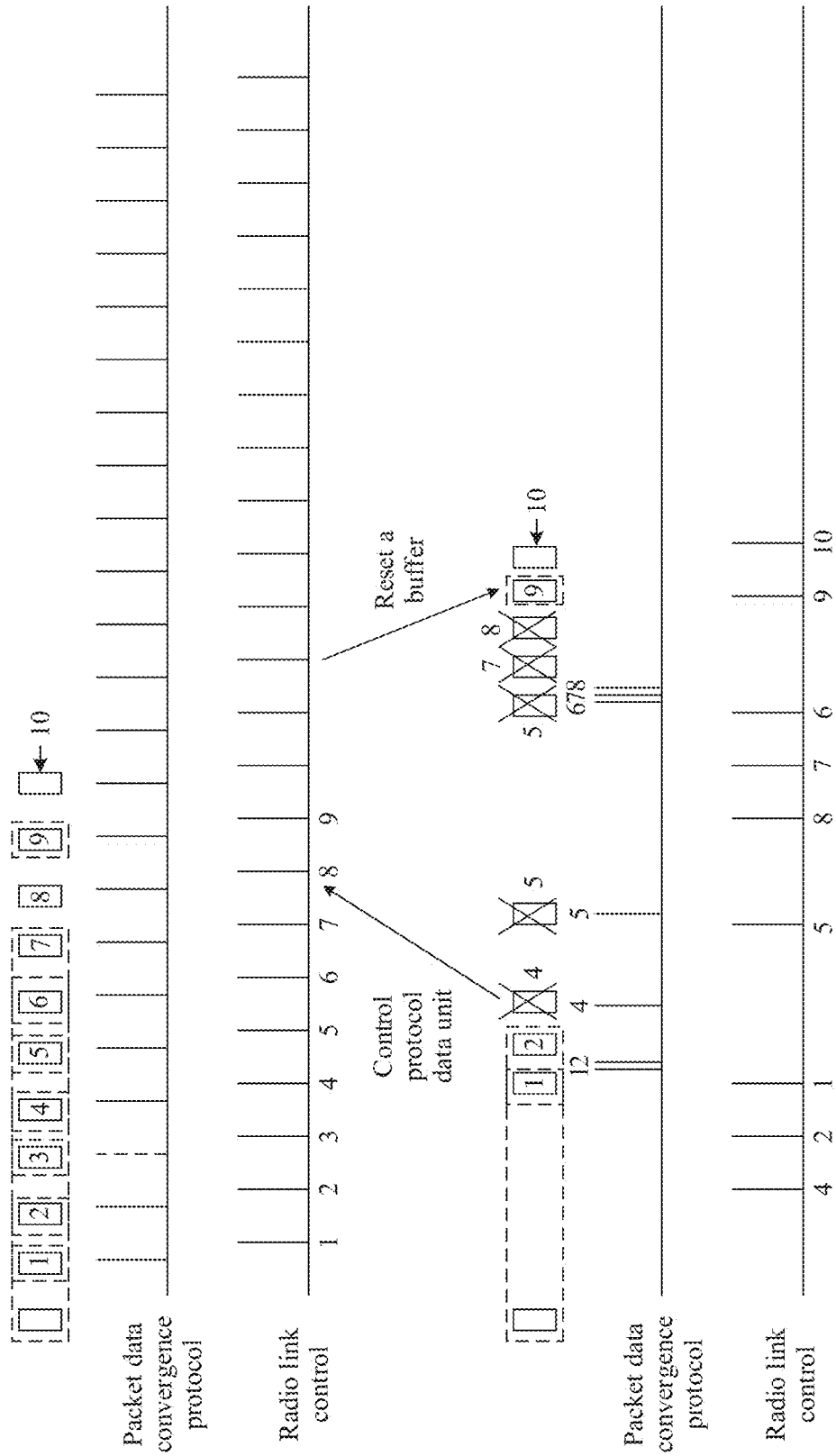
FIG. 3 is a schematic diagram of a feedback mechanism for a decompression error in an LTE system.

For example, FIG. 3 is a schematic diagram of a feedback mechanism for a decompression error in an LTE system. A transmit end has sent a compressed data packet 1, a compressed data packet 2, and a compressed data packet 3. The compressed data packet 3 has been lost in a transmission process. A subsequent data packet 4, data packet 5, data packet 6, data packet 7, and data packet 8 have been compressed and packaged, and the transmit end has normally sent these data packets. In this case, a receive end cannot receive the compressed data packet 4, and therefore cannot correctly decompress a compressed data packet 4, a compressed data packet 5, a compressed data packet 6, a compressed data packet 7, and a compressed data packet 8. After unsuccessfully decompressing the compressed data packet 4, a PDCP layer of the receive end may send a control PDU to the transmit end, to notify the transmit end of a decompression error. The control PDU does not indicate any serial number corresponding to the error. Therefore, after receiving the control PDU, the transmit end may reset a buffer (currently, resetting the buffer is clearing the buffer). When the transmit end receives the control PDU, the transmit end has already sent the compressed data packet 4, the compressed data packet 5, the compressed data packet 6, the compressed data packet 7, and the compressed data packet 8, and it is assumed that a compressed data packet 9 is a currently to-be-compressed data packet. In this case, the transmit end can compress only a data packet 9 by using a reset buffer, and the receive end can normally decompress the compressed data packet 9 after receiving the compressed data packet 9.

To be specific, in a time period between a moment at which the receive end finds a decompression failure (the compressed data packet 4) and a moment at which the receive end receives a data packet (the compressed data packet 9) obtained after the buffer is reset, the receive end cannot decompress compressed data packets (that is, the compressed data packet 5, the compressed data packet 6, the compressed data packet 7, and the compressed data packet 8) whose sequence numbers fall within a range of 4 to 9, but discard these data packets. Consequently, a large quantity of data packets are lost, and an application layer needs to retransmit the data packets.

Currently, UDC is not used in an NR system. A clear solution is to directly apply an existing UDC mechanism to transmission in the NR system. Different from the LTE system, in the NR system, the RLC layer is not responsible for reordering data packets, but the PDCP layer reorders the data packets. After receiving compressed data packets, the RLC layer of the receive end directly transfers the compressed data packets to the PDCP layer. The PDCP layer orders the compressed data packets. After ordering, the PDCP layer decompresses the ordered compressed data packets, and then transfers data packets obtained through decompression to an upper layer.

Figure 4:
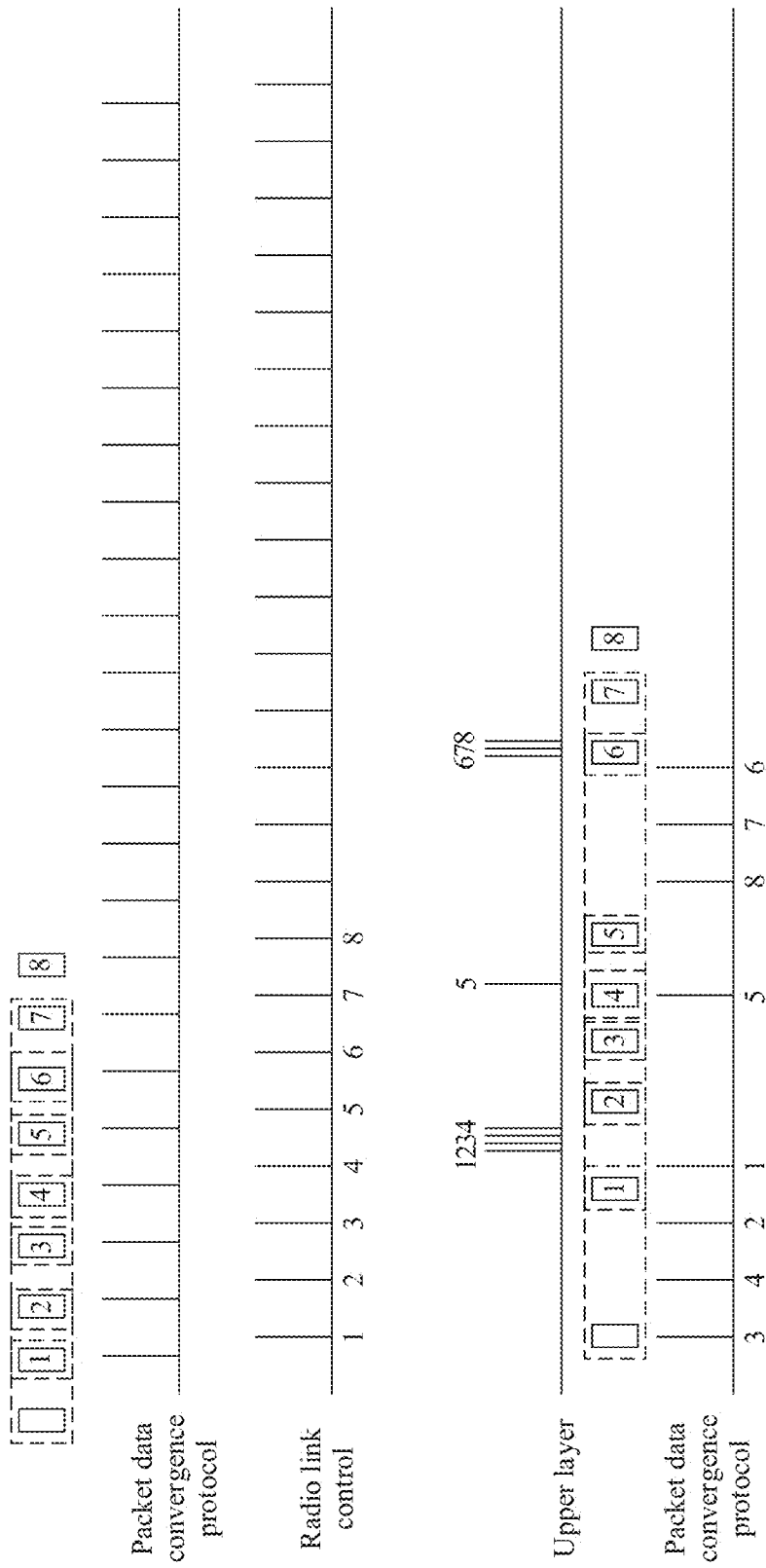
FIG. 4 is a schematic diagram of a data packet compression and decompression process in an NR system.

FIG. 4 shows a data packet compression and decompression process in an NR system. PDCP and RLC in upper two rows in FIG. 4 represent a PDCP layer and an RLC layer of a transmit end. For example, a size of a buffer is two data packets. Each dashed-line box represents content included in the buffer. In addition, a dashed-line box including "/" represents preset information included in the buffer. Each data packet is compressed based on content currently included in the buffer. PDCP in lower one row in FIG. 4 represents a PDCP layer of a receive end. After receiving a compressed data packet, an RLC layer of the receive end does not perform an operation such as ordering, but directly transfers the compressed data packet to the PDCP layer. Therefore, the RLC layer of the receive end is not shown in FIG. 4. For example, in FIG. 4, the PDCP layer of the receive end receives a compressed data packet 1, a compressed data packet 2, a compressed data packet 3, and a compressed data packet 4 in order of the compressed data packet 3, the compressed data packet 4, the compressed data packet 2, and the compressed data packet 1. In this case, after receiving the compressed data packet 1, the PDCP layer orders the four compressed data packets, decompresses the four compressed data packets in regular order, and then transfers data packets obtained through decompression to an upper layer of the PDCP layer. Then, the receive end receives a compressed data packet 5, and the PDCP layer of the receive end decompresses the compressed data packet 5, and then transfers a data packet 5 obtained through decompression to the upper layer. Then, the receive end further receives a compressed data packet 6, a compressed data packet 7, and a compressed data packet 8, and the receive end receives the three compressed data packets in order of the compressed data packet 8, the compressed data packet 7, and the compressed data packet 6. In this case, after receiving the compressed data packet 6, the PDCP layer of the receive end orders the three compressed data packets, sequentially decompresses the ordered three compressed data packets, and then transfers data packets obtained through decompression to the upper layer. For example, the PDCP layer decompresses the compressed data packet 1 based on preset information included in the buffer, the PDCP layer decompresses the compressed data packet 2 based on the preset information included in the buffer and information (that is, a data packet 1) obtained by decompressing the compressed data packet 1, and the PDCP layer decompresses the compressed data packet 3 based on the information (that is, the data packet) obtained by decompressing the compressed data packet 1 and information (that is, a data packet 2) obtained by decompressing the compressed data packet 2 (it is assumed that the buffer can accommodate content of two data packets, and therefore it is considered that the preset information has been squeezed out of the buffer). The rest may be deduced by analogy. All serial numbers of data packets (or serial numbers of compressed data packets) shown in FIG. 4 are sequence numbers of the data packets at the PDCP layer, or the serial numbers may alternatively be understood as count values of the data packets at the PDCP layer. Compared with LTE, the PDCP layer reorders data packets, and the PDCP layer decompresses only data packets to be transferred to the upper layer.

In addition, in the NR system, the PDCP layer of the transmit end may further perform preprocessing. To be specific, before an air interface grant (grant) is allocated at a bottom layer, the PDCP layer sends a compressed data packet to the RLC layer for preprocessing. For example, when only the compressed data packet 1 is transmitted through an air interface, the PDCP layer has already performed processing such as compression on a data packet 2, a data packet 3, a data packet 4, a data packet 5, a data packet 6, a data packet 7, and a data packet 8 and transferred the data packets to the RLC layer for further processing. Preprocessing reduces a data packet processing delay.

If a data packet loss case similar to that in the LTE system occurs in the NR system, a similar event that batches of data packets are lost also occurs. In addition, in the NR system, if the PDCP layer of the receive end determines that received compressed data packets are out of order, for example, after receiving the compressed data packet 1 and the compressed data packet 2, the PDCP layer of the receive end should receive the compressed data packet 3 instead of the compressed data packet 4, the PDCP layer of the receive end enables a reordering timer (reordering timer), to wait for receiving the compressed data packet 3. In this case, the PDCP layer decompresses the received compressed data packets only after the compressed data packet 3 is received and the data packet 3 and the data packet 4 are ready to be transferred or only when the data packet 4 needs to be transferred to the upper layer because the reordering timer expires. It can be learned that after the PDCP layer of the transmit end deletes a data packet, the PDCP layer of the receive end cannot receive the deleted data packet. In this case, the PDCP layer of the receive end enables a reordering timer, to wait for receiving (or detecting) the deleted data packet. The PDCP layer of the receive end can decompress received compressed data packets only when the reordering timer expires. In this case, the PDCP layer of the receive end can find a decompression error, and then sends a control PDU to the transmit end. During running of the reordering timer, more compressed data packets may have been sent to the receive end, and the receive end cannot decompress these data packets. Consequently, a quantity of lost data packets is increased. In addition, because the PDCP layer of the transmit end performs a preprocessing function, more data packets have been compressed by using an unaligned buffer. Consequently, the receive end cannot decompress more compressed data packets. It can be learned that, because a preprocessing procedure is performed and the PDCP layer can find a problem only after the reordering timer expires, there may be a larger quantity of lost data packets in the NR system compared with the LTE system.

Figure 5:
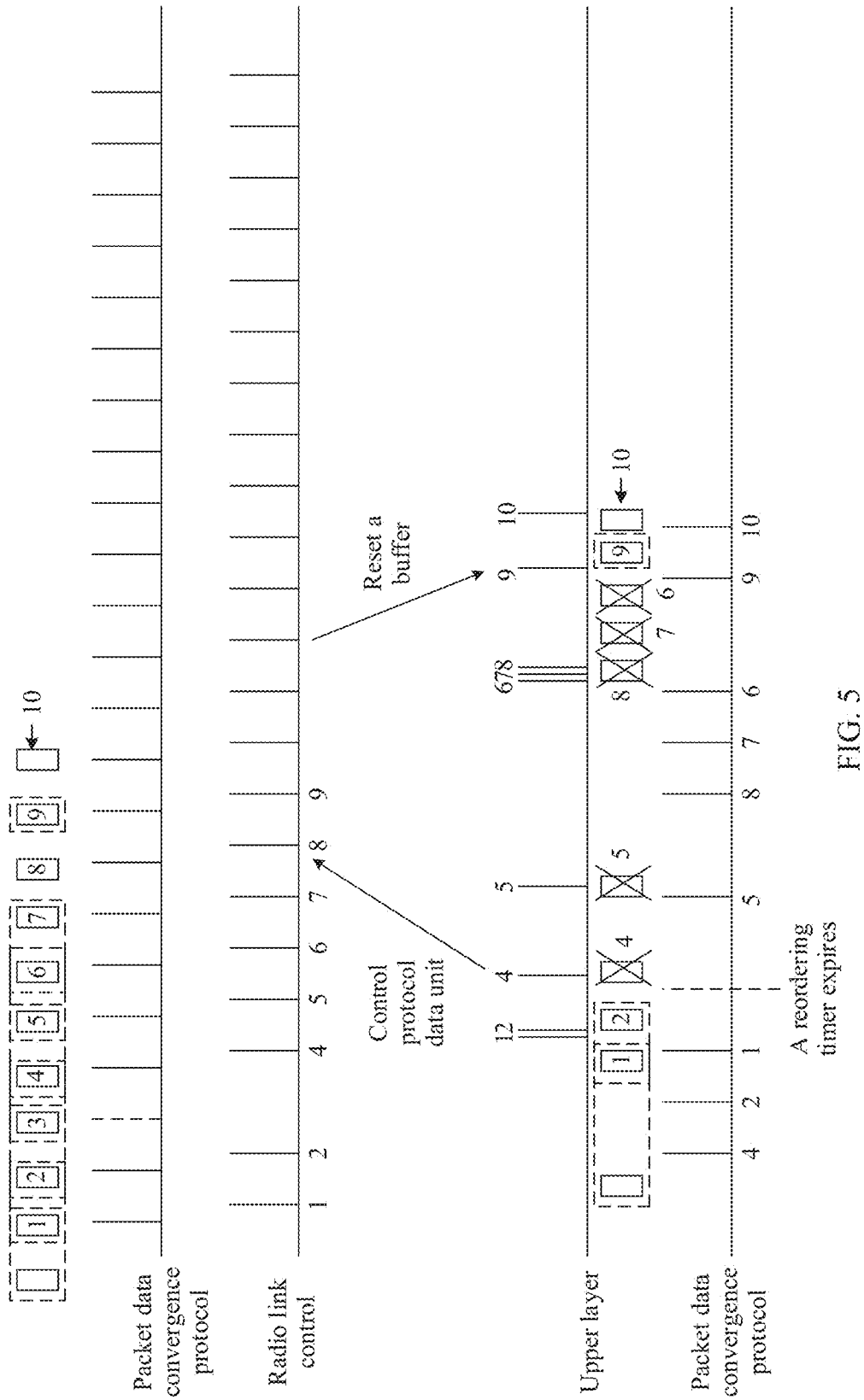
FIG. 5 is a schematic diagram of a feedback mechanism for a decompression error in an NR system.

FIG. 5 is a schematic diagram of a feedback mechanism for a decompression error in an NR system. A transmit end has sent a compressed data packet 1, a compressed data packet 2, and a compressed data packet 3. The compressed data packet 3 has been lost in a transmission process. A data packet 4, a data packet 5, a data packet 6, a data packet 7, and a data packet 8 have been compressed and packaged.

Due to preprocessing, a compressed data packet 4, a compressed data packet 5, a compressed data packet 6, a compressed data packet 7, and a compressed data packet 8 have been sent to an RLC; layer of the transmit end, and the transmit end has normally sent these data packets. In this case, a receive end cannot correctly decompress the compressed data packet 4, the compressed data packet 5, the compressed data packet 6, the compressed data packet 7, and the compressed data packet 8. For example, the receive end receives the compressed data packet 1, the compressed data packet 2, and the compressed data packet 4 in order of the compressed data packet 4, the compressed data packet 2, and the compressed data packet 1. In this case, after receiving the compressed data packet 4, the receive end enables a reordering timer, to wait for receiving the compressed data packet 1, the compressed data packet 2, and the compressed data packet 3. Because the receive end cannot wait for the compressed data packet 3, when the reordering timer expires, a PDCP layer of the receive end may decompress the received compressed data packet 1, the compressed data packet 2, and the compressed data packet 4. During decompression, the PDCP layer of the receive end finds that the compressed data packet 4 is unsuccessfully decompressed, and therefore sends a control PDU to the transmit end. However, in a time period for waiting until the reordering timer expires, a plurality of compressed data packets may be sent to the receive end, or a plurality of data packets may be compressed by the transmit end. For example, when a PDCP layer of the transmit end receives the control PDU, the compressed data packet 5 and the compressed data packet 6 have been sent, the compressed data packet 7 and the compressed data packet 8 have been transferred to the RLC layer, and a data packet 9 is not compressed. If the PDCP layer of the transmit end resets a buffer, the PDCP layer of the transmit end can only start compression from the data packet 9 by using a reset buffer. In this case, after receiving a compressed data packet 9, the PDCP layer of the receive end can normally decompress the compressed data packet 9. However, the PDCP layer of the receive end cannot decompress the compressed data packet 4, the compressed data packet 5, the compressed data packet 6, the compressed data packet 7, and the compressed data packet 8. Consequently, a loss of these data packets is caused.

In addition, there is a non-standalone (non-standalone, NSA) scenario. In a current communication system, there is a case in which an NR PDCP layer is used, and only an LTE RLC bearer, for example, a master cell group (master cell group, MCG) bearer, is used; or there is a case in which an NR PDCP layer is used, but not only an LTE RLC bearer, for example, a split (split) bearer, is used. Similarly, in this case, the foregoing compression and decompression process in the NR system may be applied, but the LTE RLC layer and the NR PDCP layer each order data packets passing through the layers. In the NSA scenario, similarly, an event that batches of data packets are lost also occurs. Details are not described herein again. In addition, because both the NR PDCP layer and the LTE RLC layer need to order data packets, a time for finding a compression problem is later than that in the LTE system, and a quantity of lost data packets may be greater than that in the LTE system.

In view of this, the technical solutions in the embodiments of this application are provided. In the embodiments of this application, a first device may maintain a plurality of buffers, and each buffer corresponds to one or more data packets. If a compressed data packet is lost during transmission, a receive end cannot decompress only compressed data packets corresponding to the compressed data packet. The compressed data packets corresponding to the compressed data packet mean that all the compressed data packets are compressed by using the same buffer. However, a loss of the compressed data packet does not affect other data packets that do not correspond to the same buffer as the compressed data packet. In this manner, a quantity of data packets affected by the lost data packet is decreased, and a quantity of lost data packets is also decreased.

The technical solutions provided in the embodiments of this application may be applied to an LTE system, for example, may be applied to a common LTE system or the internet of vehicles such as vehicle to everything (vehicle to everything, V2X) or LTE-V, or may be applied to an NR system, for example, may be applied to a common NR system or the internet of vehicles such as V2X or NR-V, or may be applied to another similar communication system or a next-generation communication system.

Figure 6A:
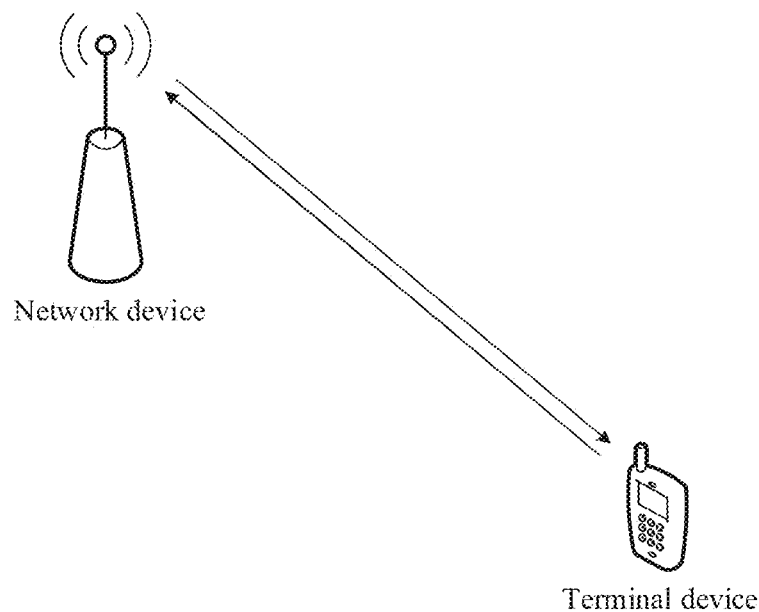
FIG. 6A is a schematic diagram of an application scenario according to an embodiment of this application.

FIG. 6A shows an application scenario according to an embodiment of this application. In FIG. 6A, one network device and one terminal device are included. For example, the network device operates in an evolved universal mobile telecommunications system terrestrial radio access (evolved UMTS terrestrial radio access, E-UTRA) system, or operates in an NR system. Certainly, in the embodiments of this application, one network device may serve a plurality of terminal devices. One terminal device is merely used as an example in FIG. 6A.

In addition, an actual application scenario according to an embodiment of this application is considered. When a user holds a terminal device and needs to perform an operation such as making a long term evolution voice bearer (voice over long term evolution, VoLTE)/voice over new radio (voice over new radio, VoNR) call or accessing the internet by using data traffic (for example, initiating a live broadcast, playing a game, or accessing the internet), the user needs to access a network. At an initial stage of accessing the network, the terminal device usually needs to report, to a base station, whether the terminal device has a capability of supporting data compression. When determining that the terminal device has the capability of supporting data compression, the base station may determine, based on a service initiated by the user, whether to configure a data compression-related parameter for the terminal device. When the base station configures the following: the terminal device can perform data compression, for example, can perform UDC, the terminal device may use a UDC manner in an uplink transmission process, for example, in a process of initiating a VoLTE/VoNR call or initiating a live broadcast. In this case, the terminal device may perform UDC by using a method provided in the embodiments of this application. This can reduce or even avoid a data packet loss caused by compression of uplink data. Similarly, the method provided in the embodiments of this application may also be used for compression of downlink data, to reduce or even avoid a data packet loss caused by compression of the downlink data.

Figure 6B:
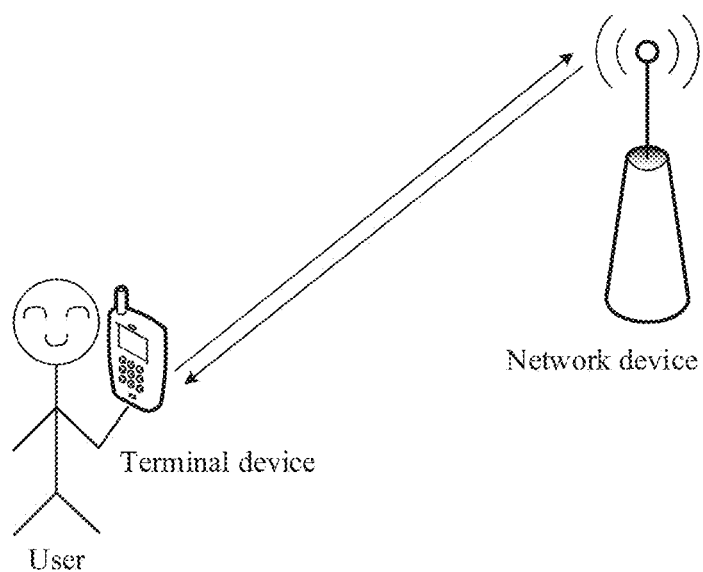
FIG. 6B is a schematic diagram of another application scenario according to an embodiment of this application.

The actual application scenario is considered. FIG. 6B is also a schematic diagram of an application scenario according to an embodiment of this application. FIG. 6B shows an example in which a user holds a terminal device to initiate a VoLTE/VoNR call.

The network device in FIG. 6A or FIG. 6B is, for example, a base station. The network device corresponds to a different device in a different system. For example, the network device may correspond to an eNB in a 4G system, and correspond to a 5G network device such as a gNB in a 5G system. In the 5G system, the network device may be a device on a hybrid network constituted by an LTE network device and an NR network device; and the network device and the terminal device form mixed radio-dual connectivity (mixed radio-dual connectivity, MR-DC). Certainly, the technical solutions provided in the embodiments of this application may also be applied to a future mobile communication system. Therefore, the network device in FIG. 6A or FIG. 6B may also correspond to a network device in the future mobile communication system. FIG. 6A or FIG. 6B shows an example in which the network device is the base station. Actually, with reference to the foregoing descriptions, the network device may alternatively be a device such as an RSU.

In addition, the embodiments of this application are not limited to communication between the network device and the terminal device, and may include communication between network devices or communication between terminal devices. For example, a first device described in the embodiments of this application may be a network device or a terminal device, and a second device described in the embodiments of this application may be a network device or a terminal device. A type combination manner for the first device and the second device is not limited.

The following describes, with reference to the accompanying drawings, the technical solutions provided in the embodiments of this application. It should be noted that, in the embodiments of this application, a serial number of a data packet before compression by a PDCP layer (which is also referred to as a data packet below) may be the same as a serial number of a corresponding compressed data packet. For example, a serial number of a first data packet is the same as a serial number of a compressed first data packet, and a serial number of a second data packet is the same as a serial number of a compressed second data packet. In addition, the technical solutions provided in the embodiments of this application may be applied to transmission of a data radio bearer (data radio bearer, DRB) in UM/AM, applied to transmission of a signaling radio bearer (signaling radio bearer, SRB), or applied to transmission of a service flow (QoS flow) on a DRB.

Figure 7:
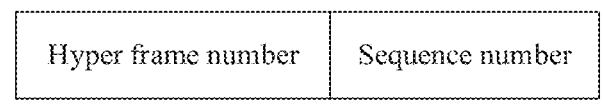
FIG. 7 is a schematic composition diagram of a count value of a data packet.

During transmission through an air interface, each data packet has a corresponding number at the PDCP layer. A number of a data packet at the PDCP layer may include two parts: a sequence number (sequence number, SN) and a hyper frame number (hyper frame number, HFN). The two parts are combined to form the number of the data packet, namely, a count (count) value of the data packet. FIG. 7 is a schematic composition diagram of a count value of a data packet. A serial number of a data packet in the embodiments of this application may be a sequence number of the data packet or a count value of the data packet. In addition, in the embodiments of this application, a serial number of a data packet is the same as a serial number of a data packet obtained by compressing the data packet (that is, a serial number of a compressed data packet). For example, a serial number of a first data packet is the same as a serial number of a compressed first data packet.

Figure 8A:
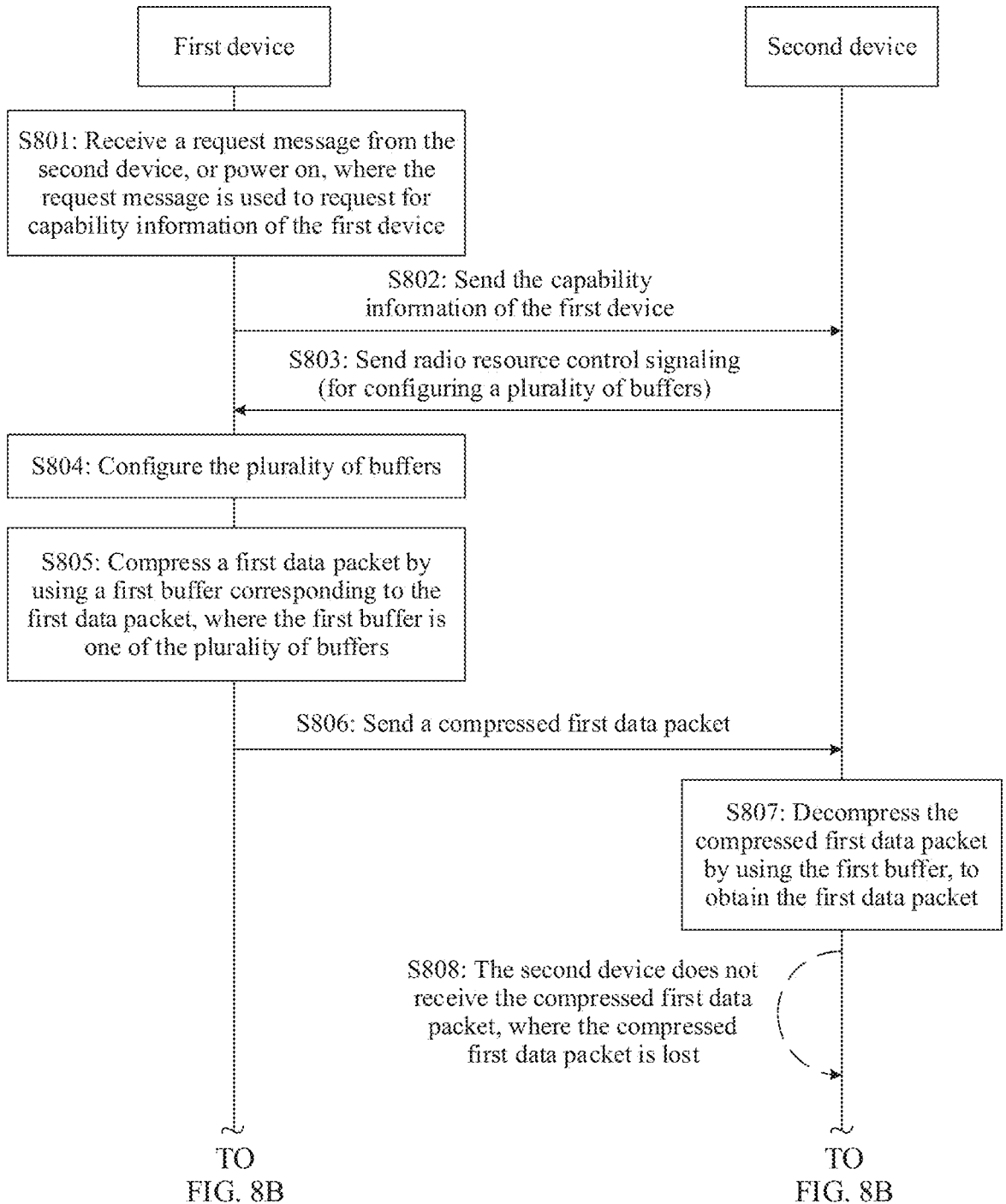
FIG. 8A and FIG. 8B are a flowchart of a first communication method according to an embodiment of this application.
Figure 8B:
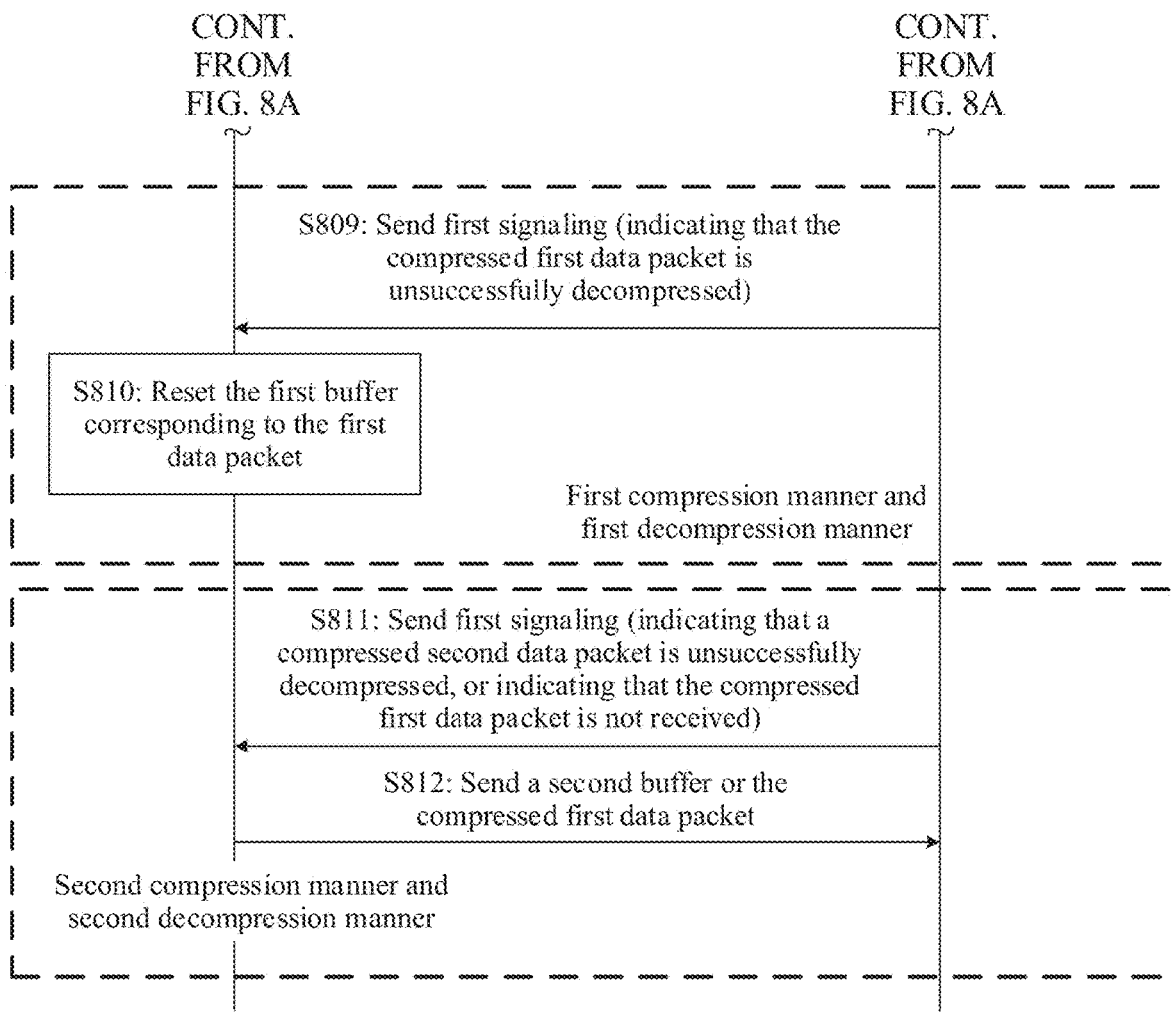

An embodiment of this application provides a first communication method. FIG. 8A and FIG. 8B are a flowchart of the method. The following provides descriptions by using an example in which the method is applied to a network architecture shown in FIG. 6A or FIG. 6B. In addition, the method may be executed by two communication apparatuses. The two communication apparatuses are, for example, a first communication apparatus and a second communication apparatus. The first communication apparatus may be a network device or a communication apparatus that can support a network device in implementing functions of the method. Alternatively, the first communication apparatus may be a terminal device or a communication apparatus that can support a terminal device in implementing functions of the method. Certainly, the first communication apparatus may alternatively be another communication apparatus, for example, a chip system. Similarly, the second communication apparatus may be a network device or a communication apparatus that can support a network device in implementing functions of the method. Alternatively, the second communication apparatus may be a terminal device or a communication apparatus that can support a terminal device in implementing functions of the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus may be a terminal device; both the first communication apparatus and the second communication apparatus may be network devices; both the first communication apparatus and the second communication apparatus may be terminal devices; or the first communication apparatus may be a network device, and the second communication apparatus may be a communication apparatus that can support a terminal device in implementing functions of the method. The network device is, for example, a base station.

For ease of description, the following provides descriptions by using an example in which the method is performed by a first device and a second device, that is, by using an example in which the first communication apparatus is the first device and the second communication apparatus is the second device. Because this embodiment provides descriptions by using the example in which the method is applied to the network architecture shown in FIG. 6A or FIG. 6B, the second device described below may be the network device in the network architecture shown in FIG. 6A or FIG. 6B, and the first device described below may be the terminal device in the network architecture shown in FIG. 6A or FIG. 6B.

S801: The first device is powered on, or the first device receives a request message from the second device, where the request message is used to request for capability information of the first device.

S802: The first device sends the capability information of the first device to the second device.

For example, the first device is a terminal device. When the terminal device is powered on or when the terminal device receives the request message from the second device, the terminal device may send the capability information of the first device to the second device. For example, the first device may include a quantity of buffers that can be supported by the first device in the capability information and send the capability information to the second device.

S803: The second device sends radio resource control (radio resource control, RRC) signaling to the first device, and the first device receives the RRC signaling from the second device, where the RRC signaling indicates to configure a plurality of buffers for the first device. Content to be configured may further include a size of each buffer and an initial dictionary supported by each buffer.

If the second device receives the capability information of the first device in S802, the second device can determine the quantity of buffers that can be supported by the first device. For example, when the first device needs to perform some services, the second device may configure a plurality of buffers for the first device. The service performed by the first device is, for example, a VoLTE call or a game.

S804: The first device configures the plurality of buffers.

For example, each of the plurality of buffers is used to compress one or more data packets. For example, each buffer in at least one of the plurality of buffers may be used to compress a plurality of data packets, and each buffer in remaining buffers in the plurality of buffers other than the at least one buffer may be used to compress one data packet. Alternatively, each of the plurality of buffers may be used to compress a plurality of data packets. Alternatively, each of the plurality of buffers may be used to compress one data packet. If each of the plurality of buffers is used to compresses only one data packet, a loss of one data packet does not affect another data packet, and system reliability is relatively high. However, there are usually a large quantity of data packets that need to be transmitted, and therefore a large quantity of buffers are required. As a result, storage space may be wasted. Whether each of the plurality of buffers is used to compress one data packet or a plurality of data packets may be determined based on an actual situation.

After the second device configures the plurality of buffers for the first device, the first device may perform a corresponding configuration operation, to locally configure the plurality of buffers.

In this embodiment of this application, the first device may maintain the plurality of buffers. Different buffers may be used to compress different data packets. Herein, the buffer may be hardware in concept in a physical sense. For example, the first device maintains the plurality of hardware buffers. Alternatively, the buffer may be software in concept. This means that the plurality of buffers do not exist in a hardware form, but it is logically considered that the plurality of buffers are maintained. If the buffer is software in concept, for example, it may be considered that one (or more) buffers on hardware are partitioned, and different zones are considered as different buffers.

The plurality of buffers may correspond to one bearer or one or more service flows (QoS flows) on one bearer, and the bearer is, for example, an SRB or a DRB.

S805: The first device compresses a first data packet by using a first buffer corresponding to the first data packet, to obtain a compressed first data packet, where the first buffer is one of the plurality of buffers.

A data packet corresponding to a buffer means that the data packet is compressed by using the buffer. For example, the first device may randomly select a corresponding buffer for a to-be-compressed data packet. For example, when the first device needs to compress the first data packet, the first device may randomly select a buffer from the plurality of buffers, where the selected buffer is, for example, referred to as the first buffer; and the first device compresses the first data packet by using the first buffer.

For example, the first device maintains four buffers. When the first device needs to compress the first data packet, the first device randomly selects a buffer from the four buffers, and compresses the first data packet by using the buffer. For example, if the buffer is the first buffer, the first buffer is a buffer corresponding to the first data packet.

Alternatively, the first device may determine, based on serial numbers of data packets, a data packet corresponding to a buffer. In this case, a buffer corresponding to a data packet is determined based on a serial number of the data packet.

For example, the first device may have, based on the serial numbers of the data packets, the $1^{st}$ data packet correspond to a buffer 1 in the plurality of buffers, the $2^{nd}$ data packet correspond to a buffer 2 in the plurality of buffers, and the $3^{rd}$ data packet correspond to a buffer 3 in the plurality of buffers. The rest may be deduced by analogy. If there are a large quantity of data packets, and there is a remaining data packet after the first device have all the data packets correspond to the plurality of buffers once, correspondence may continue to be performed starting from the buffer 1 in the plurality of buffers based on a serial number of the data packet. N is a positive integer. For example, for the first data packet, the first buffer is selected by the first device in order from the plurality of buffers based on a serial number of the first data packet.

Figure 9:
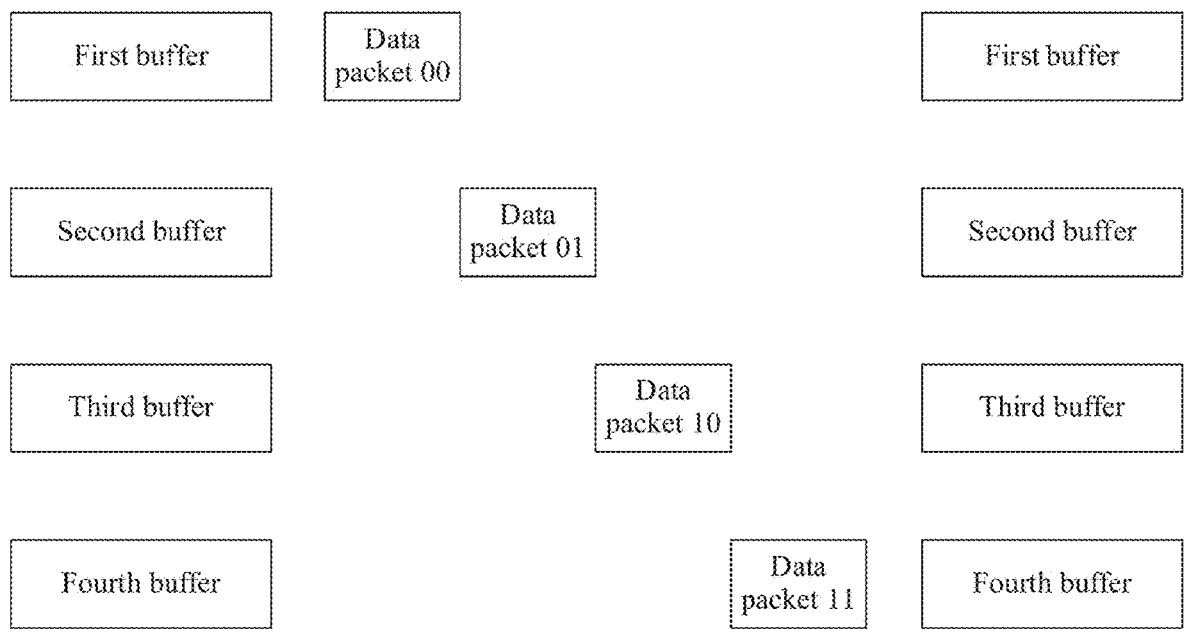
FIG. 9 is a schematic diagram of allocating a buffer to a data packet according to an embodiment of this application.

For example, the first device maintains four buffers. For example, the four buffers are a buffer 1, a buffer 2, a buffer 3, and a buffer 4. The first device may number the four buffers. For example, a number of the buffer 1 is 1, a number of the buffer 2 is 2, a number of the buffer 3 is 3, and a number of the buffer 4 is 4. The first device may allocate a buffer to each data packet based on the serial numbers of the data packets and the numbers of the buffers. For example, as shown in FIG. 9, for a data packet whose serial number is 00, the first device allocates the buffer 1 whose number is 1 to the data packet; for a data packet whose serial number is 01, the first device may allocate the buffer 2 whose number is 2 to the data packet; for a data packet whose serial number is 10, the first device may allocate the buffer 3 whose number is 3 to the data packet; and for a data packet whose serial number is 11, the first device may allocate the buffer 4 whose number is 4 to the data packet.

Alternatively, the first device may perform a modulo operation on serial numbers of data packets, and select a buffer in order from the plurality of buffers based on values obtained through the modulo operation.

For example, the first device maintains four buffers. For example, the four buffers are a buffer 1, a buffer 2, a buffer 3, and a buffer 4. The first device may number the four buffers. For example, a number of the buffer 1 is 1, a number of the buffer 2 is 2, a number of the buffer 3 is 3, and a number of the buffer 4 is 4. Each time the first device needs to compress a data packet, the first device performs a modulo operation on a serial number of the data packet, and then allocates a buffer to the data packet in order. For example, if the first device needs to compress the first data packet, the first device performs a modulo operation on a serial number of the first data packet. For example, if the first data packet is a data packet that is first compressed by the first device, the first device may allocate the buffer 1 whose number is 1 to the first data packet, and compress the first data packet by using the buffer 1. Alternatively, for example, if a buffer allocated by the first device to a data packet previous to the first data packet is the buffer 1, the first device may allocate the buffer 2 to the first data packet. Alternatively, for example, if a buffer allocated by the first device to a data packet previous to the first data packet is the buffer 4, the first device may allocate the buffer 1 to the first data packet.

Alternatively, the first device may determine a serial number range to which a serial number of a data packet belongs, to determine that a buffer corresponding to the serial number range is a buffer corresponding to the data packet.

For example, the first device may have, based on serial numbers of data packets, the $1^{st}$ data packet to the $N^{th}$ data packet correspond to a buffer 1 in the plurality of buffers, and then the $(N+1)^{th}$ data packet to the $2N^{th}$ data packet correspond to a buffer 2 in the plurality of buffers. The rest may be deduced by analogy. If there are a large quantity of data packets, and there is a remaining data packet after the first device have all the data packets correspond to the plurality of buffers once, correspondence may continue to be performed starting from the buffer 1 in the plurality of buffers based on a serial number of the data packet. N is a positive integer. In this case, serial number ranges for the data packets include [1, N], [N+1, 2N], and the like. Different serial number ranges may correspond to different buffers. For example, the serial number range [1, N] corresponds to the buffer 1, and the serial number range [N+1, 2N] corresponds to the buffer 2. For example, for the first data packet, the buffer 1 is selected by the first device in order from the plurality of buffers based on a serial number of the first data packet. For example, if the serial number of the first data packet is 2, the serial number of the first data packet belongs to the serial number range [1, N]. In this case, the first device can determine that the buffer 1 is a buffer corresponding to the first data packet.

For example, the first buffer corresponds to a plurality of data packets, and the plurality of data packets include the first data packet. When compressing the plurality of data packets by using the first buffer, the first device may use a common compression manner. For example, the common compression manner is referred to as a first compression manner. In the first compression manner, when the first device compresses the plurality of data packets corresponding to the first buffer by using the first buffer, content included in the first buffer is different. The following describes the first compression manner by using an example in which the first buffer corresponds to the first data packet, a second data packet, and a third data packet.

For example, if the first data packet is the $1^{st}$ data packet that needs to be compressed by using the first buffer, when the first data packet is compressed, the first buffer may not include information about a previous data packet. In this case, the first device may compress the first data packet based on preset information, to obtain the compressed first data packet. The preset information is, for example, a predefined dictionary. For example, in each embodiment of this application, content of the predefined dictionary may be related to a service. When services performed by the first device are different, predefined dictionaries may be the same or may be different. Alternatively, content of the predefined dictionary may be related to another factor. This is not specifically limited, and details are not described below again. After obtaining the compressed first data packet, the first device places the first data packet from a backend of the first buffer into the first buffer. For example, the first buffer includes the predefined dictionary and the first data packet. Then, the first device compresses the second data packet based on content included in the first buffer. In other words, the first device compresses the second data packet based on the predefined dictionary and the first data packet, to obtain a compressed second data packet. After obtaining the compressed second data packet, the first device places content of the second data packet from the backend of the first buffer into the first buffer. Because a capacity of the first buffer is limited, for example, after the content of the second data packet is placed into the first buffer, the predefined dictionary is squeezed out of the first buffer. In this case, the first buffer includes the first data packet and the second data packet. Then, the first device compresses the third data packet based on content included in the first buffer. In other words, the first device compresses the third data packet based on the first data packet and the second data packet, to obtain a compressed third data packet. After obtaining the compressed third data packet, the first device places content of the third data packet from the backend of the first buffer into the first buffer. For example, in this case, the first data packet is squeezed out of the first buffer, and the first buffer includes the second data packet and the third data packet. Then, if the first buffer further corresponds to another data packet, the first device may continue to compress the another data packet by using the first buffer in a similar compression manner. It can be learned that when the first device compresses different data packets corresponding to the first buffer, content included in the first buffer is different, in other words, states of the first buffer are different. The first device may encode and compress an uncompressed data packet based on content in a current buffer, and may further use content of the uncompressed data packet to update the content in the buffer.

Alternatively, when compressing the plurality of data packets by using the first buffer, the first device may use another compression manner. For example, a second compression manner is used. When the first device compresses the plurality of data packets corresponding to the first buffer by using the first buffer, content included in the first buffer is the same. The following describes the second compression manner by using an example in which the first buffer corresponds to the first data packet, a second data packet, and a third data packet.

For example, for all data packets corresponding to the first buffer, when these data packets are compressed by using the first buffer, content included in the first buffer is the same, in other words, states of the first buffer are the same. For example, regardless of a quantity of data packets corresponding to the first buffer, when these data packets are compressed, the first buffer includes only preset information. The preset information is, for example, a predefined dictionary. In this case, the first device compresses the first data packet, the second data packet, or the third data packet based on the predefined dictionary, and does not need to update the first buffer after compression of a data packet is completed. In this manner, when a subsequent data packet is compressed, there is no need to consider a previous data packet. Therefore, data packets are more decoupled from each other, and impact caused by a loss of a data packet on another data packet is reduced. In addition, because the first device does not need to update the first buffer, workloads of the first device can be reduced.

For the second compression manner, different buffers may include different content. In other words, a buffer 1 may include content 1, and the buffer 1 may include content 2. A data packet corresponding to the buffer 1 is compressed based on the content 1m and a data packet corresponding to a buffer 2 is compressed based on the content 2.

The first device maintains the plurality of buffers. The first device may use the first compression manner for all the plurality of buffers, or use the second compression manner for all the plurality of buffers, or use the first compression manner for some buffers in the plurality of buffers, and use the second compression manner for remaining buffers in the plurality of buffers.

S806: The first device sends the compressed first data packet to the second device, and the second device receives the compressed first data packet from the first device.

After obtaining the compressed first data packet, the first device may send the compressed first data packet to the second device, and then the second device may obtain the compressed first data packet.

S807: The second device decompresses the compressed first data packet by using the first buffer corresponding to the compressed first data packet, to obtain the first data packet.

The second device also maintains a plurality of buffers used to decompress compressed data packets. The plurality of buffers correspond to different compressed data packets, and the first buffer is one of the plurality of buffers.

The second device not only configures the plurality of buffers for the first device, but also maintains the plurality of buffers. The buffers maintained by the second device correspond to the buffers maintained by the first device. For example, if the first device maintains four buffers, the second device also maintains four buffers. For example, if the first device maintains the first buffer, the second device also maintains the first buffer. That is, a data packet can be correctly decompressed only when buffer states of the two devices keep consistent.

After receiving the compressed first data packet, the second device first determines a buffer corresponding to the first data packet.

For example, if the first device randomly determines a buffer corresponding to a data packet, the first device may send a correspondence between the data packet and the buffer to the second device. For example, when sending a compressed data packet to the second device, the first device may include first indication information in the compressed data packet (for example, in a packet header). The first indication information may indicate a number of a buffer corresponding to the compressed data packet. Then, after receiving the compressed data packet, the second device may determine the buffer corresponding to the compressed data packet. For example, if the first indication information carried in a packet header of the compressed first data packet indicates a buffer number 1, the second device may determine that a buffer with the number 1 is a buffer corresponding to the compressed first data packet. For example, the buffer with the number 1 is the first buffer.

Alternatively, if the first device determines, based on serial numbers of data packets, a buffer corresponding to a data packet, the second device may determine, in a same manner, the buffer corresponding to the data packet.

For example, both the first device and the second device maintain four buffers. For example, the four buffers are a buffer 1, a buffer 2, a buffer 3, and a buffer 4. Both the first device and the second device may number the four buffers. For example, a number of the buffer 1 is 1, a number of the buffer 2 is 2, a number of the buffer 3 is 3, and a number of the buffer 4 is 4. The first device may allocate a buffer to each data packet based on the serial numbers of the data packets and the numbers of the buffers. For example, as shown in FIG. 9, for a data packet whose serial number is 00, the first device allocates the buffer 1 whose number is 1 to the data packet; for a data packet whose serial number is 01, the first device may allocate the buffer 2 whose number is 2 to the data packet; for a data packet whose serial number is 10, the first device may allocate the buffer 3 whose number is 3 to the data packet; and for a data packet whose serial number is 11, the first device may allocate the buffer 4 whose number is 4 to the data packet. After receiving the compressed first data packet, the second device may determine a serial number of the compressed first data packet. For example, if the serial number of the compressed first data packet is 00, the second device may determine that the compressed first data packet corresponds to the buffer 1.

Alternatively, both the first device and the second device may perform a modulo operation on serial numbers of data packets, and select a buffer in order from the plurality of buffers based on values obtained through the modulo operation.

For example, both the first device and the second device maintain four buffers. For example, the four buffers are a buffer, a buffer, a buffer, and a buffer. Both the first device and the second device may number the four buffers. For example, a number of the buffer 1 is 1, a number of the buffer 2 is 2, a number of the buffer 3 is 3, and a number of the buffer 4 is 4. Each time the first device needs to compress a data packet, the first device performs a modulo operation on a serial number of the data packet, and then allocates a buffer to the data packet in order. For example, if the first device needs to compress the first data packet, the first device performs a modulo operation on a serial number of the first data packet. For example, if the first data packet is a data packet that is first compressed by the first device, the first device may allocate the buffer 1 whose number is 1 to the first data packet, and compress the first data packet by using the buffer 1. Alternatively, for example, if a buffer allocated by the first device to a data packet previous to the first data packet is the buffer 1, the first device may allocate the buffer 2 to the first data packet. Alternatively, for example, if a buffer allocated by the first device to a data packet previous to the first data packet is the buffer 4, the first device may allocate the buffer 1 to the first data packet. Each time the second device receives a compressed data packet, the second device may perform a modulo operation on a serial number of the compressed data packet, and then determine a buffer in order for the compressed data packet. For example, if the second device receives the compressed first data packet, the second device performs a modulo operation on the serial number of the compressed first data packet, and then selects a corresponding buffer, for example, the first buffer, in order based on a value obtained through the modulo operation.

Alternatively, both the first device and the second device may determine a serial number range to which a serial number of a data packet belongs, to determine that a buffer corresponding to the serial number range is a buffer corresponding to the data packet.

For example, both the first device and the second device may have, based on serial numbers of data packets, the $1^{st}$ data packet to the $N^{th}$ data packet correspond to a buffer 1 in the plurality of buffers, and then the $(N+1)^{th}$ data packet to the $2N^{th}$ data packet correspond to a buffer 2 in the plurality of buffers. The rest may be deduced by analogy. If there are a large quantity of data packets, and there is a remaining data packet after the first device have all the data packets correspond to the plurality of buffers once, correspondence may continue to be performed starting from the buffer 1 in the plurality of buffers based on a serial number of the data packet. N is a positive integer. In this case, serial number ranges for the data packets include [1, N], [N+1, 2N], and the like. Different serial number ranges may correspond to different buffers. For example, the serial number range [1, N] corresponds to the buffer 1, and the serial number range [N+1, 2N] corresponds to the buffer 2. For example, for the first data packet, the buffer 1 is selected by the first device in order from the plurality of buffers based on a serial number of the first data packet. For example, if the serial number of the first data packet is 2, the serial number of the first data packet belongs to the serial number range [1, N]. In this case, the first device can determine that the buffer 1 is a buffer corresponding to the first data packet. After receiving the compressed first data packet, the second device determines that the serial number of the compressed first data packet is 2. Then, the second device may determine that the serial number of the compressed first data packet belongs to the serial number range [1, N], and may determine that the buffer 1 is a buffer corresponding to the compressed first data packet.

After determining the first buffer corresponding to the compressed first data packet, the second device may decompress the compressed first data packet by using the first buffer.

If the first device compresses a data packet in the first compression manner, the second device needs to decompress a compressed data packet in a decompression manner (for example, referred to as a first decompression manner) corresponding to the first compression manner. The following describes the first decompression manner by using an example in which the first buffer corresponds to the compressed first data packet, a compressed second data packet, and a compressed third data packet.

For example, if the first data packet is the $1^{st}$ data packet that needs to be decompressed by using the first buffer, when the first data packet is decompressed, the first buffer may not include information about a previous data packet. In this case, the second device may decompress the compressed first data packet based on preset information, to obtain the first data packet. The preset information is, for example, a predefined dictionary. After obtaining the first data packet, the second device places the first data packet from a backend of the first buffer into the first buffer. For example, the first buffer includes the predefined dictionary and the first data packet. Then, the second device decompresses the compressed second data packet based on content included in the first buffer. In other words, the second device decompresses the compressed second data packet based on the predefined dictionary and the first data packet, to obtain a second data packet. After obtaining the second data packet, the second device places content of the second data packet from the backend of the first buffer into the first buffer. Because a capacity of the first buffer is limited, for example, after the content of the second data packet is placed into the first buffer, the predefined dictionary is squeezed out of the first buffer. In this case, the first buffer includes the first data packet and the second data packet. Then, the second device decompresses the compressed third data packet based on content included in the first buffer. In other words, the first device decompresses the third data packet based on the first data packet and the second data packet, to obtain a third data packet. After obtaining the third data packet, the first device places content of the third data packet from the backend of the first buffer into the first buffer. For example, in this case, the first data packet is squeezed out of the first buffer, and the first buffer includes the second data packet and the third data packet. Then, if the first buffer further corresponds to another compressed data packet, the first device may continue to decompress the another compressed data packet by using the first buffer in a similar decompression manner. It can be learned that when the second device decompresses different data packets corresponding to the first buffer, content included in the first buffer is different, in other words, states of the first buffer are different.

Alternatively, if the first device compresses a data packet in the second compression manner, the second device needs to decompress a compressed data packet in a decompression manner (for example, referred to as a second decompression manner) corresponding to the second compression manner. The following describes the second decompression manner by using an example in which the first buffer corresponds to the compressed first data packet, a compressed second data packet, and a compressed third data packet.

For example, for all data packets corresponding to the first buffer, when the second device decompresses these data packets by using the first buffer, content included in the first buffer is the same, in other words, stales of the first buffer are the same. For example, regardless of a quantity of data packets corresponding to the first buffer, when these data packets are decompressed, the first buffer includes only preset information. The preset information is, for example, a predefined dictionary. In this case, the first device decompresses the first data packet, the second data packet, or the third data packet based on the predefined dictionary and does not need to update the first buffer after compression of a data packet is completed. In this manner, when a subsequent data packet is decompressed, there is no need to consider a previous data packet. Therefore, data packets are more decoupled from each other, and impact caused by a loss of a data packet on another data packet is reduced. In addition, because the second device does not need to update the first buffer, workloads of the second device can be reduced.

For the second decompression manner, different buffers may include different content. In other words, a buffer 1 may include content 1, and a buffer 2 may include content 2. A compressed data packet corresponding to the buffer 1 is decompressed based on the content 1, and a compressed data packet corresponding to the buffer 2 is decompressed based on the content 2.

For the second decompression manner, content included in each buffer may be determined by the first device. In this case, the first device needs to notify the second device. For example, for the first buffer, when the first device sends a compressed data packet to the second device, if the data packet is used to update the buffer, the first device may include second indication information in the compressed data packet. The second indication information may indicate that the compressed data packet is used to update the first buffer to a second buffer.

Alternatively, for the second decompression manner, content included in each buffer may be determined by the second device. In this case, the second device needs to notify the first device. For example, for the first buffer, the second device may send second signaling to the first device, where the second signaling may indicate serial numbers of one or more data packets used to update the first buffer to a second buffer. After receiving the second signaling, the first device can determine which data packets are used to update the first buffer.

S808: The compressed first data packet is lost. To be specific, the first device sends the compressed first data packet, but the second device does not receive the compressed first data packet, and the compressed first data packet is lost in a transmission process.

If S807 is performed, S808 is not performed. If S808 is performed, S807 is not performed. The two steps protect two different cases. Therefore, it may be considered that there is an "or" relationship between the two steps.

Because a data packet loss phenomenon may occur when a data packet is transmitted between the first device and the second device, a decompression failure may occur when the second device decompresses a data packet. Certainly, a data packet loss phenomenon may not occur when a data packet is transmitted between the first device and the second device. In this case, S808 and steps after S808 are not performed. In other words, S808 and steps after S808 (for example, S809 to S812 that are to be described below) are merely optional steps.

For example, the first device uses the first compression manner, and the second device uses the first decompression manner. In this case, if the second device unsuccessfully decompresses the compressed first data packet, S809 may be referenced: The second device may send first signaling to the first device. The first signaling indicates that the compressed first data packet is unsuccessfully decompressed. For example, the first signaling is a control PDU, and the control PDU may, for example, carry the serial number of the compressed first data packet. After the first device receives the first signaling, S810 may be referenced: The first device may reset the buffer corresponding to the compressed first data packet, that is, the first buffer. After resetting the first buffer, the first device may compress, by using a reset first buffer, an uncompressed data packet in the data packets corresponding to the first buffer.

Figure 10:
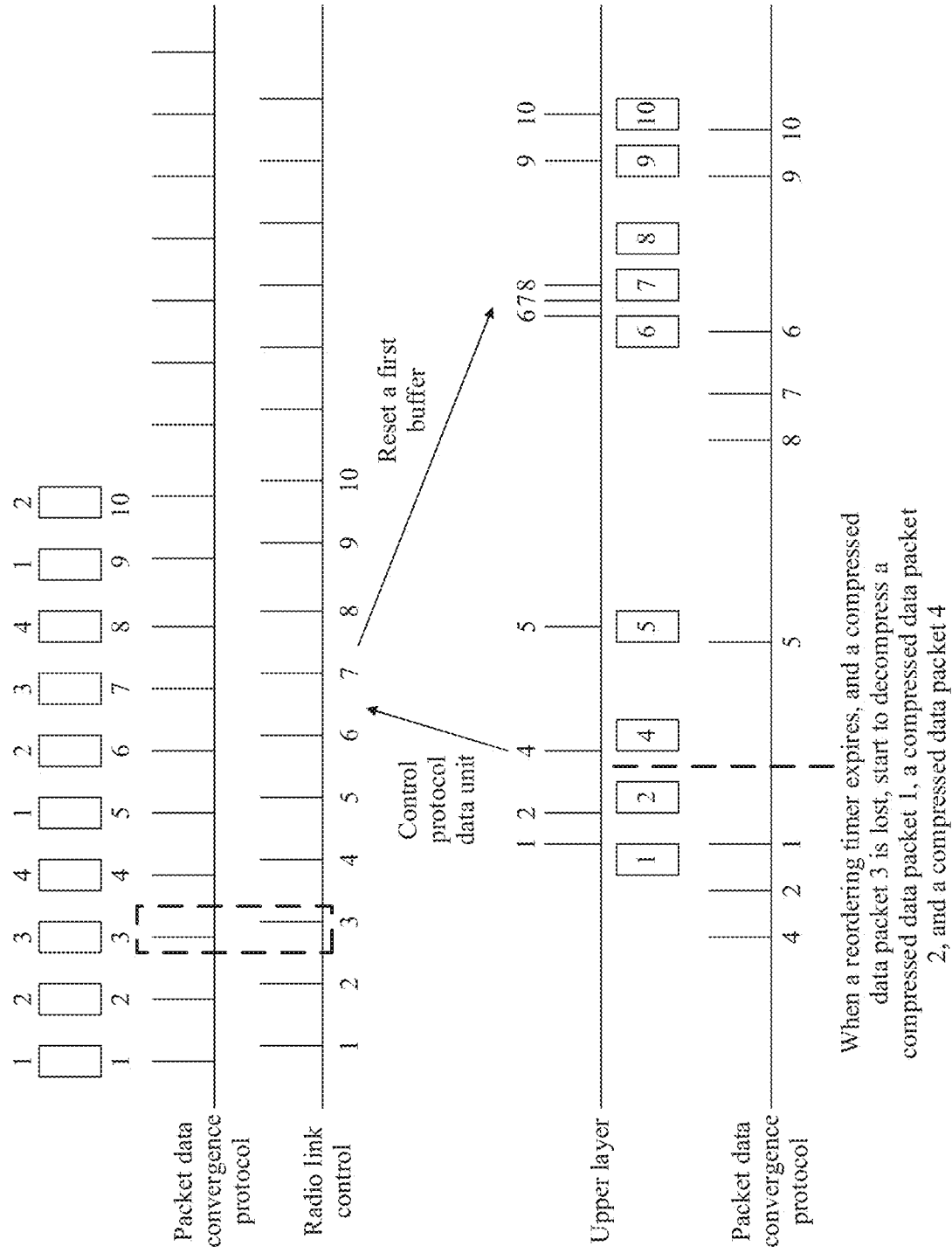
FIG. 10 is a schematic diagram of a processing process in an NR system according to an embodiment of this application.

For example, FIG. 10 shows an example of a processing process in an NR system. In FIG. 10, only a first buffer is used as an example. PDCP and RLC in upper two rows in FIG. 10 represent a PDCP layer and an RLC layer of a first device, and blocks in the uppermost row indicate buffers. For example, the first device maintains four buffers, and numbers of the four buffers are 1, 2, 3, and 4. Numbers above the blocks in the uppermost row indicate numbers of corresponding buffers. In addition, numbers below the blocks in the uppermost row indicate serial numbers of data packets corresponding to the buffers. For example, serial numbers of data packets corresponding to a buffer 1 include 1, 5, and 9; serial numbers of data packets corresponding to a buffer 2 include 2, 6, and 10, serial numbers of data packets corresponding to a buffer 3 include 3 and 7; and serial numbers of data packets corresponding to a buffer 4 include 4 and 8. Each data packet is compressed based on content included in a corresponding buffer.

PDCP in lower one row in FIG. 10 represents a PDCP layer of a second device. After receiving a compressed data packet, an RLC layer of the second device does not perform an operation such as ordering, but directly transfers the compressed data packet to the PDCP layer. Therefore, the RLC layer of the second device is not shown in FIG. 10. For example, in FIG. 10, a compressed data packet 1 is lost in a transmission process, and the PDCP layer of the second device cannot receive the compressed data packet 1. The second device uses the first compression manner. That is, a data packet 1, a data packet 5, and a data packet 9 are all compressed by using the first buffer. If the compressed data packet 1 is lost, the PDCP layer of the second device cannot decompress a compressed data packet 5 and a compressed data packet 9. When finding that the compressed data packet 5 cannot be decompressed, the PDCP layer of the second device may send a control PDU to the first device, where the control PDU may carry a serial number of the compressed data packet 5. After receiving the control PDU, the first device may determine a buffer corresponding to the compressed data packet 5, that is, the first buffer. The first device may reset the first buffer. After resetting the first buffer, the first device may compress uncompressed data packets corresponding to the first buffer by using a reset first buffer. For example, the data packet 1, the data packet 5, and the data packet 9 correspond to the first buffer. After the first buffer is reset, if the data packet 9 has not been compressed, the first device may compress the data packet 9 by using the reset first buffer. When sending the compressed data packet 9 to the second device, the first device may include second information in a packet header of the compressed data packet 9. The second information may indicate that the compressed data packet 9 is compressed by using the reset first buffer. In this case, the second device may also reset the first buffer, and decompress the compressed data packet 9 by using the reset first buffer.

It can be learned that if a data packet is lost, only a portion of data packets corresponding to a same buffer as the lost data packet may be affected, but a data packet corresponding to another buffer is not affected. This helps decrease a quantity of lost data packets. In addition, if serial numbers of data packets corresponding to one buffer are inconsecutive, when a data packet is lost, other data packets corresponding to the data packet may have not been compressed, or a small quantity of data packets have been compressed. In this case, fewer data packets are affected. Therefore, if serial numbers of data packets corresponding to one buffer are inconsecutive, a quantity of lost data packets can be further decreased.

All numbers of data packets shown in FIG. 10 are sequence numbers of the data packets at the PDCP layer.

Alternatively, the first device uses the second compression manner, and the second device uses the second decompression manner. If the second device determines that a compressed data packet is not received, the second device may send first signaling to the first device. The first signaling indicates the compressed data packet that is not received. For example, S811 may be referenced: If the second device determines that the compressed first data packet is not received, the second device may send first signaling to the first device. The first signaling may indicate first information, and the first information may include information indicating that the compressed first data packet is not received, or include information indicating that a compressed second data packet is unsuccessfully decompressed. For example, the first signaling may carry the serial number of the compressed first data packet. The serial number of the compressed first data packet may be used as the first information. This means that the first information indicates that the compressed first data packet is not received. For example, the first signaling is a control PDU, and the control PDU may, for example, carry the serial number of the compressed first data packet. After receiving the first signaling, the first device may determine whether there is a buffer including the first data packet. In other words, a data packet may be used as content included in a buffer. In this case, a data packet corresponding to the buffer is compressed based on the data packet. If the data packet included in the buffer is lost in a transmission process, the second device may unsuccessfully decompress all compressed data packets corresponding to the buffer. If the first device determines that the second buffer includes the first data packet, S812 may be referenced: The first device may send the second buffer or the compressed first data packet to the second device, so that the second buffer can re-obtain content in the second buffer, to correctly decompress another data packet corresponding to the second buffer. Sending the second buffer herein may be sending a state of the second buffer. Alternatively, if the first device determines that there is no buffer including the first data packet, the first device may not need to send a second buffer or the compressed first data packet to the second device. If there is no buffer including the first data packet, that the second device does not receive the compressed first data packet may merely mean a loss of the first data packet, and decompression of another compressed data packet is not affected. Therefore, the first device may neither need to send the second buffer or the compressed first data packet to the second device, nor need to reset any buffer.

Alternatively, the first device uses the second compression manner, and the second device uses the second decompression manner. If the second device determines that a compressed data packet is unsuccessfully decompressed, the second device may determine a reason for the decompression failure. If the second device determines that the reason for the decompression failure is that a data packet used to update a buffer is not received, decompression of all other data packets that are compressed by using the buffer may be affected. In this case, S811 may still be referenced: The second device may send first signaling to the first device. The first signaling may indicate first information, and the first information includes, for example, information indicating that the compressed data packet is unsuccessfully decompressed. For example, if the second device determines that a compressed second data packet is unsuccessfully decompressed, the second device may determine a reason for the decompression failure. If the second device determines that the reason form the decompression failure is that a data packet used to update the second buffer is not received, the second device may send first signaling to the first device. The first signaling may carry a serial number of the compressed second data packet. That is, the first information may include the serial number of the compressed second data packet. This means that the first information indicates that the compressed second data packet is unsuccessfully decompressed. The second buffer is a buffer used to decompress the compressed second data packet. For example, the first signaling is a control PDU, and the control PDU may, for example, carry the serial number of the compressed second data packet. After the first device receives the first signaling, S812 may still be referenced: The first device may send the second buffer or the compressed first data packet to the second device, so that the second device can re-obtain content in the second buffer, to correctly decompress another data packet corresponding to the second buffer. Sending the second buffer herein may be sending a state of the second buffer. Alternatively, the second device determines that a compressed data packet is unsuccessfully decompressed, and the second device determines that the decompression failure is not caused by a fact that a data packet used to update a buffer is not received. In this case, decompression of another compressed data packet may not be affected. Therefore, the second device may not need to send first signaling to the first device, and the first device may neither need to send the second buffer or the compressed first data packet to the second device, nor need to reset any buffer.

In this embodiment of this application, the first device may maintain the plurality of buffers, and for example, each buffer corresponds to one or more data packets. If a compressed data packet is lost during transmission, a receive end cannot decompress only compressed data packets corresponding to the compressed data packet. The compressed data packets corresponding to the compressed data packet mean that all the compressed data packets are compressed by using the same buffer. However, a loss of the compressed data packet does not affect other data packets that do not correspond to the same buffer as the compressed data packet. In this manner, a quantity of data packets affected by the lost data packet is decreased, and a quantity of lost data packets is also decreased.

Figure 11:
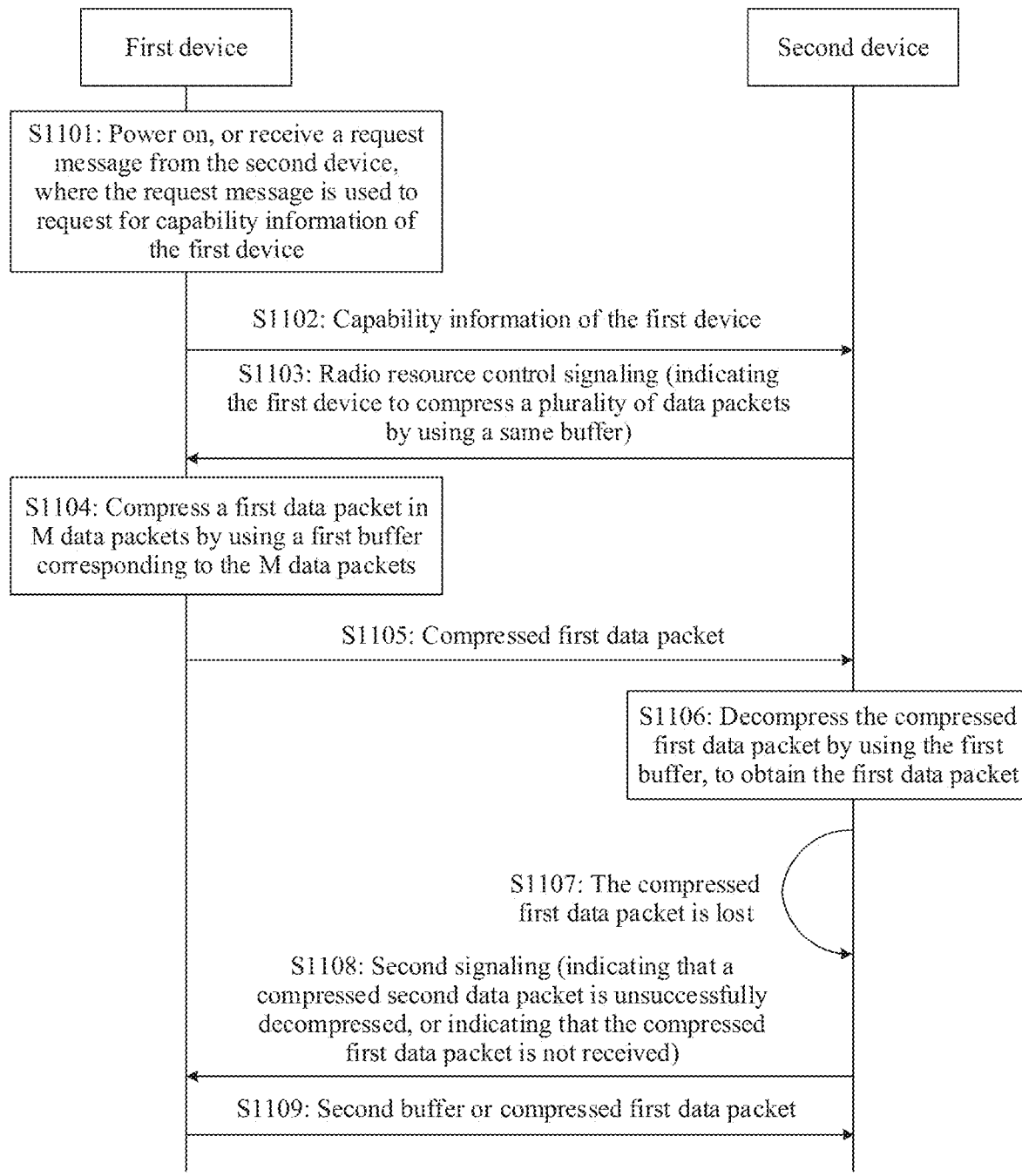

An embodiment of this application provides a second communication method, to resolve same technical problems. FIG. 11 is a flowchart of the method. The following provides descriptions by using an example in which the method is applied to a network architecture shown in FIG. 6A or FIG. 6B. In addition, the method may be executed by two communication apparatuses. The two communication apparatuses are, for example, a third communication apparatus and a fourth communication apparatus. The third communication apparatus may be a network device or a communication apparatus that can support a network device in implementing functions of the method. Alternatively, the third communication apparatus may be a terminal device or a communication apparatus that can support a terminal device in implementing functions of the method. Certainly, the third communication apparatus may alternatively be another communication apparatus, for example, a chip system. Similarly, the fourth communication apparatus may be a network device or a communication apparatus that can support a network device in implementing functions of the method. Alternatively, the fourth communication apparatus may be a terminal device or a communication apparatus that can support a terminal device in implementing functions of the method. Certainly, the fourth communication apparatus may alternatively be another communication apparatus, for example, a chip system. In addition, implementations of the third communication apparatus and the fourth communication apparatus are not limited. For example, the third communication apparatus may be a network device, and the fourth communication apparatus may be a terminal device; both the third communication apparatus and the fourth communication apparatus may be network devices; both the third communication apparatus and the fourth communication apparatus may be terminal devices; or the third communication apparatus may be a network device, and the fourth communication apparatus may be a communication apparatus that can support a terminal device in implementing functions of the method. The network device is, for example, a base station.

For ease of description, the following provides descriptions by using an example in which the method is performed by a first device and a second device, that is, by using an example in which the third communication apparatus is the first device and the fourth communication apparatus is the second device. Because this embodiment provides descriptions by using the example in which the method is applied to the network architecture shown in FIG. 6A or FIG. 6B, the second device described below may be the network device in the network architecture shown in FIG. 6A or FIG. 6B, and the first device described below may be the terminal device in the network architecture shown in FIG. 6A or FIG. 6B.

S1101: The first device is powered on, or the first device receives a request message from the second device, where the request message is used to request for capability information of the first device.

S1102: The first device sends the capability information of the first device to the second device.

For example, the first device is a terminal device. When the terminal device is powered on or when the terminal device receives the request message from the second device, the terminal device may send the capability information of the first device to the second device. For example, the first device may send, to the second device, information indicating that the first device can support a capability of compressing a plurality of data packets by using a same buffer. Alternatively, the first device may send, to the second device, information indicating that the first device can support a capability of compressing data packet based on buffer content.

S1103: The second device sends radio resource control (radio resource control, RRC) signaling to the first device, and the first device receives the RRC signaling from the second device, where the RRC signaling indicates the first device to compress a plurality of data packets by using a same buffer.

If the second device receives the capability information of the first device in S1102, the second device may determine that the first device can support compression of a plurality of data packets by using a same buffer. For example, when the first device needs to perform some services, the second device may configure the following for the first device: The first device can compress a plurality of data packets by using a same buffer. For example, one configured data bearer DRB or signaling bearer SRB or one or more service flows (QoS flows) on a configured data radio bearer correspond to one buffer. The service performed by the first device is, for example, a VoLTE call or a game.

S1104: The first device compresses a first data packet in M data packets by using a first buffer corresponding to the M data packets, to obtain a compressed first data packet, where M is a positive integer.

The first device may maintain one buffer. The first buffer, a second buffer, or the like described in this embodiment of this application may be understood as a state of the buffer maintained by the first device or content included in the buffer maintained by the first device. For example, the first buffer and the second buffer are two states of the buffer maintained by the first device.

In this embodiment of this application, the first device may use a second compression manner described in the embodiment shown in FIG. 11 to compress a data packet. To be specific, for the M data packets, when the first device compresses the M data packets by using the buffer, content included in the buffer is the same. In other words, the first device compresses each of the M data packets by using the first buffer. For example, if content included in the first buffer is a predefined dictionary, the first device compresses all the M data packets based on the predefined dictionary.

In an optional manner, the M data packets are all data packets corresponding to a first bearer, and the buffer maintained by the first device also corresponds to the first bearer or a service flow on the first bearer. In other words, all data packets corresponding to the buffer may be compressed based on same content. This compression manner is relatively simple, and after compression, content in the buffer does not need to be updated. Therefore, workloads of the first device are reduced. In addition, the second device may configure a public dictionary based on a service performed by the first device. This helps increase a compression rate of the first device.

Alternatively, in another optional manner, the M data packets are a portion of data packets corresponding to a first bearer. In other words, data packets corresponding to the first bearer further include a data packet other than the M data packets. In this case, the first device selects only the M data packets to correspond to the first buffer. The data packet other than the M data packets may correspond to another buffer. Actually, the first device maintains only one buffer. Corresponding to another buffer described herein may be understood as corresponding to another state of the buffer.

It is assumed that the M data packets are a portion of data packets corresponding to the first bearer. For example, the first device may select M data packets with consecutive serial numbers starting from the $1^{st}$ to-be-compressed data packet, and have the M data packets correspond to the first buffer. In this case, the serial numbers of the M data packets are consecutive. Alternatively, the first device may perform a modulo operation on serial numbers of to-be-compressed data packets, select M data packets whose serial numbers obtained through the modulo operation are consecutive, and have the M data packets correspond to the first buffer. In this case, the serial numbers that are of the M data packets and that are obtained through the modulo operation are consecutive, and serial numbers of the M data packets may also be consecutive. Alternatively, the first device may randomly select M data packets from to-be-compressed data packets. In this case, serial numbers of the M data packets may be consecutive or inconsecutive. Alternatively, the first device may select M data packets in another manner. This is not specifically limited.

It is assumed that the first device selects the M data packets with consecutive serial numbers starting from the $1^{st}$ to-be-compressed data packet, and has the M data packets correspond to the first buffer, or it is assumed that the first device performs the modulo operation on the serial numbers of the to-be-compressed data packets, selects the M data packets whose serial numbers obtained through the modulo operation are consecutive, and has the M data packets correspond to the first buffer. These two manners of selecting the M data packets may be determined by the first device. In this case, after selecting the M data packets, the first device needs to notify the second device that the M data packets correspond to the first buffer. Alternatively, these two manners of selecting the M data packets may be specified according to a protocol or determined by the first device and the second device in advance through negotiation. In this case, both the first device and the second device can determine the M data packets corresponding to the first buffer, and the first device does not need to notify the second device. Alternatively, these two manners of selecting the M data packets may be determined by the second device. In this case, the second device needs to first indicate a specific manner of selecting the M data packets to the first device.

The first bearer is, for example, a DRB (for example, referred to as a first DRB) or an SRB (for example, referred to as a first SRB). The service flow on the first bearer is, for example, a quality of service (quality of service, QoS) flow (flow) (for example, referred to as a first QoS flow).

S1105: The first device sends the compressed first data packet to the second device, and the second device receives the compressed first data packet from the first device.

S1106: The second device decompresses the compressed first data packet by using the first buffer corresponding to the compressed first data packet, to obtain the first data packet, where the first buffer corresponds to compressed M data packets, the compressed first data packet is one of the compressed M data packets, and M is a positive integer.

It is assumed that the M data packets are a portion of data packets corresponding to the first bearer or the first service flow on the first bearer, and the first device selects, starting from the $1^{st}$ to-be-compressed data packet, the M data packets whose serial numbers are consecutive or whose serial numbers are in ascending order for the first service flow, and has the M data packets correspond to the first buffer, or it is assumed that the first device performs the modulo operation on the serial numbers of the to-be-compressed data packets, selects the M data packets whose serial numbers obtained through the modulo operation are consecutive, and has the M data packets correspond to the first buffer, and it is assumed that the manner of selecting the M data packets is determined by the first device. In this case, when sending the compressed M data packets to the second device, the first device may include second indication information in each of the compressed M data packets. The second indication information may indicate a buffer corresponding to the compressed data packet, or indicate a state of a buffer corresponding to the compressed data packet. That is, the second indication information carried in each of the compressed M data packets may indicate that the corresponding compressed data packet corresponds to the first buffer. Therefore, after receiving the compressed M data packets, the second device can determine to decompress the compressed M data packets by using the first buffer. This indication manner is quite clear. Alternatively, when sending the compressed M data packets to the second device, the first device may include second indication information in the $1^{st}$ compressed data packet in the compressed M data packets. The second indication information may indicate M. This means that the second indication information indicates that the $1^{st}$ compressed data packet to the $M^{th}$ compressed data packet all correspond to the first buffer. Therefore, after receiving the compressed M data packets, the second device can determine to decompress the compressed M data packets by using the first buffer. This indication manner can decrease a quantity of second indication information, and reduce transmission overheads.

In addition, if the M data packets are a portion of data packets corresponding to the first bearer or the first service flow on the first bearer, after compressing the M data packets, the first device may update, based on one or more data packets in the M data packets, the buffer maintained by the first device, for example, update the first buffer to the second buffer. It may be understood that the first buffer and the second buffer are states of the buffer or content included in the buffer. Updating the buffer described in this embodiment of this application may be changing content included in the buffer. For example, updating the first buffer to the second buffer based on one or more data packets in the M data packets may be adding the one or more data packets to the first buffer. The first buffer to which the one or more data packets are added is referred to as the second buffer.

For example, the first device may determine to update the first buffer to the second buffer based on the serial numbers of the M data packets and the one or more data packets. For example, the first device may update the first buffer to the second buffer based on the $1^{st}$ data packet in the M data packets, the first device may update the first buffer to the second buffer based on the last data packet in the M data packets, or the first device may update the first buffer to the second buffer based on one or more other data packets in the M data packets. The "$1^{st}$ data packet" and the "last data packet" herein indicate that a serial number of the data packet is the first one or the last one.

A specific data packet to be used to update the first buffer may be selected by the first device. For example, the first device selects the first data packet in the M data packets to update the first buffer to the second buffer. When sending the compressed first data packet to the second device, the first device may include first indication information in the compressed first data packet. The first indication information may indicate that the first data packet is used to update the first buffer to the second buffer. Certainly, if the first device not only selects the first data packet to update the first buffer, but also selects another data packet to update the first buffer, when the first device sends compressed data packets to the second device, the first device includes the first indication information in all the corresponding compressed data packets. After receiving the compressed first data packet, the second device may determine, based on the first indication information carried in the compressed first data packet, that the first data packet is used to update the first buffer to the second buffer, or determine that the second buffer includes the first data packet. Alternatively, if the first device selects a plurality of consecutive data packets to update the first buffer, when the first device sends compressed data packets to the second device, the first device may include the first indication information in the $1^{st}$ compressed data packet in the plurality of consecutive compressed data packets. The first indication information may indicate that K consecutive compressed data packets starting from the $1^{st}$ compressed data packet are used to update the first buffer. For example, the first indication information may indicate a value of K, After receiving the compressed data packets, the second device may determine, based on the first indication information carried in the $1^{st}$ compressed data packet in the plurality of consecutive compressed data packets, that the $1^{st}$ compressed data packet to the $K^{th}$ compressed data packet are all used to update the first buffer.

Alternatively, a specific data packet to be used to update the first buffer may be selected by the second device. In this case, the second device may send first signaling to the first device. The first signaling indicates serial numbers of one or more data packets used to update the first buffer to the second buffer. After receiving the first signaling from the second device, the first device may determine that the one or more data packets indicated by the first signaling are data packets used to update the first buffer, or determine that the second buffer includes the one or more data packets indicated by the first signaling.

After updating the first buffer to the second buffer, the first device may compress N data packets by using the second buffer. Similarly, for the N data packets, when the first device compresses the N data packets by using the buffer, content included in the buffer is the same. In other words, the first device compresses each of the N data packets by using the second buffer. For example, if content included in the second buffer is the first data packet, the first device compresses all the N data packets based on the first data packet.

Serial numbers of the N data packets may follow the serial numbers of the M data packets. Alternatively, the first device may randomly select the M data packets from the to-be-compressed data packets, and then randomly select the N data packets. In this case, there may be no fixed order between serial numbers of the N data packets and the serial numbers of the M data packets.

A manner of selecting a data packet to update the second buffer is similar to the manner of selecting a data packet to update the first buffer. For details, refer to the foregoing descriptions.

Certainly, the M data packets and the N data packets may be all data packets corresponding to the first bearer or the first service flow on the first bearer, or may be a portion of data packets corresponding to the first bearer or the first service flow on the first bearer. If the M data packets and the N data packets are a portion of data packets corresponding to the first bearer or the first service flow on the first bearer, after compressing the N data packets, the first device may further update the second buffer to a third buffer. For example, the first device may update the second buffer to the third buffer based on one or more data packets in the N data packets, or may update the second buffer to the third buffer based on one or more data packets in the M data packets and the N data packets. Similarly, the third buffer herein is also a state of the buffer.

S1107: The compressed first data packet is lost. To be specific, the first device sends the compressed first data packet, but the second device does not receive the compressed first data packet, and the compressed first data packet is lost in a transmission process.

If S1107 is performed, S1106 is not performed. If S1106 is performed, S1107 is not performed. The two steps protect two different cases. Therefore, it may be considered that there is an "or" relationship between the two steps.

Because a data packet loss phenomenon may occur when a data packet is transmitted between the first device and the second device, a decompression failure may occur when the second device decompresses a data packet. Certainly, a data packet loss phenomenon may not occur when a data packet is transmitted between the first device and the second device. In this case, S1107 and steps after S1107 are not performed. In other words, S1107 and steps after S1107 (for example, S1108 and S1109 that are to be described below) are merely optional steps.

For example, if the second device determines that the compressed first data packet is not received, S1108 may be referenced: The second device may send second signaling to the first device. The second signaling indicates that the compressed first data packet is not received. For example, the second signaling is a control PDU, and the control PDU may, for example, carry a serial number of the compressed first data packet. This means that the second signaling indicates that the compressed first data packet is not received. After receiving the second signaling, the first device may determine whether the first data packet is used to update the buffer. In other words, a data packet may be used as content included in a buffer. In this case, a data packet corresponding to the buffer is compressed based on the data packet. If the data packet included in the buffer is lost in a transmission process, the second device may unsuccessfully decompress all compressed data packets corresponding to the buffer. If the first device determines that the first data packet corresponds to the second buffer, S1109 may be referenced: The first device may send the second buffer or the compressed first data packet to the second device, so that the second buffer can re-obtain content in the second buffer, to correctly decompress another data packet corresponding to the second buffer. Alternatively, if the first device determines that the first data packet is not used to update the buffer, the first device may not need to send the second buffer or the compressed first data packet to the second device. If the first data packet is not used to update the buffer, that the second device does not receive the compressed first data packet may merely mean a loss of the first data packet, and decompression of another compressed data packet is not affected. Therefore, the first device may neither need to send the second buffer or the compressed first data packet to the second device, nor need to reset any buffer.

For example, FIG. 12 shows an example of a processing process in an NR system. In FIG. 12, only a first buffer is used as an example. PDCP and RLC in upper two rows in FIG. 12 represent a PDCP layer and an RLC layer of a first device, and blocks in the uppermost row indicate buffers. M above the row of blocks indicates that every M compressed data packets correspond to one buffer. In addition, numbers below the blocks in the uppermost row indicate serial numbers of data packets corresponding to the buffers. For example, a data packet 1, a data packet 2, and a data packet 3 correspond to the first buffer; a data packet 4, a data packet 5, a data packet 6, and a data packet 7 correspond to a second buffer; and a data packet 8, a data packet 9, and a data packet 10 correspond to a third buffer. Each packet is compressed by using a corresponding buffer.

PDCP in lower one row in FIG. 12 represents a PDCP layer of a second device. After receiving a compressed data packet, an RLC layer of the second device does not perform an operation such as ordering, but directly transfers the compressed data packet to the PDCP layer. Therefore, the RLC layer of the second device is not shown in FIG. 12. For example, in FIG. 12, a compressed data packet 1 is lost in a transmission process, and the PDCP layer of the second device cannot receive the compressed data packet 1. When finding that the compressed data packet 1 is not received, the second device may send a control PDU to the first device. For example, the control PDU carries a serial number of the compressed data packet 1, to indicate that the second device does not receive the compressed data packet 1. After receiving the control PDU, the first device may determine whether there is a buffer including the data packet 1. In other words, a data packet may be used as content included in a buffer. In this case, a data packet corresponding to the buffer is compressed based on the data packet. If the data packet included in the buffer is lost in a transmission process, the second device may unsuccessfully decompress all compressed data packets corresponding to the buffer. If the first device determines that the data packet 1 corresponding to the compressed data packet 1 is a data packet used to update the first buffer to the second buffer, and the second device does not receive the compressed data packet 1, the second device may unsuccessfully decompress the data packet 4, the data packet 5, the data packet 6, and the data packet 7 that correspond to the second buffer. In this case, the first device may send the second buffer or the compressed data packet 1 to the second device. After receiving the second buffer or the compressed data packet 1, the second device may decompress the data packet 4, the data packet 5, the data packet 6, and the data packet 7 that correspond to the second buffer. This decreases a quantity of lost data packets.

Alternatively, after the first device receives the control PDU, if the first device determines that the data packet 1 corresponding to the compressed data packet 1 is not used to update the buffer, the first device does not perform any operation. If the compressed data packet 1 is not used to update the buffer, a loss of the compressed data packet 1 does not affect decompression of another compressed data packet, and therefore the first device does not perform any processing.

Alternatively, if the second device determines that a compressed data packet is unsuccessfully decompressed, the second device may determine a reason for the decompression failure. If the second device determines that the reason for the decompression failure is that a data packet used to update a buffer is not received, decompression of other data packets compressed by using the buffer may all be affected. In this case, S1107 may still be referenced: The second device may send second signaling to the first device. The second signaling indicates that the compressed data packet is unsuccessfully decompressed. For example, if the second device determines that a compressed second data packet is unsuccessfully decompressed, the second device may determine a reason for the decompression failure. If the second device determines that the reason for the decompression failure is that a data packet used to update the second buffer is not received, the second device may send second signaling to the first device. The second signaling may carry a serial number of the compressed second data packet. This means that the second signaling indicates that the compressed second data packet is unsuccessfully decompressed. The second buffer is a buffer used to decompress the compressed second data packet. For example, the first signaling is a control PDU, and the control PDU may, for example, carry the serial number of the compressed second data packet. After the first device receives the second signaling, S1108 may still be referenced: The second device may send the second buffer or the compressed first data packet to the second device, so that the second device can re-obtain content in the second buffer, to correctly decompress another data packet corresponding to the second buffer. Sending the second buffer herein may be sending a state of the second buffer. Alternatively, the second device determines that a compressed data packet is unsuccessfully decompressed, and the second device determines that the decompression failure is not caused by a fact that a data packet used to update a buffer is not received. In this case, decompression of another compressed data packet may not be affected. Therefore, the second device may not need to send first signaling to the first device, and the first device may neither need to send the second buffer or the compressed first data packet to the second device, nor need to reset any buffer.

It can be learned that if a data packet is lost, only a portion of data packets corresponding to a same buffer as the lost data packet may be affected, but a data packet corresponding to another buffer is not affected. This helps decrease a quantity of lost data packets. In addition, if serial numbers of data packets corresponding to one buffer are inconsecutive, when a data packet is lost, other data packets corresponding to the data packet may have not been compressed, or a small quantity of data packets have been compressed. In this case, fewer data packets are affected. Therefore, if serial numbers of data packets corresponding to one buffer are inconsecutive, a quantity of lost data packets can be further decreased.

All numbers of data packets shown in FIG. 12 are sequence numbers of the data packets at the PDCP layer.

In this embodiment of this application, a frequency of updating a buffer can be reduced, and the buffer is updated after a plurality of data packets are compressed, so that a same buffer state can correspond to the plurality of data packets. In this case, if one or more compressed data packets corresponding to one buffer are lost, because buffer states used to compress these data packets are the same, and there is no sequential dependence relationship between these data packets during compression, a loss of these compressed data packets does not affect decompression of another compressed data packet, and the another compressed data packet can still be correctly decompressed. It can be learned that this manner can decrease a quantity of lost data packets.

An embodiment of this application provides a third communication method, to resolve same technical problems. FIG. 13 is a flowchart of the method. The following provides descriptions by using an example in which the method is applied to a network architecture shown in FIG. 6A or FIG. 6B. In addition, the method may be executed by two communication apparatuses. The two communication apparatuses are, for example, a fifth communication apparatus and a sixth communication apparatus. The fifth communication apparatus may be a network device or a communication apparatus that can support a network device in implementing functions of the method. Alternatively, the fifth communication apparatus may be a terminal device or a communication apparatus that can support a terminal device in implementing functions of the method. Certainly, the fifth communication apparatus may alternatively be another communication apparatus, for example, a chip system. Similarly, the sixth communication apparatus may be a network device or a communication apparatus that can support a network device in implementing functions of the method. Alternatively, the sixth communication apparatus may be a terminal device or a communication apparatus that can support a terminal device in implementing functions of the method. Certainly, the sixth communication apparatus may alternatively be another communication apparatus, for example, a chip system. In addition, implementations of the fifth communication apparatus and the sixth communication apparatus are not limited. For example, the fifth communication apparatus may be a network device, and the sixth communication apparatus may be a terminal device; both the fifth communication apparatus and the sixth communication apparatus may be network devices; both the fifth communication apparatus and the sixth communication apparatus may be terminal devices; or the fifth communication apparatus may be a network device, and the sixth communication apparatus may be a communication apparatus that can support a terminal device in implementing functions of the method. The network device is, for example, a base station.

For ease of description, the following provides descriptions by using an example in which the method is performed by a first device and a second device, that is, by using an example in which the fifth communication apparatus is the first device and the sixth communication apparatus is the second device. Because this embodiment provides descriptions by using the example in which the method is applied to the network architecture shown in FIG. 6A or FIG. 6B, the second device described below may be the network device in the network architecture shown in FIG. 6A or FIG. 6B, and the first device described below may be the terminal device in the network architecture shown in FIG. 6A or FIG. 6B.

S1301: The first device is powered on, or the first device receives a request message from the second device, where the request message is used to request for capability information of the first device.

S1302: The first device sends the capability information of the first device to the second device.

For example, the first device is a terminal device. When the terminal device is powered on or when the terminal device receives the request message from the second device, the terminal device may send the capability information of the first device to the second device. For example, the first device may send, to the second device, information indicating that the first device can support a capability of resetting a buffer based on a corresponding condition (for example, a first condition).

S1303: The second device sends radio resource control (radio resource control, RRC) signaling to the first device, and the first device receives the RRC signaling from the second device, where the RRC signaling indicates the first device to compress a plurality of data packets by using a same buffer.

If the second device receives the capability information of the first device in S1302, the second device may determine that the first device can support resetting of the buffer based on the first condition. For example, when the first device needs to perform some services, the second device may configure the following for the first device: the first device resets the buffer based on the first condition. The service performed by the first device is, for example, a VoLTE call or a game.

S1304: The first device resets the buffer based on the first condition.

The first device may maintain one buffer. The buffer may correspond to a first bearer, and the first bearer is, for example, an SRB or a DRB.

For example, the first condition may include one of or any combination of the following: a first sub-condition, a second sub-condition, or a third sub-condition. For example, the first condition includes only the first sub-condition, the first condition includes only the second sub-condition, the first condition includes only the third sub-condition, the first condition includes the first sub-condition and the second sub-condition, the first condition includes the second sub-condition and the third sub-condition, the first condition includes the first sub-condition and the third sub-condition, or the first condition includes the first sub-condition, the second sub-condition, and the third sub-condition.

1. The first sub-condition is that the buffer is reset by using first duration as a periodicity.

The first sub-condition is relatively simple. To be specific, the buffer is reset periodically. A smaller value of the periodicity indicates a higher frequency at which the first device resets the buffer and a smaller quantity of lost data packets. However, if the first device resets the buffer excessively frequently, a large quantity of workloads are brought to the first device. Therefore, an appropriate value may be assigned to the periodicity, so that the first device does not reset the buffer excessively frequently and a quantity of lost data packet is decreased to a greatest extent.

For example, the first duration is determined by the first device. Alternatively, the first duration is configured by the second device. For example, the second device sends first signaling to the first device. The first signaling may indicate the first duration. Alternatively, the first duration may be specified according to a protocol, or determined by the first device and the second device through negotiation.

The first device periodically resets the buffer, and does not need to wait to reset the buffer until the second device indicates that a data packet is lost. This can decrease a quantity of lost data packets to a greatest extent.

2. The second sub-condition is that the buffer is reset after every N data packets are compressed.

This means that the first device may reset the buffer after compressing every N data packets. A smaller value of N indicates a higher frequency at which the first device resets the buffer and a smaller quantity of lost data packets. However, if the first device resets the buffer excessively frequently, a large quantity of workloads are brought to the first device. Therefore, an appropriate value may be assigned to N, so that the first device does not reset the buffer excessively frequently and a quantity of lost data packets is decreased to a greatest extent.

For example, the value of N is determined by the first device. Alternatively, the value of N is configured by the second device. For example, the second device sends first signaling to the first device. The first signaling may indicate the value of N. Alternatively, the value of N may be specified according to a protocol, or determined by the first device and the second device through negotiation.

After compressing a specific quantity of data packets, the first device may reset the buffer in a timely manner, and does not need to wait to reset the buffer until the second device indicates that a data packet is lost. This can decrease a quantity of lost data packets to a greatest extent.

3. The third sub-condition is that the buffer is reset when a total data amount of compressed data packets is greater than or equal to a first threshold.

The total data amount of compressed data packets means a sum of data amounts of all compressed data packets. If a data amount of compressed data packets is large, an occurrence probability of an error may be high. Therefore, if the total data amount of compressed data packets is greater than or equal to the first threshold, the first device may reset the buffer. For example, the first device may periodically determine whether a total data amount of compressed data packets is greater than or equal to the first threshold, or after compressing each data packet, the first device may determine whether a total data amount of compressed data packets is greater than or equal to the first threshold. An occasion for the first device to perform the determining is not limited.

The compressed data packet may be a data packet that is compressed after the buffer is reset last time. For example, the first device determines, for the first time, whether a total data amount of compressed data packets is greater than or equal to the first threshold. In this case, because the determining is performed for the first time, and a buffer resetting event does not occur, the first device determines, starting from a data packet from which compression is started, whether the total data amount of compressed data packets is greater than or equal to the first threshold. If the total data amount of compressed data packets is less than the first threshold, the first device may not reset the buffer but continue to compress a data packet. If the total data amount of compressed data packets is greater than or equal to the first threshold, the first device resets the buffer, and continues to compress a data packet by using a reset buffer. Then, when performing determining for the first time, the first device may determine whether a total data amount of compressed data packets obtained after the buffer is reset last time is greater than or equal to the first threshold. If the total data amount of compressed data packets is less than the first threshold, the first device may not reset the buffer but continue to compress a data packet. If the total data amount of compressed data packets is greater than or equal to the first threshold, the first device resets the buffer, and continues to compress a data packet by using a reset buffer. The rest may be deduced by analogy.

For example, the first threshold is determined by the first device. Alternatively, the first threshold is configured by the second device. For example, the second device sends first signaling to the first device. The first signaling may indicate the first threshold. Alternatively, the first threshold may be specified according to a protocol, or determined by the first device and the second device through negotiation.

S1305: The first device compresses a data packet by using a reset buffer, to obtain a compressed data packet.

After resetting the buffer, the first device may compress uncompressed data packets in order by using the reset buffer.

S1306: The first device sends the compressed data packet to the second device, and the second device receives the compressed data packet from the first device.

In this embodiment of this application, the first device may reset the buffer when the first condition is met, and does not need to wait to reset the buffer until the second device indicates that a data packet is lost. This can decrease a quantity of lost data packets to a greatest extent.

FIG. 14 is a schematic block diagram of a communication apparatus 1400 according to an embodiment of this application. For example, the communication apparatus 1400 is, for example, a first device 1400.

The first device 1400 includes a processing module 1410 and a transceiver module 1420. For example, the first device 1400 may be a terminal device, or may be a chip applied to a terminal device or another combined device or component having a function of the terminal device. Alternatively, the first device 1400 may be a network device, or may be a chip applied to a network device or another combined device or component having a function of the network device. For example, when the first device 1400 is a terminal device, the transceiver module 1420 may be a transceiver, and may include an antenna, a radio frequency circuit, and the like, and the processing module 1410 may be a processor, for example, a baseband processor. The baseband processor may include one or more central processing units (central processing unit, CPU). When the first device 1400 is a component having the terminal function, the transceiver module 1420 may be a radio frequency unit, and the processing module 1410 may be a processor, for example, a baseband processor. When the first device 1400 is a chip system, the transceiver module 1420 may be an input/output interface of the chip system (for example, a baseband chip), and the processing module 1410 may be a processor of the chip system, and may include one or more central processing units. For example, when the first device 1400 is a network device, the transceiver module 1420 may be a transceiver, and may include an antenna, a radio frequency circuit, and the like, and the processing module 1410 may be a processor. The processor may include one or more CPUs. When the first device 1400 is a component having the network function the transceiver module 1420 may be a radio frequency unit, and the processing module 1410 may be a processor. When the first device 1400 is a chip system, the transceiver module 1420 may be an input/output interface of the chip system, and the processing module 1410 may be a processor of the chip system, and may include one or more central processing units.

The processing module 1410 may be configured to perform all operations such as S801, S804, S805, and S810 performed by the first device in the embodiment shown in FIG. 8A and FIG. 8B except receiving and sending operations, and/or support another process of the technology described in this specification. The transceiver module 1420 may be configured to perform all receiving and sending operations such as S802, S803, S800, S809, S811, and S812 performed by the first device in the embodiment shown in FIG. 8A and FIG. 8B, and/or support another process of the technology described in this specification.

The processing module 1410 is configured to configure a plurality of buffers used to compress data packets.

The processing module 1410 is further configured to compress a first data packet by using a first buffer, where the first buffer is one of the plurality of buffers.

The transceiver module 1420 is configured to send a compressed first data packet to a second device.

In an optional implementation, different buffers in the plurality of buffers are used to compress different data packets.

In an optional implementation, the first buffer is determined based on a serial number of the first data packet; or the first buffer is randomly determined.

In an optional implementation, that the first buffer is determined based on a serial number of the first data packet includes: The first buffer is selected by the processing module in order from the plurality of buffers based on the serial number of the first data packet; or the first buffer is a buffer corresponding to a first serial number range to which the serial number of the first data packet belongs.

In an optional implementation, the processing module 1410 keeps content included in the first buffer unchanged when compressing, by using the first buffer, a plurality of data packets corresponding to the first buffer.

In an optional implementation, the transceiver module 1420 is further configured to receive first signaling from the second device, where the first signaling indicates that the compressed first data packet is unsuccessfully decompressed.

The processing module 1410 is further configured to reset the first buffer, and compress, by using a reset first buffer, a data packet corresponding to the first buffer.

In an optional implementation, the transceiver module 1420 is further configured to:
receive first signaling from the second device, where the first signaling indicates first information, and the first information includes information indicating that the compressed first data packet is not received, or includes information indicating that a compressed second data packet is unsuccessfully decompressed; and
send a second buffer or the compressed first data packet to the second device, where the compressed second data packet corresponds to the second buffer, and the second buffer includes the first data packet.

In an optional implementation, the plurality of buffers correspond to one data bearer or one signaling bearer.

It should be understood that the processing module 1410 in this embodiment of this application may be implemented by a processor or a processor-related circuit component, and the transceiver module 1420 may be implemented by a transceiver or a transceiver-related circuit component.

As shown in FIG. 15, an embodiment of this application further provides a communication apparatus 1500. For example, the communication apparatus 1500 is, for example, a first device 1500. For example, the first device 1500 may be a communication device, for example, a terminal device, a network device, or a chip system. The first device 1500 includes a processor 1510, a memory 1520, and a transceiver 1530. The memory 1520 stores instructions or a program. The processor 1510 is configured to execute the instructions or the program stored in the memory 1520. When the instructions or the program stored in the memory 1520 is executed, the processor 1510 is configured to perform the operations performed by the processing module 1410 in the foregoing embodiment, and the transceiver 1530 is configured to perform the operations performed by the transceiver module 1420 in the foregoing embodiment.

It should be understood that the first device 1400 or the first device 1500 in the embodiments of this application may implement the functions of the first device in the embodiment shown in FIG. 8A and FIG. 8B, and operations and/or functions of the modules of the first device 1400 or the first device 1500 are intended to implement corresponding procedures in the embodiment shown in FIG. 8A and FIG. 8B. For brevity, details are not described herein again.

FIG. 16 is a schematic block diagram of a communication apparatus 1600 according to an embodiment of this application. For example, the communication apparatus 1600 is, for example, a second device 1600.

The second device 1600 includes a processing module 1610 and a transceiver module 1620. For example, the second device 1600 may be a terminal device, or may be a chip applied to a terminal device or another combined device or component having a function of the terminal device. Alternatively, the second device 1600 may be a network device, or may be a chip applied to a network device or another combined device or component having a function of the network device. For example, when the second device 1600 is a terminal device, the transceiver module 1620 may be a transceiver, and may include an antenna, a radio frequency circuit, and the like, and the processing module 1610 may be a processor, for example, a baseband processor. The baseband processor may include one or more central processing units (central processing unit, CPU). When the second device 1600 is a component having the terminal function, the transceiver module 1620 may be a radio frequency unit, and the processing module 1610 may be, for example, a baseband processor. When the second device 1600 is a chip system, the transceiver module 1620 may be an input/output interface of the chip system (for example, a baseband chip), and the processing module 1610 may be a processor of the chip system, and may include one or more central processing units. For example, when the second device 1600 is a network device, the transceiver module 1620 may be a transceiver, and may include an antenna, a radio frequency circuit, and the like, and the processing module 1610 may be a processor. The processor may include one or more CPUs. When the second device 1600 is a component having the network function, the transceiver module 1620 may be a radio frequency unit, and the processing module 1610 may be a processor. When the second device 1600 is a chip system, the transceiver module 1620 may be an input/output interface of the chip system, and the processing module 1610 may be a processor of the chip system and may include one or more central processing units.

The processing module 1610 may be configured to perform all operations such as S807 performed by the second device in the embodiment shown in FIG. 8A and FIG. 8B except receiving and sending operations, and/or support another process of the technology described in this specification. The transceiver module 1620 may be configured to perform all receiving and sending operations such as S802, S803, S806, S809, S811, and S812 performed by the second device in the embodiment shown in FIG. 8A and FIG. 8B, and/or support another process of the technology described in this specification.

The transceiver module 1620 is configured to receive a compressed first data packet.

The processing module 1610 is configured to decompress the compressed first data packet by using a first buffer corresponding to the compressed first data packet, to obtain a first data packet, where the second device maintains a plurality of buffers used to decompress compressed data packets, and the first buffer is one of the plurality of buffers.

In an optional implementation, different buffers in the plurality of buffers are used to compress different data packets.

In an optional implementation, the processing module 1610 is further configured to:
 determine one of the plurality of buffers as the first buffer based on a serial number of the first data packet; or
 determine the first buffer based on first indication information carried in the compressed first data packet.

In an optional implementation, the processing module 1610 is configured to determine one of to plurality of buffers as the first buffer based on the serial number of the first data packet in the following manner:
 selecting one buffer in order from the plurality of buffers as the first buffer based on the serial number of the first data packet; or
 determining that the serial number of the first data packet belongs to a first serial number range, and determining a buffer corresponding to the first serial number range as the first buffer.

In an optional implementation, the transceiver module 1620 is further configured to:
 send first signaling to a first device, where the first signaling indicates first information, and the first information includes information indicating that the compressed first data packet is not received, or includes information indicating that a compressed second data packet is unsuccessfully decompressed; and
 receive a second buffer or the compressed first data packet from the first device, where the compressed second data packet corresponds to the second buffer, and the second buffer includes the first data packet.

In an optional implementation, the plurality of buffers correspond to one data bearer or one signaling bearer.

It should be understood that the processing module 1610 in this embodiment of this application may be implemented by a processor or a processor-related circuit component, and the transceiver module 1620 may be implemented by a transceiver or a transceiver-related circuit component.

As shown in FIG. 17, an embodiment of this application further provides a communication apparatus 1700. For example, the communication apparatus 1700 is, for example, a second device 1700. For example, the second device 1700 may be a communication device, for example, a terminal device, a network device, or a chip system. The second device 1700 includes a processor 1710, a memory 1720, and a transceiver 1730. The memory 1720 stores instructions or a program. The processor 1710 is configured to execute the instructions or the program stored in the memory 1720. When the instructions or the program stored in the memory 1720 is executed, the processor 1710 is configured to perform the operations performed by the processing module 1610 in the foregoing embodiment, and the transceiver 1730 is configured to perform the operations performed by the transceiver module 1620 in the foregoing embodiment.

It should be understood that the second device 1600 or the second device 1700 in the embodiments of this application may implement the functions of the second device in the embodiment shown in FIG. 8A and FIG. 8B, and operations and/or functions of the modules of the second device 1600 or the second device 1700 are intended to implement corresponding procedures in the embodiment shown in FIG. 8A and FIG. 8B. For brevity, details are not described herein again.

FIG. 18 is a schematic block diagram of a communication apparatus 1800 according to an embodiment of this application. For example, the communication apparatus 1800 is, for example, a first device 1800.

The first device 1800 includes a processing module 1810 and a transceiver module 1820. For example, the first device 1800 may be a terminal device, or may be a chip applied to a terminal device or another combined device or component having a function of the terminal device. Alternatively, the first device 1800 may be a network device, or may be a chip applied to a network device or another combined device or component having a function of the network device. For example, when the first device 1800 is a terminal device, the transceiver module 1820 may be a transceiver, and may include an antenna, a radio frequency circuit, and the like, and the processing module 1810 may be a processor, for example, a baseband processor. The baseband processor may include one or more central processing units (central processing unit, CPU). When the first device 1800 is a component having the terminal function, the transceiver module 1820 may be a radio frequency unit, and the processing module 1810 may be a processor, for example, a baseband processor. When the first device 1800 is a chip system, the transceiver module 1820 may be an input/output interface of the chip system (for example, a baseband chip), and the processing module 1810 may be a processor of the chip system, and may include one or more central processing units. For example, when the first device 1800 is a network device, the transceiver module 1820 may be a transceiver, and may include an antenna, a radio frequency circuit, and the like, and the processing module 1810 may be a processor. The processor may include one or more CPUs. When the first device 1800 is a component having the network function, the transceiver module 1820 may be a radio frequency unit, and the processing module 1810 may be a processor. When the first device 1800 is a chip system, the transceiver module 1820 may be an input/output interface of the chip system, and the processing module 1810 may be a processor of the chip system, and may include one or more central processing units.

The processing module 1810 may be configured to perform all operations such as S1101 and S1104 performed by the first device in the embodiment shown in FIG. 11 except receiving and sending operations, and/or support another process of the technology described in this specification. The transceiver module 1820 may be configured to perform all receiving and sending operations such as S1102, S1103, S1105, S1108, and S1109 performed by the first device in the embodiment shown in FIG. 11, and/or support another process of the technology described in this specification.

The processing module 1810 is configured to compress a first data packet in M data packets by using a first buffer corresponding to the M data packets, to obtain a compressed first data packet, where M is a positive integer.

The transceiver module 1820 is configured to send the compressed first data packet to a second device.

In an optional implementation, the M data packets are all data packets on a first data hearer or a first signaling bearer.

In an optional implementation, the processing module 1810 is further configured to update the first buffer to a second buffer based on one or more data packets in the M data packets, where the second buffer is used to compress N data packets, serial numbers of the N data packets follow serial numbers of the M data packets, and N is a positive integer.

In an optional implementation, the processing module 1810 is configured to update the first buffer to the second buffer based on the one or more data packets in the M data packets in the following manner: adding the one or more data packets to the first buffer based on the serial numbers of the M data packets, to obtain the second buffer.

In an optional implementation, the transceiver module 1820 is further configured to receive first signaling from the second device, where the first signaling indicates serial numbers of one or more data packets, and the one or more data packets are data packets used to update the first buffer to the second buffer.

In an optional implementation, compressed M data packets comprise compressed one or more data packets, the compressed one or more data packets carry first indication information, and the first indication information indicates that a corresponding data packet is used to update the first buffer to the second buffer.

In an optional implementation, the transceiver module 1820 is further configured to:
receive second signaling from the second device, where the second signaling indicates that the compressed first data packet is not received, or indicate that a compressed second data packet is unsuccessfully decompressed; and
send the second buffer or the compressed one or more data packets to the second device, where the compressed second data packet corresponds to the second buffer.

It should be understood that the processing module 1810 in this embodiment of this application may be implemented by a processor or a processor-related circuit component, and the transceiver module 1820 may be implemented by a transceiver or a transceiver-related circuit component.

As shown in FIG. 19, an embodiment of this application further provides a communication apparatus 1900. For example, the communication apparatus 1900 is, for example, a first device 1900. For example, the first device 1900 may be a communication device, for example, a terminal device, a network device, or a chip system. The first device 1900 includes a processor 1910, a memory 1920, and a transceiver 1930. The memory 1920 stores instructions or a program. The processor 1910 is configured to execute the instructions or the program stored in the memory 1920. When the instructions or the program stored in the memory 1920 is executed, the processor 1910 is configured to perform the operations performed by the processing module 1810 in the foregoing embodiment, and the transceiver 1930 is configured to perform the operations performed by the transceiver module 1820 in the foregoing embodiment.

It should be understood that the first device 1800 or the first device 1900 in the embodiments of this application may implement the functions of the first device in the embodiment shown in FIG. 11, and operations and/or functions of the modules of the first device 1800 or the first device 1900 are intended to implement corresponding procedures in the embodiment shown in FIG. 11. For brevity, details are not described herein again.

FIG. 20 is a schematic block diagram of a communication apparatus 2000 according to an embodiment of this application. For example, the communication apparatus 2000 is, for example, a second device 2000.

The second device 2000 includes a processing module 2010 and a transceiver module 2020. For example, the second device 2000 may be a terminal device, or may be a chip applied to a terminal device or another combined device or component having a function of the terminal device. Alternatively, the second device 2000 may be a network device, or may be a chip applied to a network device or another combined device or component having a function of the network device. For example, when the second device 2000 is a terminal device, the transceiver module 2020 may be a transceiver, and may include an antenna, a radio frequency circuit, and the like, and the processing module 2010 may be a processor, for example, a baseband processor. The baseband processor may include one or more central processing units (central processing unit, CPU). When the second device 2000 is a component having the terminal function, the transceiver module 2020 may be a radio frequency unit, and the processing module 2010 may be a processor, for example, a baseband processor. When the second device 2000 is a chip system, the transceiver module 2020 may be an input/output interface of the chip system (for example, a baseband chip), and the processing module 2010 may be a processor of the chip system, and may include one or more central processing units. For example, when the second device 2000 is a network device, the transceiver module 2020 may be a transceiver, and may include an antenna, a radio frequency circuit, and the like, and the processing module 2010 may be a processor. The processor may include one or more CPUs. When the second device 2000 is a component having the network function, the transceiver module 2020 may be a radio frequency unit, and the processing module 2010 may be a processor. When the second device 2000 is a chip system, the transceiver module 2020 may be an input/output interface of the chip system, and the processing module 2010 may be a processor of the chip system, and may include one or more central processing units.

The processing module 2010 may be configured to perform all operations such as S1106 performed by the second device in the embodiment shown in FIG. 11 except receiving and sending operations, and/or support another process of the technology described in this specification. The transceiver module 2020 may be configured to perform all receiving and sending operations such as S1102, S1103, S1105, S1108, and S1109 performed by the second device in the embodiment shown in FIG. 11, and/or support another process of the technology described in this specification.

The transceiver module 2020 is configured to receive a compressed first data packet from a first device.

The processing module 2010 is configured to decompress the compressed data packet by using a first buffer corresponding to the compressed first data packet, to obtain a first data packet, where the first buffer corresponds to compressed M data packets, the compressed first data packet is one of the compressed M data packets, and M is a positive integer.

With reference to the ninth aspect, in a first possible implementation of the ninth aspect, the M data packets are all data packets on a first data bearer or a first signaling bearer.

In an optional implementation, the processing module 2010 is further configured to update the first buffer to a second buffer based on compressed one or more data packets in the compressed M data packets, where the second buffer is used to decompress compressed N data packets, serial numbers of the compressed N data packets follow serial numbers of the compressed M data packets, and N is a positive integer.

In an optional implementation, the processing module 2010 is configured to update the first buffer to the second buffer based on the compressed one or more data packets in the M compressed data packets in the following manner: adding, based on the serial numbers of the compressed M data packets, one or more data packets obtained by decompressing the compressed one or more data packets to the first buffer, to obtain the second buffer.

In an optional implementation, the transceiver module 2020 is further configured to send first signaling to the second device, where the first signaling indicates serial numbers of one or more data packets, and the one or more data packets are data packets used to update the first buffer to the second buffer.

In an optional implementation, the compressed one or more data packets carry first indication information, and the first indication information indicates that a corresponding compressed data packet is used to update the first buffer to the second buffer.

In an optional implementation, the transceiver module 2020 is further configured to:

send second signaling to the first device, where the second signaling indicates that the compressed first data packet is not received, or indicate that a compressed second data packet is unsuccessfully decompressed; and receive the second buffer or the compressed first data packet from the first device, where the compressed second data packet corresponds to the second buffer.

It should be understood that the processing module 2010 in this embodiment of this application may be implemented by a processor or a processor-related circuit component, and the transceiver module 2020 may be implemented by a transceiver or a transceiver-related circuit component.

As shown in FIG. 17, an embodiment of this application further provides a communication apparatus 2100. For example, the communication apparatus 2100 is, for example, a second device 2100. For example, the second device 2100 may be a communication device, for example, a terminal device, a network device, or a chip system. The second device 2100 includes a processor 2110, a memory 2120, and a transceiver 2130. The memory 2120 stores instructions or a program. The processor 2110 is configured to execute the instructions or the program stored in the memory 2120. When the instructions or the program stored in the memory 2120 is executed, the processor 2110 is configured to perform the operations performed by the processing module 2010 in the foregoing embodiment, and the transceiver 2130 is configured to perform the operations performed by the transceiver module 2020 in the foregoing embodiment.

It should be understood that the second device 2000 or the second device 2100 in the embodiments of this application may implement the functions of the second device in the embodiment shown in FIG. 11, and operations and/or functions of the modules of the second device 2000 or the second device 2100 are intended to implement corresponding procedures in the embodiment shown in FIG. 11. For brevity, details are not described herein again.

FIG. 22 is a schematic block diagram of a communication apparatus 2200 according to an embodiment of this application. For example, the communication apparatus 2200 is, for example, a first device 2200.

The first device 1800 includes a processing module 2210 and a transceiver module 2220. For example, the first device 2200 may be a terminal device, or may be a chip applied to a terminal device or another combined device or component having a function of the terminal device. Alternatively, the first device 2200 may be a network device, or may be a chip applied to a network device or another combined device or component having a function of the network device. For example, when the first device 2200 is a terminal device, the transceiver module 2220 may be a transceiver, and may include an antenna, a radio frequency circuit, and the like, and the processing module 2210 may be a processor, for example, a baseband processor. The baseband processor may include one or more central processing units (central processing unit, CPU). When the first device 2200 is a component having the terminal function, the transceiver module 2220 may be a radio frequency unit, and the processing module 2210 may be a processor, for example, a baseband processor. When the first device 2200 is a chip system, the transceiver module 2220 may be an input/output interface of the chip system (for example, a baseband chip), and the processing module 2210 may be a processor of the chip system, and may include one or more central processing units. For example, when the first device 2200 is a network device, the transceiver module 2220 may be a transceiver, and may include an antenna, a radio frequency circuit, and the like, and the processing module 2210 may be a processor. The processor may include one or more CPUs. When the first device 2200 is a component having the network function, the transceiver module 2220 may be a radio frequency unit, and the processing module 2210 may be a processor. When the first device 2200 is a chip system, the transceiver module 2220 may be an input/output interface of the chip system, and the processing module 2210 may be a processor of the chip system, and may include one or more central processing units.

The processing module 2210 may be configured to perform all operations such as S1301, S1304, and S1305 performed by the first device in the embodiment shown in FIG. 13 except receiving and sending operations, and/or support another process of the technology described in this specification. The transceiver module 2220 may be configured to perform all receiving and sending operations such as S1302, S1303, and S1306 performed by the first device in the embodiment shown in FIG. 13, and/or support another process of the technology described in this specification.

The processing module 2210 is configured to reset a buffer based on a first condition.

The transceiver module 2220 is configured to: compress a data packet by using a reset buffer, to obtain a compressed data packet; and send, by the first device, the compressed data packet to a second device.

In an optional implementation, the first condition includes one of or any combination of the following:
the buffer is reset by using first duration as a periodicity;
the buffer is reset after every N data packets are compressed; or
a total data amount of compressed data packets is greater than or equal to a first threshold.

In an optional implementation, the transceiver module 2220 is further configured to receive first signaling from the second device, where when the first condition is that the buffer is reset by using the first duration as the periodicity, the first signaling indicates the first duration; when the first condition is that the buffer is reset after every N data packets are compressed, the first signaling indicates a value of N; or when the first condition is that the buffer is reset when the total data amount of compressed data packets is greater than or equal to the first threshold, the first signaling indicates the first threshold.

It should be understood that the processing module 2210 in this embodiment of this application may be implemented by a processor or a processor-related circuit component, and the transceiver module 2220 may be implemented by a transceiver or a transceiver-related circuit component.

As shown in FIG. 23, an embodiment of this application further provides a communication apparatus 2300. For example, the communication apparatus 2300 is, for example, a first device 2300. For example, the first device 2300 may be a communication device, for example, a terminal device, a network device, or a chip system. The first device 2300 includes a processor 2310, a memory 2320, and a transceiver 2330. The memory 2320 stores instructions or a program. The processor 2310 is configured to execute the instructions or the program stored in the memory 2320. When the instructions or the program stored in the memory 2320 is executed, the processor 2310 is configured to perform the operations performed by the processing module 2210 in the foregoing embodiment, and the transceiver 2330 is configured to perform the operations performed by the transceiver module 2220 in the foregoing embodiment.

It should be understood that the first device 2200 or the first device 2300 in the embodiments of this application may implement the functions of the first device in the embodiment shown in FIG. 13, and operations and/or functions of the modules of the first device 2200 or the first device 2300 are intended to implement corresponding procedures in the embodiment shown in FIG. 13. For brevity, details are not described herein again.

An embodiment of this application further provides a communication apparatus. The communication apparatus may be a terminal device or a circuit. The communication apparatus may be configured to perform actions performed by the first device or the second device in the method embodiment shown in FIG. 8A and FIG. 8B or the method embodiment shown in FIG. 11, or perform actions performed by the first device in the method embodiment shown in FIG. 13.

When the communication apparatus is a terminal apparatus, FIG. 24 is a simplified schematic diagram of a structure of the terminal device. As shown in FIG. 24, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus.

When data needs to be sent, the processor performs baseband processing on to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 24. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna that has sending and receiving functions and the radio frequency circuit may be considered as a transceiver unit of the terminal device, and the processor that has a processing function may be considered as a processing unit of the terminal device. As shown in FIG. 24, the terminal device includes the transceiver unit 2410 and the processing unit 2420. The transceiver unit may also be referred to as a transceiver, a transceiver machine, a transceiver apparatus, or the like. The processing unit may also be referred to as a processor, a processing hoard, a processing module, a processing apparatus, or the like. Optionally, a component for implementing a receiving function in the transceiver unit 2410 may be considered as a receiving unit, and a component for implementing a sending function in the transceiver unit 2410 may be considered as a sending unit. In other words, the transceiver unit 2410 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 2410 is configured to perform a sending operation and a receiving operation on the first device side in the method embodiment shown in FIG. 8A and FIG. 8B, and the processing unit 2420 is configured to perform operations other than the receiving and sending operations on the first device side in the method embodiment shown in FIG. 8A and FIG. 8B.

For example, in an implementation, the transceiver unit 2410 is configured to perform all receiving and sending steps such as S802, S803, S806, S809, S811, and S812 on the first device side in the embodiment shown in FIG. 8A and FIG. 8B, and/or support another process of the technology described in this specification. The processing unit 2420 is configured to perform operations such as S801, S804, S805, and S810 other than the receiving and sending operations on the first device side in the embodiment shown in FIG. 8A and FIG. 8B, and/or support another process of the technology described in this specification.

Alternatively, the transceiver unit 2410 is configured to perform a sending operation and a receiving operation on the second device side in the method embodiment shown in FIG. 8A and FIG. 8B, and the processing unit 2420 is configured to perform operations other than the receiving and sending operations on the second device side in the method embodiment shown in FIG. 8A and FIG. 8B.

For example, in an implementation, the transceiver unit 2410 is configured to perform all receiving and sending steps such as S802, S803, S806, S809, S811, and S812 on the second device side in the embodiment shown in FIG. 8A and FIG. 8B, and/or support another process of the technology described in this specification. The processing unit 2420 is configured to perform operations such as S807 other than the receiving and sending operations on the second device side in the embodiment shown in FIG. 8A and FIG. 8B, and/or support another process of the technology described in this specification.

Alternatively, the transceiver unit 2410 is configured to perform a sending operation and a receiving operation on the first device side in the method embodiment shown in FIG. 11, and the processing unit 2420 is configured to perform operations other than the receiving and sending operations on the first device side in the method embodiment shown in FIG. 11.

For example, in an implementation, the transceiver unit 2410 is configured to perform all receiving and sending steps such as S1102, S1103, S1105, S1108, and S1109 on the first device side in the embodiment shown in FIG. 11, and/or support another process of the technology described in this specification. The processing unit 2420 is configured to perform operations such as S1101 and S1104 other than the receiving and sending operations on the first device side in the embodiment shown in FIG. 11, and/or support another process of the technology described in this specification.

Alternatively, the transceiver unit 2410 is configured to perform a sending operation and a receiving operation on the second device side in the method embodiment shown in FIG. 11, and the processing unit 2420 is configured to perform operations other than the receiving and sending operations on the second device side in the method embodiment shown in FIG. 11.

For example, in an implementation, the transceiver unit 2410 is configured to perform all receiving and sending steps such as S1102, S1103, S1105, S1108, and S1109 on the second device side in the embodiment shown in FIG. 11, and/or support another process of the technology described in this specification. The processing unit 2420 is configured to perform operations such as S1106 other than the receiving and sending operations on the second device side in the embodiment shown in FIG. 11, and/or support another process of the technology described in this specification.

Alternatively, the transceiver unit 2410 is configured to perform a sending operation and a receiving operation on the first device side in the method embodiment shown in FIG. 13, and the processing unit 2420 is configured to perform operations other than the receiving and sending operations on the first device side in the method embodiment shown in FIG. 13.

For example, in an implementation, the transceiver unit 2410 is configured to perform all receiving and sending steps such as S1302, S1303, and S1306 on the second terminal device side in the embodiment shown in FIG. 13, and/or support another process of the technology described in this specification. The processing unit 2420 is configured to perform operations such as S1301, S1304, and S1305 other than the receiving and sending operations on the second terminal apparatus side in the embodiment shown in FIG. 13, and/or support another process of the technology described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

When the communication apparatus in this embodiment of this application is a terminal device, for details, reference may be made to a device shown in FIG. 25. In an example, the device may implement functions similar to those of a processor 2510 in FIG. 25. In FIG. 25, the device includes the processor 2510, a data sending processor 2520, and a data receiving processor 2530. The processing module 1410 in the foregoing embodiment may be the processor 2510 in FIG. 25, and implements corresponding functions. The transceiver module 1420 in the foregoing embodiment may be the data sending processor 2520 and/or the data receiving processor 2530 in FIG. 25. Alternatively, the processing module 1610 in the foregoing embodiment may be the processor 2510 in FIG. 25, and implements corresponding functions. The transceiver module 1620 in the foregoing embodiment may be the data sending processor 2520 and/or the data receiving processor 2530 in FIG. 25. Alternatively, the processing module 1810 in the foregoing embodiment may be the processor 2510 in FIG. 25, and implements corresponding functions. The transceiver module 1820 in the foregoing embodiment may be the data sending processor 2520 and/or the data receiving processor 2530 in FIG. 25. Alternatively, the processing module 2010 in the foregoing embodiment may be the processor 2510 in FIG. 25, and implements corresponding functions. The transceiver module 2020 in the foregoing embodiment may be the data sending processor 2520 and/or the data receiving processor 2530 in FIG. 25. Alternatively, the processing module 2210 in the foregoing embodiment may be the processor 2510 in FIG. 25, and implements corresponding functions. The transceiver module 2220 in the foregoing embodiment may be the data sending processor 2520 and/or the data receiving processor 2530 in FIG. 25.

Although FIG. 25 shows a channel encoder and a channel decoder, it may be understood that these modules are merely examples and do not constitute a limitation on this embodiment.

FIG. 26 shows another form of this embodiment. A processing apparatus 2600 includes modules such as a modulation subsystem, a central processing subsystem, and a peripheral subsystem. The communication apparatus in this embodiment may be used as the modulation subsystem in the processing apparatus 2600. Specifically, the modulation subsystem may include a processor 2603 and an interface 2604. The processor 2603 implements the functions of the processing module 1410, and the interface 2604 implements the functions of the transceiver module 1420. Alternatively, the processor 2603 implements the functions of the processing module 1610, and the interface 2604 implements the functions of the transceiver module 1620, Alternatively, the processor 2603 implements the functions of the processing module 1810, and the interface 2604 implements the functions of the transceiver module 1820. Alternatively, the processor 2603 implements the functions of the processing module 2010, and the interface 2604 implements the functions of the transceiver module 2020. Alternatively, the processor 2603 implements the functions of the processing module 2210, and the interface 2604 implements the functions of the transceiver module 2220. As another variant, the modulation subsystem includes a memory 2606, a processor 2603, and a program that is stored in the memory 2606 and that can be executed by the processor. When executing the program, the processor 2603 implements the method on the first device side or the second device side in the method embodiment shown in FIG. 8A and FIG. 8B or the method embodiment shown in FIG. 11. Alternatively, when executing the program, the processor 2603 implements the method on the first device side in the method embodiment shown in FIG. 13. It should be noted that the memory 2606 may be a nonvolatile memory or a volatile memory. The memory 2606 may be located in the modulation subsystem, or may be located in the processing apparatus 2600, provided that the memory 2606 can be connected to the processor 2603.

An embodiment of this application further provides a first communication system. The communication system may include the first device in the embodiment shown in FIG. 8A and FIG. 8B and the second device in the embodiment shown in FIG. 8A and FIG. 8B. The first device described in the embodiment shown in FIG. 8A and FIG. 8B is, for example, the first device 1400 in FIG. 14 or the first device 1500 in FIG. 15, and the second device described in the embodiment shown in FIG. 8A and FIG. 8B is, for example, the second device 1600 in FIG. 16 or the second device 1700 in FIG. 17.

An embodiment of this application further provides a second communication system. The communication system may include the first device in the embodiment shown in FIG. 11 and the second device in the embodiment shown in FIG. 8. The first device described in the embodiment shown in FIG. 11 is, for example, the first device 1800 in FIG. 18 or the first device 1900 in FIG. 19, and the second device described in the embodiment shown in FIG. 11 is, for example, the second device 2000 in FIG. 20 or the second device 2100 in FIG. 21.

The first communication system and the second communication system may be a same communication system, or may be different communication systems.

An embodiment of this application further provides a computer-readable storage medium. The computer-readable storage medium stores a computer program. When the program is executed by a processor, a procedure related to the first device in the embodiment shown in FIG. 8A and FIG. 8B provided in the foregoing method embodiments may be implemented.

An embodiment of this application further provides a computer-readable storage medium. The computer-readable storage medium stores a computer program. When the program is executed by a processor, a procedure related to the second device in the embodiment shown in FIG. 8A and FIG. 8B provided in the foregoing method embodiments may be implemented.

An embodiment of this application further provides a computer-readable storage medium. The computer-readable storage medium stores a computer program. When the program is executed by a processor, a procedure related to the first device in the embodiment shown in FIG. 11 provided in the foregoing method embodiments may be implemented.

An embodiment of this application further provides a computer-readable storage medium. The computer-readable storage medium stores a computer program. When the program is executed by a processor, a procedure related to the second device in the embodiment shown in FIG. 11 provided in the foregoing method embodiments may be implemented.

An embodiment of this application further provides a computer-readable storage medium. The computer-readable storage medium stores a computer program. When the program is executed by a processor, a procedure related to the first device in the embodiment shown in FIG. 13 provided in the foregoing method embodiments may be implemented.

An embodiment of this application further provides a computer program product including instructions. When the instructions are executed, the method on the first device side in the method embodiment shown in FIG. 8A and FIG. 8B is performed.

An embodiment of this application further provides a computer program product including instructions. When the instructions are executed, the method on the second device side in the method embodiment shown in FIG. 8A and FIG. 8B is performed.

An embodiment of this application further provides a computer program product including instructions. When the instructions are executed, the method on the first device side in the method embodiment shown in FIG. 11 is performed.

An embodiment of this application further provides a computer program product including instructions. When the instructions are executed, the method on the second device side in the method embodiment shown in FIG. 11 is performed.

An embodiment of this application further provides a computer program product including instructions. When the instructions are executed, the method on the first device side in the method embodiment shown in FIG. 13 is performed.

It should be understood that the processor in the embodiments of this application may be a CPU, or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that serial numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory; ROM), a random access memory (random access memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A method implemented by a first device, wherein the method comprises:
    configuring a plurality of buffers to compress a plurality of data packets;
    compressing a first data packet using a first buffer to obtain a compressed first data packet, wherein the first buffer corresponds to a first serial number range to which a serial number of the first data packet belongs, and wherein content in the first buffer remains unchanged when compressing, using the first buffer, a plurality of data packets corresponding to the first buffer;
    compressing N additional data packets using N buffers, wherein N is greater than or equal to one; and
    sending, to a second device, the compressed first data packet and the compressed N additional data packs.

2. The method of claim 1, wherein different buffers in the plurality of buffers are configured to compress different data packets.

3. The method of claim 1, further comprising:
    receiving, from the second device, a first signaling indicating that the compressed first data packet is unsuccessfully decompressed;
    resetting the first buffer to obtain a reset first buffer; and
    compressing, using the reset first buffer, a second data packet corresponding to the first buffer.

4. The method of claim 1, further comprising:
    receiving, from the second device, a first signaling indicating first information, wherein the first information indicates that the compressed first data packet is not received or a compressed second data packet is unsuccessfully decompressed, wherein the compressed second data packet corresponds to a second buffer, and wherein the second buffer comprises the first data packet; and sending, to the second device, the second buffer or the compressed first data.

5. The method of claim 1, wherein the buffers correspond to one data bearer or one signaling bearer.

6. A method implemented by a first device and a second device second device, wherein the method comprises:
- compressing content comprising a plurality of data packets in a first buffer of the first device wherein the compressed content remains unchanged;
- maintaining, in the second device, a plurality of second buffers configured to decompress compressed data packets;
- receiving a compressed first data packet; and
- decompressing the compressed first data packet to obtain a first data packet using a first second buffer corresponding to the compressed first data packet based on first indication information carried in the compressed first data packet.

7. The method of claim 6, wherein different second buffers in the plurality of second buffers are configured to compress different data packets.

8. The method of claim 6, further comprising:
- sending, to the first device, a first signaling comprising first information indicating that the compressed first data packet is not received or that a compressed second data packet is unsuccessfully decompressed; and
- receiving, from the first device, a second buffer or the compressed first data packet.

9. The method of claim 6, wherein each of the plurality of second buffers corresponds to one data bearer or one signaling bearer.

10. A first device comprising:
- a memory configured to store instructions; and
- a processor coupled to the memory, wherein the instructions cause the processor to be configured to:
  - configure a plurality of buffers to compress data packets;
  - compress a first data packet using a first buffer to obtain a compressed first data packet, wherein the first buffer corresponds to a first serial number range to which a serial number of the first data packet belongs, and wherein content in the first buffer remains unchanged when compressing, using the first buffer, a plurality of data packets corresponding to the first buffer;
  - compress N additional data packets using N buffers, wherein N is greater than or equal to one; and
  - send the compressed first data packet and the compressed N additional data packs to a second device.

11. The first device of claim 10, wherein different buffers in the plurality of buffers are configured to compress different data packets.

12. The first device of claim 10, wherein the instructions further cause the processor to be configured to:
- receive, from the second device, a first signaling indicating that the compressed first data packet is unsuccessfully decompressed;
- reset the first buffer to obtain a reset first buffer; and
- compress, using the reset first buffer, a data packet corresponding to the first buffer.

13. The first device of claim 10, wherein the instructions further cause the processor to be configured to:
- receive, from the second device, a first signaling indicating first information, wherein the first information indicates that the compressed first data packet is not received or a compressed second data packet is unsuccessfully decompressed, wherein the compressed second data packet corresponds to a second buffer, and wherein the second buffer comprises the first data packet; and
- send, to the second device, the second buffer or the compressed first data.

14. The first device of claim 10, wherein the buffers correspond to one data bearer or one signaling bearer.

15. The method of claim 6, further comprising sending a first signaling indicating that the compressed first data packet is unsuccessfully decompressed.

16. The method of claim 1, further comprising resetting the first buffer to obtain a reset first buffer when one or more of the following conditions occur:
- a preset duration expires;
- after N data packets are compressed, wherein N is a positive integer; and
- a total data amount of compressed data packets is greater than or equal to a first threshold.

17. The first device of claim 10, wherein the instructions further cause the processor to be configured to reset the first buffer to obtain a reset first buffer when one or more of the following conditions occur:
- a preset duration expires;
- after N data packets are compressed, wherein N is a positive integer; and
- a total data amount of compressed data packets is greater than or equal to a first threshold.

\* \* \* \* \*